US012640168B2

(12) United States Patent
Deilamsalehy et al.

(10) Patent No.: US 12,640,168 B2
(45) Date of Patent: May 26, 2026

(54) VIDEO ASSEMBLY USING GENERATIVE ARTIFICIAL INTELLIGENCE

(71) Applicant: ADOBE INC., San Jose, CA (US)

(72) Inventors: Hanieh Deilamsalehy, Seattle, WA (US); Jui-Hsien Wang, Sammamish, WA (US); Zhengyang Ma, San Mateo, CA (US); Dingzeyu Li, Sammamish, WA (US); Hijung Shin, Natick, MA (US); Aseem Omprakash Agarwala, Seattle, WA (US); Kim Pascal Pimmel, Seattle, WA (US); Lubomira Assenova Dontcheva, Seattle, WA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/431,139

(22) Filed: Feb. 2, 2024

(65) Prior Publication Data

US 2025/0140291 A1     May 1, 2025

Related U.S. Application Data

(60) Provisional application No. 63/594,340, filed on Oct. 30, 2023.

(51) Int. Cl.
*G11B 27/036*     (2006.01)
*G06F 16/738*     (2019.01)
(Continued)

(52) U.S. Cl.
CPC .......... *G11B 27/036* (2013.01); *G06F 16/739* (2019.01); *G06F 16/7844* (2019.01);
(Continued)

(58) Field of Classification Search
CPC ....... G11B 27/031; G11B 27/06; G11B 27/34; G06V 20/47; G06V 20/49; G10L 15/04; G10L 15/183; G10L 21/0272; G10L 25/57
See application file for complete search history.

(56) References Cited

U.S. PATENT DOCUMENTS 7,339,992 B2     3/2008  Chang et al.
8,204,317 B2     6/2012  Barbieri et al.
(Continued)

FOREIGN PATENT DOCUMENTS

WO         2015/033448 A1     3/2015

OTHER PUBLICATIONS

Non-Final Office Action received for U.S. Appl. No. 18/431,134, mailed on Sep. 22, 2025, 20 pages.
(Continued)

*Primary Examiner* — Girumsew Wendmagegn
(74) *Attorney, Agent, or Firm* — Shook, Hardy & Bacon L.L.P.

(57)     ABSTRACT

Embodiments of the present invention provide systems, methods, and computer storage media for identifying the relevant segments that effectively summarize the larger input video and/or form a rough cut, and assembling them into one or more smaller trimmed videos. For example, visual scenes and corresponding scene captions are extracted from the input video and associated with an extracted diarized and timestamped transcript to generate an augmented transcript. The augmented transcript is applied to a large language model to extract sentences that characterize
(Continued)

a trimmed version of the input video (e.g., a natural language summary, a representation of identified sentences from the transcript). As such, corresponding video segments are identified (e.g., using similarity to match each sentence in a generated summary with a corresponding transcript sentence) and assembled into one or more trimmed videos. In some embodiments, the trimmed video is generated based on a user's query and/or desired length.

20 Claims, 29 Drawing Sheets

(51) Int. Cl.

| | |
|---|---|
| *G06F 16/783* | (2019.01) |
| *G06V 20/40* | (2022.01) |
| *G06V 40/16* | (2022.01) |
| *G10L 15/04* | (2013.01) |
| *G10L 15/183* | (2013.01) |
| *G10L 21/0272* | (2013.01) |
| *G10L 25/57* | (2013.01) |
| *G11B 27/031* | (2006.01) |
| *G11B 27/06* | (2006.01) |
| *G11B 27/34* | (2006.01) |
| *H04N 5/262* | (2006.01) |

(52) U.S. Cl.
CPC ............ *G06V 20/49* (2022.01); *G06V 40/161* (2022.01); *G06V 40/172* (2022.01); *G10L 15/04* (2013.01); *G10L 15/183* (2013.01); *G10L 21/0272* (2013.01); *G10L 25/57* (2013.01); *G11B 27/031* (2013.01); *G11B 27/06* (2013.01); *G11B 27/34* (2013.01); *H04N 5/2628* (2013.01); *G06V 20/47* (2022.01)

(56) References Cited

U.S. PATENT DOCUMENTS

| | | | |
|---|---|---|---|
| 9,176,987 B1 | 11/2015 | Peng et al. | |
| 10,299,008 B1 | 5/2019 | Catalano et al. | |
| 10,950,254 B2 | 3/2021 | Vaughn et al. | |
| 11,836,181 B2 | 12/2023 | Saggi et al. | |
| 2003/0163816 A1 | 8/2003 | Gutta et al. | |
| 2015/0379748 A1 | 12/2015 | Kumazaki et al. | |
| 2016/0014482 A1 | 1/2016 | Chen et al. | |
| 2020/0125600 A1 | 4/2020 | Jo | |
| 2021/0326643 A1 | 10/2021 | Fancellu | |
| 2022/0215052 A1 | 7/2022 | Chalana et al. | |
| 2022/0353469 A1 | 11/2022 | Huang et al. | |
| 2023/0386520 A1 | 11/2023 | Patterson et al. | |
| 2024/0020977 A1 | 1/2024 | Wu et al. | |
| 2024/0038271 A1 | 2/2024 | De et al. | |
| 2025/0036861 A1* | 1/2025 | Goshen .................. G06F 40/30 | |
| 2025/0039336 A1* | 1/2025 | Lee ........................ H04N 7/155 | |

OTHER PUBLICATIONS

Non-Final Office Action received for U.S. Appl. No. 18/431,103, mailed on Aug. 12, 2025, 5 pages.
Final Office Action received for U.S. Appl. No. 18/431,134, mailed on Apr. 9, 2026, 20 pages.

* cited by examiner

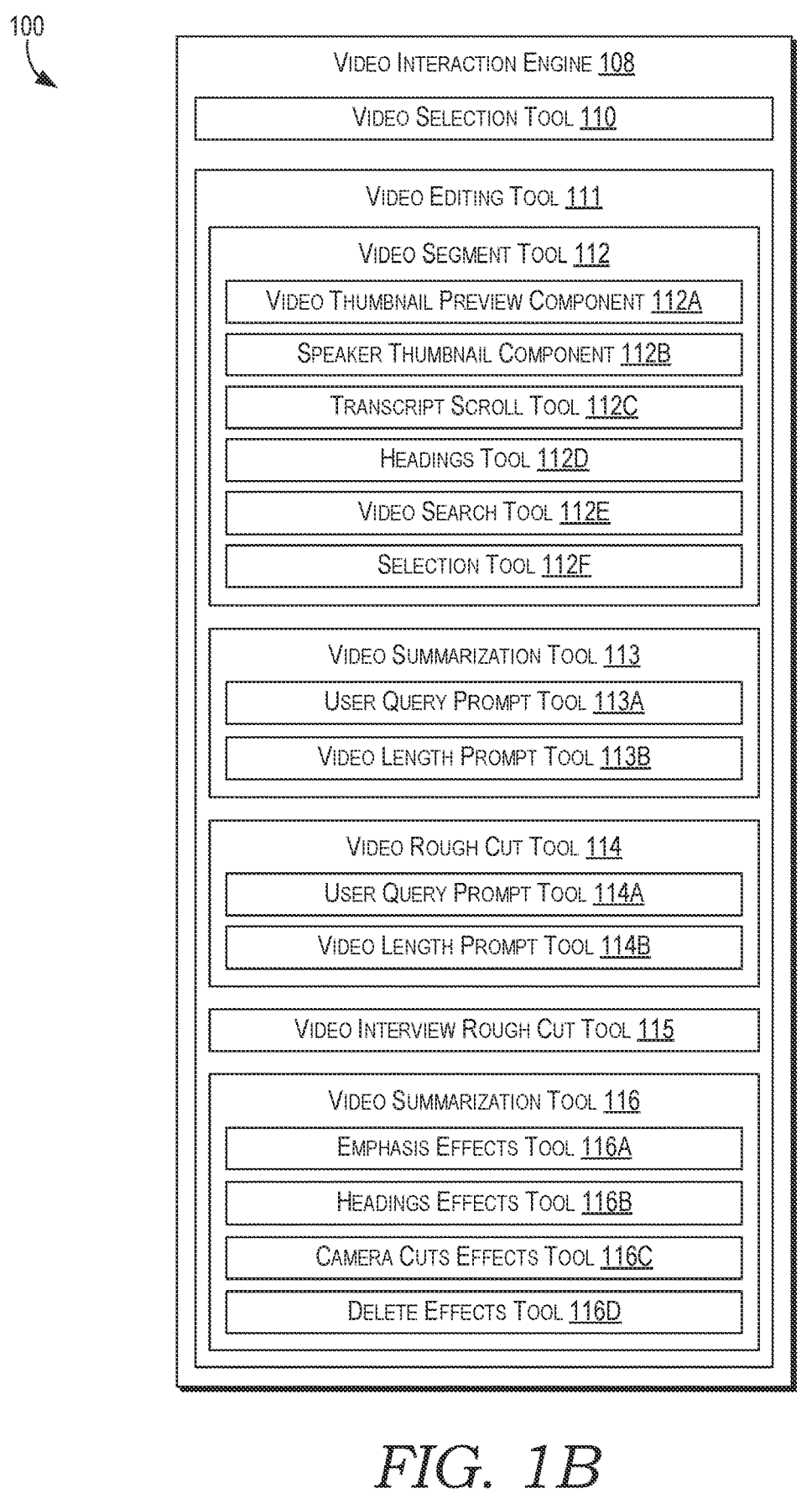

100

VIDEO INTERACTION ENGINE 108

VIDEO SELECTION TOOL 110

VIDEO EDITING TOOL 111

VIDEO SEGMENT TOOL 112

VIDEO THUMBNAIL PREVIEW COMPONENT 112A

SPEAKER THUMBNAIL COMPONENT 112B

TRANSCRIPT SCROLL TOOL 112C

HEADINGS TOOL 112D

VIDEO SEARCH TOOL 112E

SELECTION TOOL 112F

VIDEO SUMMARIZATION TOOL 113

USER QUERY PROMPT TOOL 113A

VIDEO LENGTH PROMPT TOOL 113B

VIDEO ROUGH CUT TOOL 114

USER QUERY PROMPT TOOL 114A

VIDEO LENGTH PROMPT TOOL 114B

VIDEO INTERVIEW ROUGH CUT TOOL 115

VIDEO SUMMARIZATION TOOL 116

EMPHASIS EFFECTS TOOL 116A

HEADINGS EFFECTS TOOL 116B

CAMERA CUTS EFFECTS TOOL 116C

DELETE EFFECTS TOOL 116D

*FIG. 1B*

300
VISUAL SCENES 310                                    CAPTIONS 320
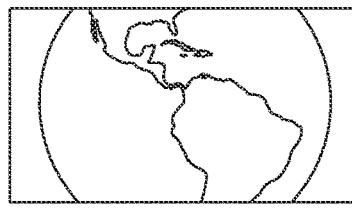
The earth with the words our planet on it
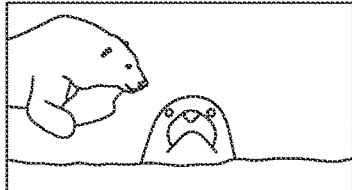
A polar bear and a seal face each other in the snow
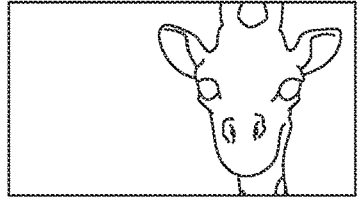
A close up of a giraffe's face with a sky background
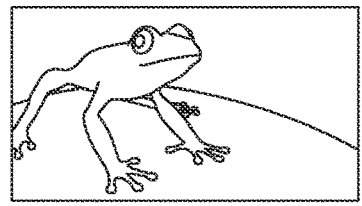
A close up of a frog on a leaf
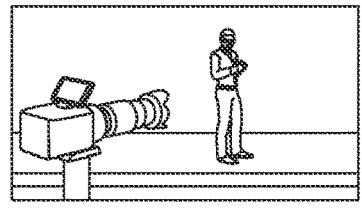
A man standing in front of a camera on top of a stage
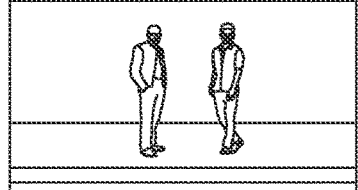
A couple of men standing on top of a stage
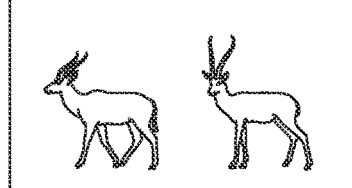
A herd of antelope walking across a desert
*FIG. 3*

400

VISUAL
SCENES 410                SCENE TRANSCRIPTION AND TIMING 430

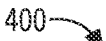  Speaker 1

Lorem ipsum dolor sit amet, consectetur adipiscing elit. Fusce feugiat odio mauris, ut malesuada velit viverra at. Suspendisse dignissim odio nec rhoncus auctor. Proin imperdiet quam sit amet ante consequat, et auctor mauris iaculis. Donec vel nibh ut mauris tempor suscipit et sed neque. Aliquam laoreet nisi et suscipit malesuada. Vivamus malesuada tortor vulputate aliquam mollis. Donec sed lectus eget nisi suscipit bibendum a eu purus. Mauris metus ligula, tristique at mauris nec, suscipit vestibulum lectus.

 Speaker 2

Maecenas fermentum dictum lectus, non blandit enim gravida a. Nunc venenatis laoreet tortor et varius. Duis a nunc ut tellus lacinia faucibus. Nunc sed pulvinar arcu.

  Speaker 1

Etiam eget leo et sem consectetur suscipit. Quisque placerat erat leo.

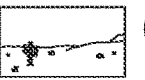  Speaker 3

Cras sed malesuada enim, non feugiat metus. Duis facilisis mauris vitae turpis.

  Speaker 1

Sed id tellus orci. Suspendisse vel turpis elit. Integer sed mollis sapien, ut efficitur eros. Integer mattis metus ut magna finibus gravida.

SPEAKER
THUMBNAIL 420

FIG. 4

500

SCENE/
SPEAKER <u>510</u>                    TRANSCRIPTION/CAPTION <u>520</u>

[Scene 1] The earth with the words our planet on it.
Speaker 1: Lorem ipsum dolor sit amet, consectetur adipiscing elit.
Speaker 1: Fusce feugiat odio mauris, ut malesuada velit viverra at. Suspendisse dignissim odio nec rhoncus auctor.
[Scene 2] A polar bear and a seal face each other in the snow.
[Scene 3] A close up of a giraffe's face with a sky background.
[Scene 4] A close up of a frog on a leaf.
[Scene 5] A man standing in front of a camera on top of a stage.
Speaker 1: Proin imperdiet quam sit amet ante consequat, et auctor mauris iaculis.
[Scene 6] A couple of men standing on top of a stage
[Scene 7] A herd of antelope walking across a desert

*FIG. 5*

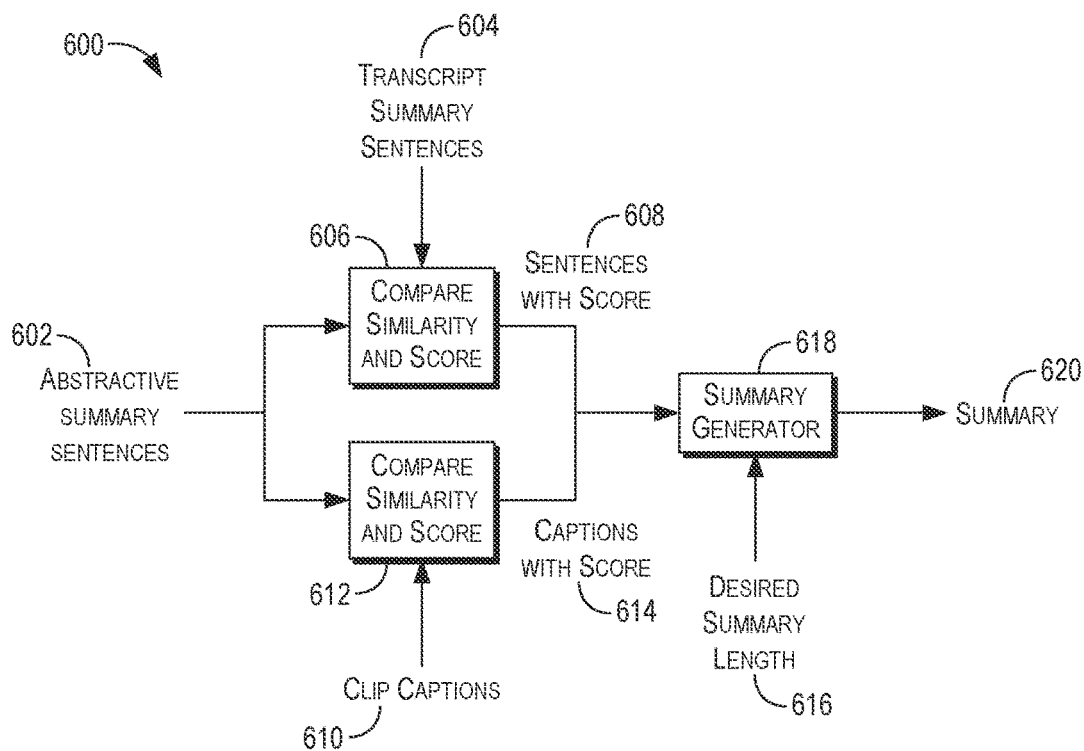

*FIG. 6*

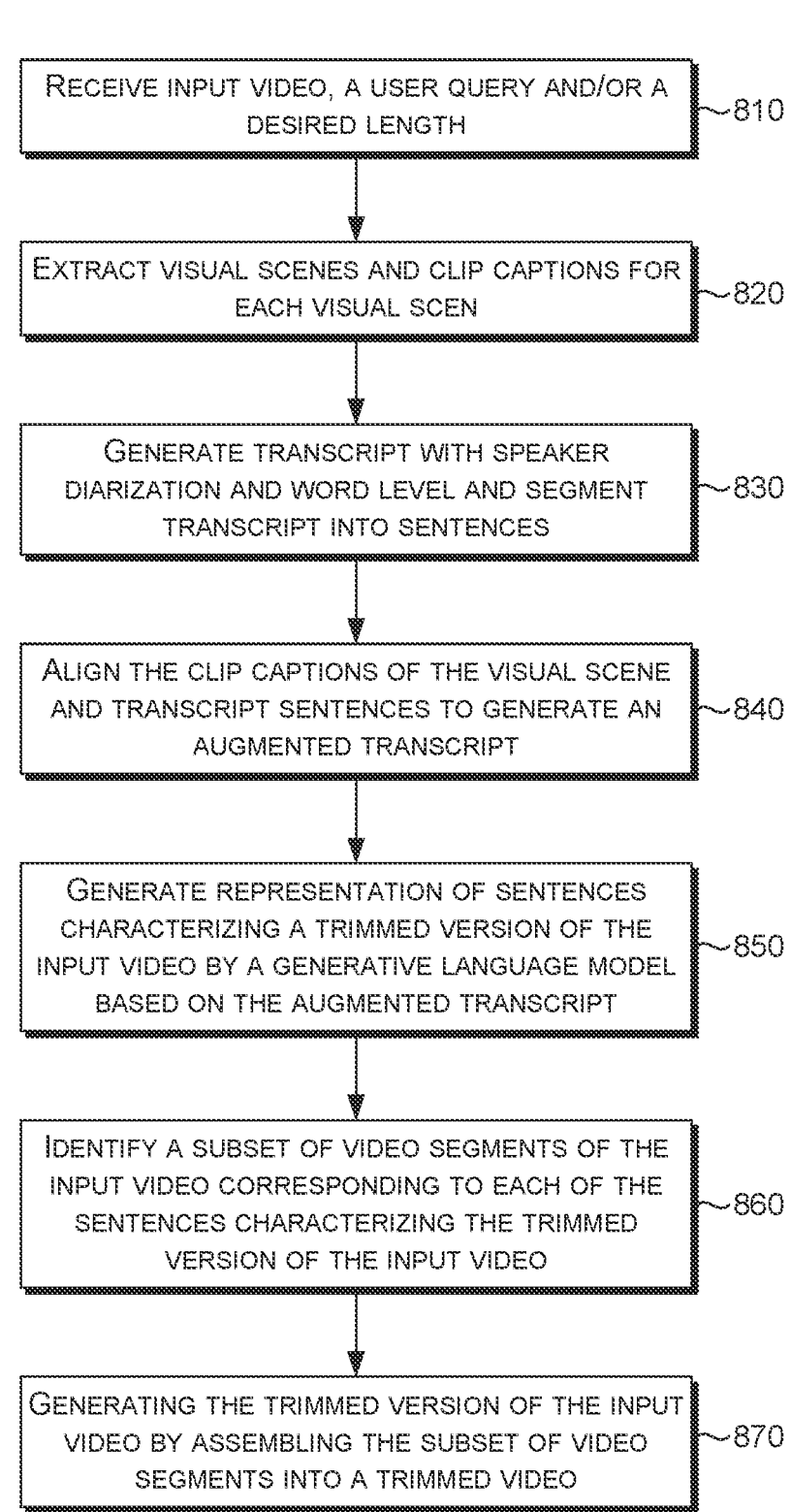

800

RECEIVE INPUT VIDEO, A USER QUERY AND/OR A DESIRED LENGTH ~810

EXTRACT VISUAL SCENES AND CLIP CAPTIONS FOR EACH VISUAL SCEN ~820

GENERATE TRANSCRIPT WITH SPEAKER DIARIZATION AND WORD LEVEL AND SEGMENT TRANSCRIPT INTO SENTENCES ~830

ALIGN THE CLIP CAPTIONS OF THE VISUAL SCENE AND TRANSCRIPT SENTENCES TO GENERATE AN AUGMENTED TRANSCRIPT ~840

GENERATE REPRESENTATION OF SENTENCES CHARACTERIZING A TRIMMED VERSION OF THE INPUT VIDEO BY A GENERATIVE LANGUAGE MODEL BASED ON THE AUGMENTED TRANSCRIPT ~850

IDENTIFY A SUBSET OF VIDEO SEGMENTS OF THE INPUT VIDEO CORRESPONDING TO EACH OF THE SENTENCES CHARACTERIZING THE TRIMMED VERSION OF THE INPUT VIDEO ~860

GENERATING THE TRIMMED VERSION OF THE INPUT VIDEO BY ASSEMBLING THE SUBSET OF VIDEO SEGMENTS INTO A TRIMMED VIDEO ~870

*FIG. 8*

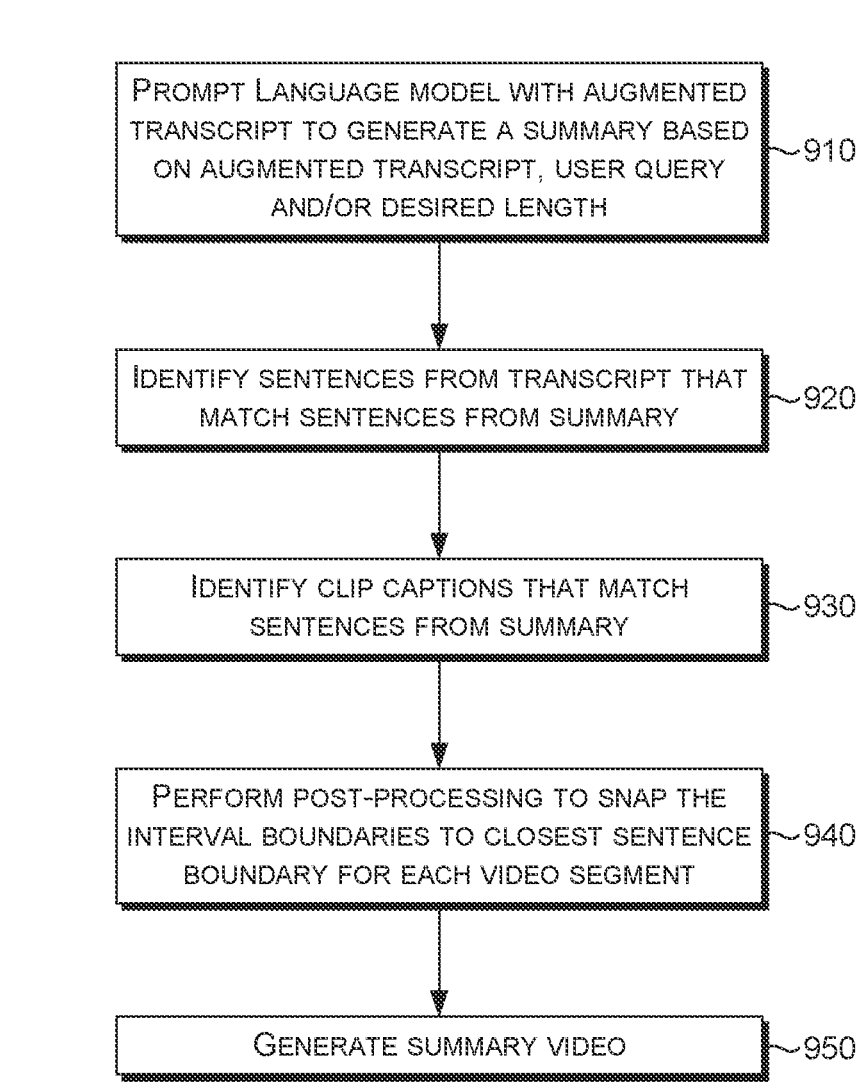

900

PROMPT LANGUAGE MODEL WITH AUGMENTED TRANSCRIPT TO GENERATE A SUMMARY BASED ON AUGMENTED TRANSCRIPT, USER QUERY AND/OR DESIRED LENGTH ~910

IDENTIFY SENTENCES FROM TRANSCRIPT THAT MATCH SENTENCES FROM SUMMARY ~920

IDENTIFY CLIP CAPTIONS THAT MATCH SENTENCES FROM SUMMARY ~930

PERFORM POST-PROCESSING TO SNAP THE INTERVAL BOUNDARIES TO CLOSEST SENTENCE BOUNDARY FOR EACH VIDEO SEGMENT ~940

GENERATE SUMMARY VIDEO ~950

PROMPT LANGUAGE MODEL WITH AUGMENTED TRANSCRIPT TO GENERATE A ROUGH CUT TRANSCRIPT BASED ON AUGMENTED TRANSCRIPT, USER QUERY, AND/OR DESIRED LENGTH ～1010

POST-PROCESSING TO SNAP THE INTERVAL BOUNDARIES TO CLOSEST SENTENCE BOUNDARY FOR EACH VIDEO SEGMENT ～1020

GENERATE ROUGH CUT VIDEO ～1030

1100

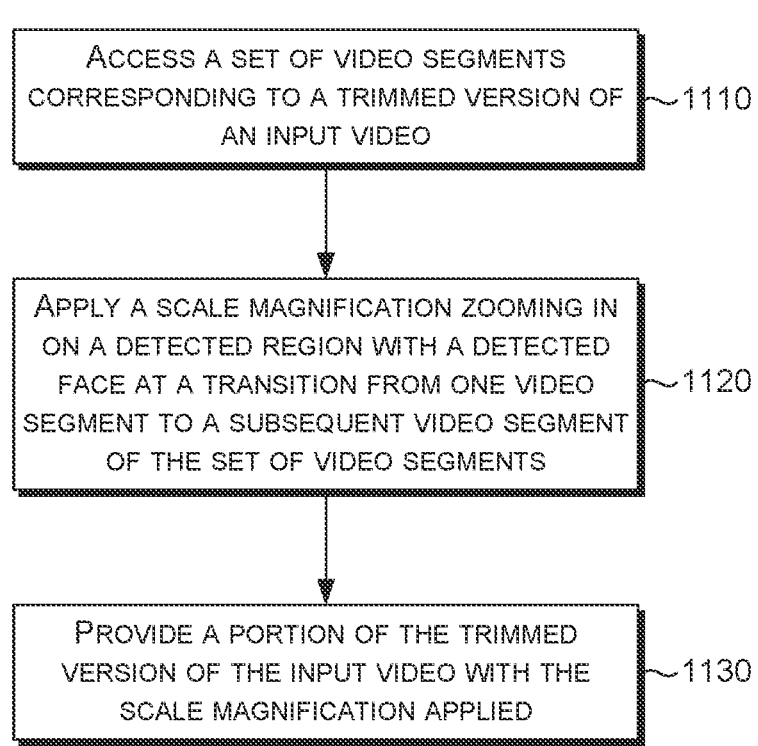

ACCESS A SET OF VIDEO SEGMENTS CORRESPONDING TO A TRIMMED VERSION OF AN INPUT VIDEO ~1110

APPLY A SCALE MAGNIFICATION ZOOMING IN ON A DETECTED REGION WITH A DETECTED FACE AT A TRANSITION FROM ONE VIDEO SEGMENT TO A SUBSEQUENT VIDEO SEGMENT OF THE SET OF VIDEO SEGMENTS ~1120

PROVIDE A PORTION OF THE TRIMMED VERSION OF THE INPUT VIDEO WITH THE SCALE MAGNIFICATION APPLIED ~1130

ACCESS A SET OF VIDEO SEGMENTS CORRESPONDING TO A TRIMMED VERSION OF AN INPUT VIDEO ~1210

APPLY A SCALE MAGNIFICATION ZOOMING IN ON A DETECTED REGION COMPRISING A DETECTED FACE TO AT LEAST A PORTION OF A VIDEO SEGMENT FOR EMPHASIS ON THE PORTION OF THE VIDEO SEGMENT ~1220

PROVIDE A PORTION OF THE INPUT VIDEO WITH THE SCALE MAGNIFICATION APPLIED ~1230

1300

ACCESS A SET OF VIDEO SEGMENTS CORRESPONDING
TO A TRIMMED VERSION OF AN INPUT VIDEO ~1310

GENERATE A CAPTION TO HIGHLIGHT A PHRASE SPOKEN
IN A VIDEO SEGMENT OF THE SET OF VIDEO SEGMENTS
BY PROMPTING A LANGUAGE MODEL WITH A TRANSCRIPT
CORRESPONDING TO THE SET OF VIDEO SEGMENTS ~1320

APPLY THE CAPTION TO HIGHLIGHT THE PHRASE IN THE
CORRESPONDING VIDEO SEGMENT ~1330

1400

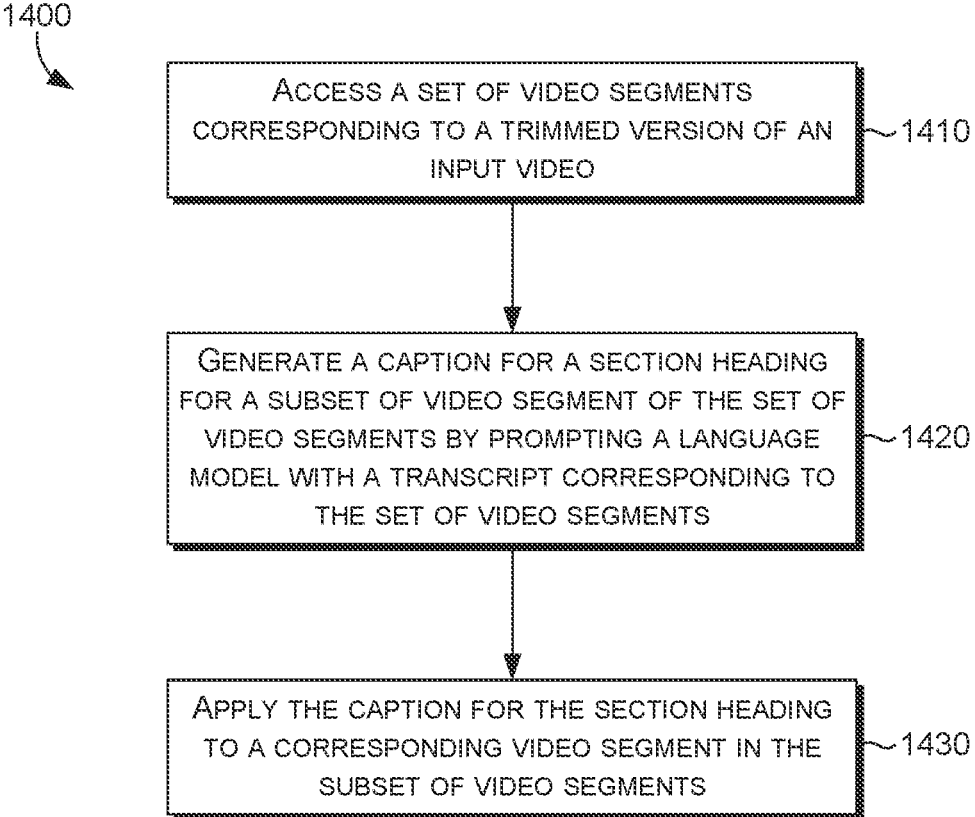

ACCESS A SET OF VIDEO SEGMENTS CORRESPONDING TO A TRIMMED VERSION OF AN INPUT VIDEO ~1410

GENERATE A CAPTION FOR A SECTION HEADING FOR A SUBSET OF VIDEO SEGMENT OF THE SET OF VIDEO SEGMENTS BY PROMPTING A LANGUAGE MODEL WITH A TRANSCRIPT CORRESPONDING TO THE SET OF VIDEO SEGMENTS ~1420

APPLY THE CAPTION FOR THE SECTION HEADING TO A CORRESPONDING VIDEO SEGMENT IN THE SUBSET OF VIDEO SEGMENTS ~1430

ACCESS A SET OF VIDEO SEGMENTS CORRESPONDING TO A TRIMMED VERSION OF AN INPUT VIDEO ~1610

GENERATE A CAPTION IN A VIDEO SEGMENT OF THE SET OF VIDEO SEGMENTS BY PROMPTING A LANGUAGE MODEL WITH A TRANSCRIPT CORRESPONDING TO THE SET OF VIDEO SEGMENTS ~1620

APPLY THE CAPTION TO THE VIDEO SEGMENT WITH RESPECT TO A DETECTED REGION COMPRISING A DETECTED FACE ~1630

1700

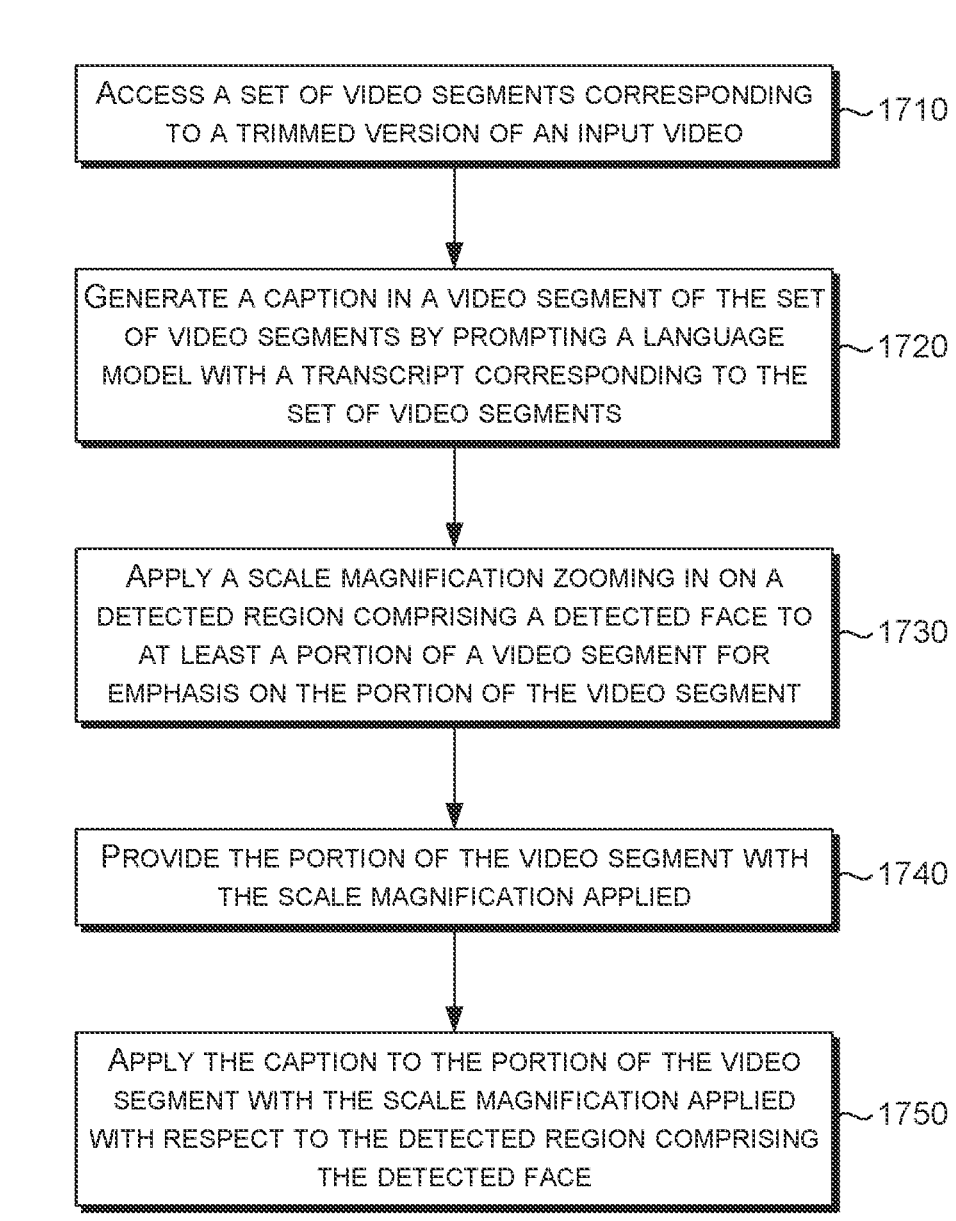

ACCESS A SET OF VIDEO SEGMENTS CORRESPONDING TO A TRIMMED VERSION OF AN INPUT VIDEO ~1710

GENERATE A CAPTION IN A VIDEO SEGMENT OF THE SET OF VIDEO SEGMENTS BY PROMPTING A LANGUAGE MODEL WITH A TRANSCRIPT CORRESPONDING TO THE SET OF VIDEO SEGMENTS ~1720

APPLY A SCALE MAGNIFICATION ZOOMING IN ON A DETECTED REGION COMPRISING A DETECTED FACE TO AT LEAST A PORTION OF A VIDEO SEGMENT FOR EMPHASIS ON THE PORTION OF THE VIDEO SEGMENT ~1730

PROVIDE THE PORTION OF THE VIDEO SEGMENT WITH THE SCALE MAGNIFICATION APPLIED ~1740

APPLY THE CAPTION TO THE PORTION OF THE VIDEO SEGMENT WITH THE SCALE MAGNIFICATION APPLIED WITH RESPECT TO THE DETECTED REGION COMPRISING THE DETECTED FACE ~1750

*FIG. 17*

VIDEO ASSEMBLY USING GENERATIVE ARTIFICIAL INTELLIGENCE

CROSS REFERENCE TO RELATED APPLICATIONS

This application is a non-provisional application that claims the benefit of priority to U.S. Provisional Application No. 63/594,340 filed on Oct. 30, 2023, which is incorporated herein by reference in its entirety.

BACKGROUND

Recent years have seen a proliferation in the use of video, which has applications in practically every industry from film and television to advertising and social media. Businesses and individuals routinely create and share video content in a variety of contexts, such as presentations, tutorials, commentary, news and sports segments, blogs, product reviews, testimonials, comedy, dance, music, movies, and video games, to name a few examples. Video can be captured using a camera, generated using animation or rendering tools, edited with various types of video editing software, and shared through a variety of outlets. Indeed, recent advancements in digital cameras, smartphones, social media, and other technologies have provided a number of new ways that make it easier for even novices to capture and share video. With these new ways to capture and share video comes an increasing demand for video editing features.

Conventionally, video editing involves selecting video frames and performing some type of action on the frames or associated audio. Some common operations include importing, trimming, cropping, rearranging, applying transitions and effects, adjusting color, adding titles and graphics, exporting, and others. Video editing software, such as ADOBE® PREMIERE® PRO and ADOBE PREMIERE ELEMENTS, typically includes a graphical user interface (GUI) that presents a video timeline that represents the video frames in the video and allows the user to select particular frames and the operations to perform on the frames. However, conventional video editing can be tedious, challenging, and even beyond the skill level of many users.

SUMMARY

Various aspects of the technology described herein are generally directed to systems, methods, and computer storage media for, among other things, techniques for using generative artificial intelligence ("AI") to automatically cut down a user's larger input video into an edited video (e.g., a trimmed video such as a rough cut or a summarization) comprising the most important video segments and applying corresponding video effects.

Some embodiments of the present invention are directed to identifying the relevant segments that effectively summarize the larger input video and/or form a rough cut, and assembling them into one or more smaller trimmed videos. For example, visual scenes and corresponding scene captions may be extracted from the input video and associated with an extracted diarized and timestamped transcript to generate an augmented transcript. The augmented transcript may be applied to a large language model to extract a plurality of sentences that characterize a trimmed version of the input video (e.g., a natural language summary, a representation of identified sentences from the transcript). As such, corresponding video segments may be identified (e.g., using similarity to match each sentence in a generated summary with a corresponding transcript sentence) and assembled into one or more trimmed videos. In some embodiments, the trimmed video can be generated based on a user's query and/or desired length.

Some embodiments of the present invention are directed to adding face-aware scale magnification to the trimmed video (e.g., applying scale magnification to simulate a camera zoom effect that hides shot cuts with respect to the subject's face). For example, as the trimmed video transitions from one video segment to the next video segment, a scale magnification may be applied that zooms in on a detected face at a boundary between the video segments to smooth the transition between video segments.

Some embodiments of the present invention are directed to adding captioning video effects to the trimmed video (e.g., applying face-aware and non-face-aware captioning to emphasize extracted video segment headings, important sentences, extracted lists, etc.). For example, a prompt may be provided to a generative language model to identify portions of a transcript (e.g., extracted scene summaries, important sentences, lists of items discussed in the video, etc.) which may be applied to corresponding video segments as captions in a way that depends on the type of caption (e.g., an extracted heading may be captioned at the start of a corresponding video segment, important sentences and/or extracted list items may be captioned when they are spoken).

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 1A-1B are block diagrams of an example computing system for video editing or playback, in accordance with embodiments of the present invention;

FIG. 3 illustrates examples of visual scenes with corresponding scene captions, in accordance with embodiments of the present invention;

FIG. 4 illustrates an example of a diarized transcript and word-level timing with corresponding frames of each visual scene, in accordance with embodiments of the present invention;

FIG. 5 illustrates example of an augmented transcript, in accordance with embodiments of the present invention;

FIG. 6 illustrates an example diagram of a model implemented to compare sentences of a summary to transcript sentences and clip captions to generate a summarized video, in accordance with embodiments of the present invention;

FIG. 8 is a flow diagram showing a method for generating an edited video using a generative language model, in accordance with embodiments of the present invention;

FIG. 9 is a flow diagram showing a method for generating an edited video summarizing a larger input video using a generative language model, in accordance with embodiments of the present invention;

FIG. 11 is a flow diagram showing a method for applying face-aware scale magnification video effects for scene transitions, in accordance with embodiments of the present invention;

FIG. 14 is a flow diagram showing a method for applying captioning video effects for section headings, in accordance with embodiments of the present invention;

FIG. 17 is a flow diagram showing a method for applying face-aware captioning video effects with scale magnification for emphasis, in accordance with embodiments of the present invention;

DETAILED DESCRIPTION

Overview

Figure 1A:
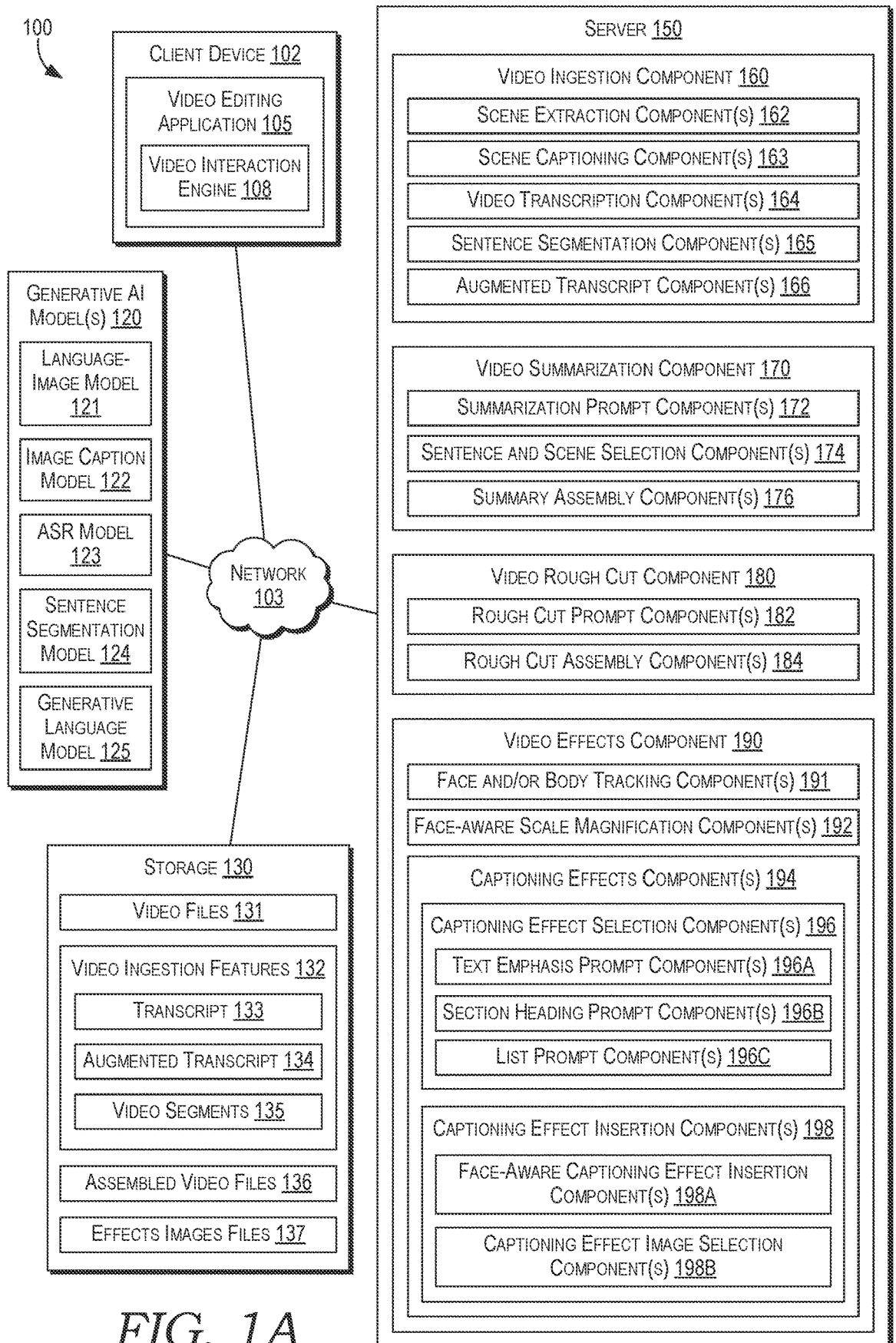

Conventional video editing interfaces allow users to manually select particular video frames through interactions with a video timeline that represents frames on the timeline linearly as a function of time and at positions corresponding to the time when each frame appears in the video. However, interaction modalities that rely on a manual selection of particular video frames or a corresponding time range are inherently slow and fine-grained, resulting in editing workflows that are often considered tedious, challenging, or even beyond the skill level of many users. In other words, conventional video editing is a manually intensive process requiring an end user to manually identify and select frames of a video, manually edit the video frames, and/or manually insert video effects for each frame of an a resulting video. Conventional video is especially cumbersome when dealing with a larger input video where an end user must manually select each of the frames of the larger input video for editing that the user desires to include in the final edited video.

Accordingly, unnecessary computing resources are utilized by video editing in conventional implementations. For example, computing and network resources are unnecessarily consumed to facilitate the manual intensive process of video editing. For instance, each operation for an end user to manually identify and select frames of a video, manually edit the video frames, and/or manually insert video effects for each frame of an a resulting video requires a significant amount of computer operations. Further, due the subjective nature of the process, the end user often repeats steps and changes their mind regarding certain video edits results in even further increases to computer operations. In this regard, video editing is a computationally expensive process requiring a significant amount of computer input/output operations for reading/writing data related to manually editing each frame of a video. Similarly, when data related to the video or video editing software is located over a network, the processing of operations facilitating the manual intensive process of video editing decreases the throughput for a network, increases the network latency, and increases packet generation costs due to the increase in computer operations.

As such, embodiments of the present invention are directed to techniques for using generative AI to automatically cut down a user's larger input video into an edited video (e.g., a trimmed video such as a rough cut or a summarization) comprising the most important video segments and applying corresponding video effects.

In some embodiments, an input video(s) designated by an end user is accessed by a video editing application. The end user then selects an option in the video editing application to create a smaller trimmed video based on the larger input video (or based on the combination of input videos). In some embodiments, the user can select an option in the video editing application for a desired length of the smaller trimmed video. In some embodiments, the option in the video editing application to create a smaller trimmed video is an option to create a summarized version of the larger input video. In some embodiments, the option in the video editing application to create a smaller trimmed video is an option to create a rough cut of the larger input video. For example, the larger input video may be a raw video that includes unnecessary video segments, such as video segments with unnecessary dialogue, repeated dialogue, and/or mistakes, and a rough cut of the raw video would remove the unnecessary video segments. As a more specific example, the larger input video may be a raw video of an entire interview with a person and the rough cut of the raw video would focus the interview on a specific subject of the interview. In some embodiments, the user can select an option in the video editing application to provide a query for the creation of the smaller trimmed video. For example, the end user may provide a query in the video editing application to designate a topic for the smaller trimmed video. As another example, the end user can provide a query in the video editing application to characterize a type of video or a storyline of the video, such as an interview, for the smaller trimmed video. In this regard, the end user can provide a prompt through the query in the video editing application to designate the focus of the smaller trimmed video from the larger input video.

In some embodiments, the video editing application causes the extraction of each of the visual scenes of the input video with corresponding start times and end times for each visual scene of the input video. For example, after the input video is accessed by a video editing application, the video editing application may communicate with a language-image pretrained model to compute the temporal segmentation of each visual scene of the input video. In this regard, each visual scene of the input video is computed based on the similarity of frame embeddings of each corresponding frame of each visual scene by the language-image pretrained model. Each frame with similar frame embeddings are clustered into a corresponding visual scene by the language-image pretrained model. The start times and end times for each visual scene of the input video can then be determined based on the clustered frames for each visual scene.

In some embodiments, the video editing application causes the extraction of corresponding scene captions for each of the visual scenes of the input video. For example, the video editing application may communicate with an image caption generator model and the image caption generator model generates a caption (e.g., a scene caption) for a frame from each visual scene of the input video. In some embodiments, a center frame from each visual scene of the input video is utilized by the image caption generator model to generate the scene caption for each corresponding visual scene of the input video. Examples of visual scenes with corresponding scene captions are shown in FIG. 3.

In some embodiments, the video editing application causes the extraction of a diarized and timestamped transcript for the input video. For example, the video editing application may communicate with an automated speech recognition ("ASR") model to transcribe the input video with speaker diarization and word-level timing in order to extract the diarized and timestamped transcript for the input video. An example of a diarized transcript and word-level timing with corresponding frames of each visual scene is shown in FIG. 4. In some embodiments, the video editing application causes the segmentation of the diarized and timestamped transcript for the input video into sentences along with the start time and end time and the speaker identification of each sentence of the transcript. For example, the video editing application may communicate with a sentence segmentation model to segment the diarized and timestamped transcript for the input video into sentences along with the start time and end time and the speaker identification of each sentence.

In some embodiments, the video editing application generates an augmented transcript by aligning the visual scene captions of each visual scene with the diarized and timestamped transcript for the input video. For example, the augmented transcript may include each scene caption for each visual scene followed by each sentence and a speaker ID for each sentence of the transcript for the visual scene. An example of an augmented transcript is shown in FIG. 5.

Figure 2:
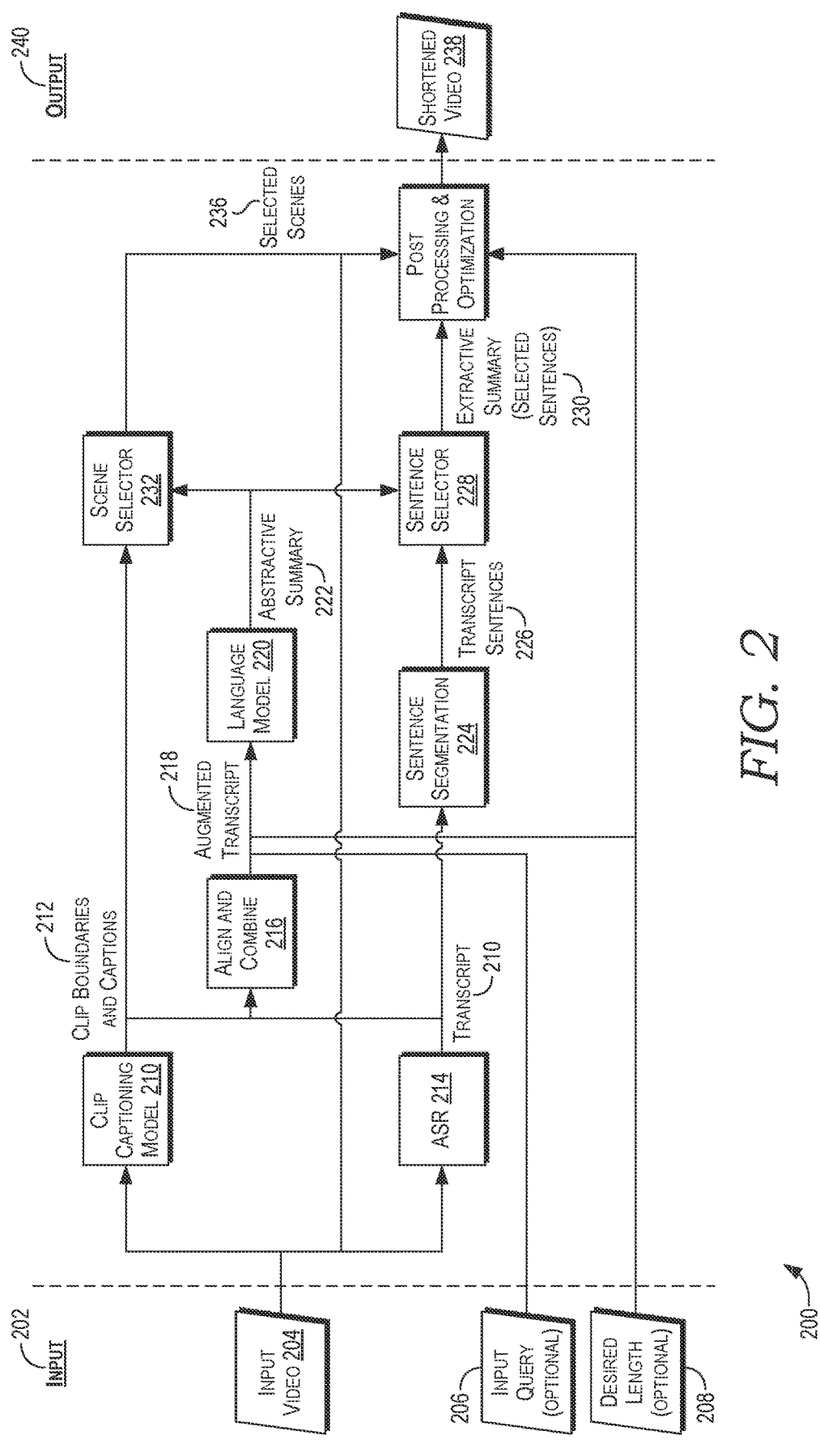
FIG. 2 illustrates an example diagram of a model implemented to identify the relevant segments that effectively summarize the larger input video and/or form a rough cut, and assembling them into one or more smaller trimmed videos, in accordance with embodiments of the present invention.

In some embodiments, after the user selects the option in the video editing application to create a summarized version of the larger input video, the video editing application causes a generative language model to generate a summary of the augmented transcript. An example diagram of a model implemented to create a summarized version of the larger input video is shown in FIG. 2. For example, the video editing application may provide the augmented transcript with a prompt to the generative language model to summarize the augmented transcript (e.g., and any other information, such as a user query and/or desired summary length). In some embodiments, the prompt requests the generative language model to make minimum changes to the sentences of the augment transcript in the summary generated by the generative language model. A specific example of a prompt to the generative language model to summarize the augmented transcript is as follows:

Prompt = ("The following document is the transcript and scenes of a video. The video has " + str(num_of_scenes) + " scenes. " +
"I have formatted the document like a film script. "
"Please summarize the following document focusing on " "\"" + USER_QUERY + "\"""

-continued

```
" by extracting the sentences and scenes related to " "\'"" + USER_QUERY + "\'""
" from the document. " +
"Return the sentences and scenes that should be included in the summary. "
"Only use the exact sentences and scenes from the document in the summary. " +
"Do not add new words and do not delete any words from the original sentences. " +
"Do not rephrase the original sentences and do not change the punctuation. " + "\n" +
"The summary should contain about " + str(num_summary_sentences) +
" selected scenes and sentences." + "\n" +
" [DOCUMENT] " + augmented_transcript + " [END OF DOCUMENT]"
)
```

In some embodiments, after the generative language model generates a summary of the augmented transcript, the video editing application causes the selection of sentences from the diarized and timestamped transcript and the scene captions of the visual scenes that match each sentence of the summary. As such, the video editing application identifies corresponding video segments from the selected sentences of the transcript and scene captions and assembled into a trimmed video corresponding to a summarized version of the input video. In some embodiments, the video editing application generates multiple trimmed videos corresponding to different summaries of the input video. An example diagram of a model implemented to compare sentences of a summary to transcript sentences and scene captions to generate a summarized video is shown in FIG. 6.

In some embodiments, each sentence embedding of each sentence of the summary is compared to each sentence embedding (e.g., such as vector of size 512 of each sentence) of each sentence of the diarized and timestamped transcript and each sentence embedding of each scene caption of the visual scenes in order to determine sentence to sentence similarity, such as cosine similarity between the sentence embeddings. In this regard, for each sentence of the summary, the sentence from the diarized and timestamped transcript or the scene captions of the visual scenes that is the most similar to the sentence from the summary is selected. In some embodiments, the rouge score between each sentence of the summary and sentences from the diarized and timestamped transcript and the scene captions of the visual scenes is utilized to select the most similar sentences from the diarized and timestamped transcript and the scene captions of the visual scenes.

In some embodiments, each sentence of the diarized and timestamped transcript and each scene caption of the visual scenes is scored with respect to each sentence of the summary in order to select the top n similar sentences. In this regard, as the top n similar sentences are selected, the length of the final summary is flexible based on the final sentence selected from the top n similar sentences. For example, the video editing application may provide the top n similar sentences selected from the diarized and timestamped transcript and scene captions for each sentence of the summary, along with the start times and end times of each of the top n similar sentences, to a generative language model. The video editing application can also provide the desired length of the final trimmed video corresponding to the summarized version of the input video. In this regard, the generative language model can identify each sentence from the transcript and scene captions most similar to each sentence of the summary while also taking into the desired length of the final trimmed video.

In some embodiments, the video editing application causes a generative language model to select scenes from the scene captions of the visual scenes that match each sentence of the summary. For example, the video editing application may provide the generated summary of the augmented transcript, and the scene captions of the visual scenes, with a prompt to the generative language model to select visual scenes that matches the summary. A specific example of a prompt to the generative language model to select visual scenes is as follows:

```
Prompt = ("The following is the summary of a video. " + "\n" +
"[SUMMARY] " + summary + " [END OF SUMMARY]"
"Given the following scenes from the video, please select the ones that
match the summary. " +
" Return the scene numbers that should be included in the summary as a
list of numbers. " + "\n" +
"[SCENES CAPTIONS] " + scenes + " [END OF SCENES
CAPTIONS]"
)
```

In some embodiments, following the video editing application identifying corresponding video segments from the selected sentences of the transcript and scene captions to assemble the video segments into a trimmed video, the video editing application performs post-processing to snap the interval boundaries to the closest sentence boundary so that the identified video segments do not cut in the middle of a sentence.

In some embodiments, after the user selects the option in the video editing application to create a rough cut of the larger input video, the video editing application causes a generative language model to extract a plurality of sentences that characterize a rough cut of the input video. For example, the video editing application may provide the augmented transcript with a prompt to the generative language model to extract portions of the augmented transcript (e.g., sentences of the transcript and scene captions) as a rough cut of the input video. In some embodiments, the prompt to the generative language can include additional information corresponding to the request to extract portions of the augmented transcript of the rough cut, such as a user query and/or desired length of the rough cut. A specific example of a prompt to the generative language model to extract portions of the augmented transcript as a rough cut of the input video is as follows:

```
Prompt = ("This is the transcript of a video interview with a person. " +
"Cut down the source video to make a great version where " +
"the person introduces themselves, talks about their experience as an " +
```

-continued

```
"intern and what they like about their work. \n\n " +
"The transcript is given as a list of sentences with ID. " +
"Only return the sentence IDs to form the great version. " +
"Do not include full sentences in your reply. " +
"Only return a list of IDs. \n\n " +
"Use the following format: \n . " +
"``" +
"[1, 4, 45, 100]" +
"``\\\n\n" +
)
```

In some embodiments, as the corresponding transcript of the rough cut generated by the generative language model includes the extracted portions of the augmented transcript, the video editing application identifies corresponding video segments from the extracted portions of the augmented transcript and assembles the video segments into a trimmed video corresponding to a rough cut of the input video. In some embodiments, following the video editing application identifying corresponding video segments from the extracted portions of the augmented transcript to assemble the video segments into a trimmed video, the video editing application performs post-processing to snap the interval boundaries to the closest sentence boundary so that the identified video segments do not cut in the middle of a sentence. In some embodiments, the video editing application generates multiple trimmed videos corresponding to different rough cuts of the input video.

In some embodiments, video effects can be applied to the assembled video segments of the trimmed video of the input video. In some embodiments, face-aware scale magnification can be applied to video segments of the trimmed video. In this regard, applying scale magnification to simulate a camera zoom effect hides shot cuts for changes between video segments of the trimmed video with respect to the subject's face. For example, as the trimmed video transitions from one video segment to the next video segment, a scale magnification may be applied that zooms in on a detected face at a boundary between the video segments to smooth the transition between video segments.

As a more specific example, the original shot size (e.g., without scale magnification applied) of the input video may be utilized for the first contiguous video segment of the trimmed video. Following an audio cut, such as a transition from one video segment to the next video segment of the trimmed video as each video segment corresponds to different sentences at different times of the input video, a scale magnification may be applied to the next video segment that zooms in on a detected face at a boundary between the video segments to smooth the transition between video segments. Following a subsequent audio cut to the subsequent video segment of the trimmed video, the original shot size or a different scale magnification may be applied to smooth the transition between video segments. Examples of applying scale magnification that zooms in on a detected face at a boundary between the video segments to smooth the transition between video segments are shown in FIGS. 7F-7H.

In some embodiments, the video editing application can compute the location of each subject's face and/or body (e.g., or portion of the subject's body, such as shoulders) in each video segment of the trimmed video. In some embodiments, the video editing application can compute the location of each subject's face and/or body in the input video after accessing the input video before assembling the trimmed the video. In some embodiments, the video editing application can compute the location of each subject's face and/or body in the input video based on the corresponding subject that is speaking in the portion of the video segment.

In some embodiments, the computed location of the subject's face and/or body can be used to position the subject at the same relative position in video segments of the trimmed video by cropping portions of the video segments so that the subject's face and/or body remains at the same relative position in the video segments. For example, when a scale magnification is applied that zooms in on a detected face at a boundary between the video segments to smooth the transition between video segments, the subject may be positioned at the same relative position by cropping the video segments with respect to the computed location of the subject's face and/or body. Examples of cropping portions of the video segments so that the subject's face and/or body remains at the same relative position in the video segments are shown in FIGS. 7F-7H. As can be understood from FIGS. 7F-7H, the subject remains in the same relative horizontal position between video segments.

In some embodiments, when there are there multiple computed locations of multiple subjects' faces and/or bodies, the computed location of the speaker's face and/or body can be used to position the speaker at the same relative position in video segments of the trimmed video by cropping portions of the video segments so that the speaker's face and/or body remains at the same relative position in the video segments. In some embodiments, when there are there multiple computed locations of multiple subjects' faces and/or bodies, the computed location of all or some of the subjects' faces and/or bodies can be used to position all or some of the subjects (e.g., all of the subjects in the video segment, only the subjects that are speaking the video segment, each subject that is speaking in each portion, etc.) in video segments of the trimmed video by cropping portions of the video segments so that all or some of the subjects' faces and/or bodies remain in the video segments.

In some embodiments, the computed location of the subject's face and/or body can be used to position the subject at a position relative to video captions in video segments of the trimmed video by cropping portions of the video segments so that the subject's face and/or body is located within the frames of the video segment while providing a region in the frames of the video segments for the caption. For example, when a scale magnification is applied that zooms in on a detected face to provide emphasis for a portion of a video segment (e.g., as discussed in further detail below), the computed location of the subject's face and/or body may be used in cropping portions of the video segments so that the subject's face and/or body is located within the frames of the video segment while providing a region in the frames of the video segments for the caption.

In some embodiments, the region of the frames of the video segments for the video caption in the trimmed video can be determined initially in order to crop, scale, and/or translate the portions of the video segments with respect to the computed location of the subject's face and/or body so that the subject's face and/or body is located within the remaining region of the frames of the video segments in the trimmed video. An example of cropping portions of the video segments so that the subject's face and/or body is located within the frames of the video segment while providing a region in the frames of the video segments for the caption is shown in FIG. 7J. In some embodiments, when there are there multiple computed locations of multiple subjects' faces and/or bodies, the computed location of all or some of the subjects' faces and/or bodies can be used to position all or some of the subjects in video segments of the trimmed video by cropping portions of the video segments so that all or some of the subjects' faces and/or bodies are located in the video segments while providing a region in the frames of the video segments for the caption.

In some embodiments, a scale magnification can be applied to a video segment with respect to the position of the face and shoulders of the subject and/or the positions of the faces and shoulders of multiple subjects. For example, in order to smooth the transition between video segments, a scale magnification may be applied to a video segment to zoom in on a position with respect to the face and shoulders of the subject while providing a buffer region (e.g., a band of pixels of a width surrounding the region) with respect to the detected face and shoulders of the subject in the frames of the video segment. In some embodiments, the buffer region above the detected face region of the subject is different than the buffer region below the detected shoulders of the subject. For example, the buffer region below the detected shoulders may be approximately 150% of the buffer region above the subject's detected face.

In some embodiments, a scale magnification can be applied to a video segment with respect to the position of the face of the subject and/or the positions of the faces of multiple subjects. For example, in order to provide emphasis on a portion of a video segment (e.g., as discussed in further detail below), a scale magnification may be applied to a video segment to zoom in on a position with respect to the face of the subject while providing a buffer region with respect to the detected face of the subject in the frames of the video segment. In some embodiments, in order to provide emphasis on a portion of a video segment, a scale magnification may be applied to a video segment to zoom in on a position with respect to the face and/or body of the subject that is speaking in the portion of the video segment. In some embodiments, in order to provide emphasis on a portion of a video segment, a scale magnification may be applied to a video segment to zoom in on a position with respect to the face and/or body of the subject that is not speaking to show the subject's reaction in the portion of the video segment.

In some embodiments, captioning video effects can be added to the assembled video segments of the trimmed video of the input video through the video editing application. For example, a prompt may be provided by the video editing application to a generative language model to identify portions of a transcript of the trimmed video which may be applied by the video editing application to corresponding video segments as captions. Examples of applying captions to corresponding video segments are shown in FIGS. 7D, 7E, 7G, 7H, 7J, 7K, and 7L.

In some embodiments, a prompt may be provided by the video editing application to a generative language model to identify phrases and/or words from portions of a transcript of the trimmed video which may be applied by the video editing application to corresponding video segments as captions. In this regard, the phrases and/or words identified by the language model can be utilized to provide emphasis on the phrases and/or words by utilizing the identified phrases and/or words in captions in the respective video segments. For example, the language model can be utilized to determine important sentences, quotes, words of interest, etc. to provide emphasis on the phrases and/or words. Examples of applying identified phrases and/or words in captions to corresponding video segments are shown in FIGS. 7G, 7J, and 7K. As shown in FIGS. 7G and 7J, the video editing application may highlight words within identified phrases as identified by a generative language model for additional emphasis. In some embodiments, the video editing application applies the identified phrases and/or words in an animated manner in that the identified phrases and/or words appear in video segment as the identified phrases and/or are spoken (e.g., utilizing the word-level timing of the transcript). In some embodiments, the length of the caption is limited in order to make sure the caption does not overflow.

In some embodiments, a prompt may be provided to a generative language model by the video editing application to summarize the identified phrases and/or words from portions of a transcript of the trimmed video to apply the summarized identified phrases and/or words to corresponding video segments as captions. An example of applying a summarized identified phrases and/or words in captions to corresponding video segments is shown in FIG. 7E. As shown in FIG. 7E, in some embodiments, the video editing application may insert an image relevant to the identified phrase and/or words into the video segment. For example, the video editing application may prompt a generative AI model to retrieve an image(s) and/or a video(s) from a library and/or generate an image(s) and/or a video(s) that is relevant to the identified phrase and/or words so that the video editing application can insert the retrieved and/or generated image and/or video into the video segment for additional emphasis of the identified phrase and/or words.

In some embodiments, a first prompt may be provided to a generative language model to identify important sentences from portions of a transcript of the trimmed video and a second prompt may be provided to the generative language model to identify phrases and/or words from the identified sentences to apply the identified phrases and/or words to corresponding video segments as captions. A specific example of a prompt to the generative language model to identify important sentences from portions of a transcript of the trimmed video is as follows:

PROMPT = ' I am working on producing a video to put on YouTube. I have recorded the video and converted it into a transcript for you, and I would like help extracting the pull quotes (important "sentences" from the presented text) and significant "words" in those sentences that I will overlay over the video to highlight.
We would like you to only pick a small number of specific, unique words that highlight the interesting parts of the sentence. Do not pick common, generic words like "and", "the", "that", "about", or "as" unless they are part of an important phrase like "dungeons and dragons". Do not pick more than ten important sentences from the transcript and at most three important words in a given sentence.
Only pick the most important sentences that are relevant to the topic of the transcript.
I will need you to repeat the exact sentence from the transcript, including punctuation, so I know when to display the sentence. Can you suggest to me places where quotes can help by extracting important sentences (pull quotes), but only if you think the quote would be useful to the viewer.
Here is an example of the JSON format I would like you to use to extract important sentences. This example shows two sentences separated by \n with their individual -continued

```
important words entries:
{"sentence": "It's important to watch air quality and weather forecasts and limit your
time outside if they look bad.", "words": ["air quality", "weather forecasts", "limit"]}
\n
{"sentence": "My background is in robotics, engineering and electrical engineering.",
"words":[ "robotics", "engineering", "electrical engineering"]}\n
Please make sure your response has "sentence" and "words" entries
If you do not find a quote that you think would be useful to viewers, please just say "No
quotes found." Here is the text I would like you to parse for important sentences and
important words:'; < TRANSCRIPT>
```

A specific example of a prompt to the generative language model to identify phrases and/or words from the identified sentences to apply the identified phrases and/or words to corresponding video segments as captions is as follows:

```
PROMPT = ' Find the important phrase from this sentence by ONLY pruning the
beginning of the sentence that's not important for a phrase in a pull quote.
Do not include common, generic words like "And", "So", "However", "Also",
"Therefore" at the beginning of the sentence, unless they are part of an important
phrase.
I will need you to repeat the exact sequence of the words including the punctuation from
the sentence as the important phrase after removing the unimportant words from the
beginning of the sentence.
Do not delete any words from the middle of the sentence until the end of the sentence.
Only prune the sentence from the beginning. Do not paraphrase. Do not change the
punctuation.
Also find important words to highlight in the extracted phrase sentence. For important
words, I would like you to only pick a small number of specific, unique words that
highlight the interesting parts of the phrase.
Do not pick common, generic words like "and", "the", "that", "about", or "as" unless
they are part of an important phrase like "dungeons and dragons". Do not pick more
than three important words in a given sentence.
Here is an example of the JSON format I would like you to use to extract important
phrase. This example shows a phrase with individual important words entries:
{"sentence": "Important to watch air quality and weather forecasts and limit your time
outside.", "words": ["air quality", "weather forecasts", "limit"]} \n
Please make sure your response has "sentence" and "words" entries.
Here is the text I would like you to parse for important phrase and important words:';
<TRANSCRIPT>
```

In some embodiments, a prompt may be provided by the video editing application to a generative language model to identify section headings from portions of a transcript of the trimmed video which may be applied by the video editing application to corresponding video segments as captions. For example, the trimmed video may include sets of video segments where each set of video segments is directed to a specific theme or topic. In this regard, the section headings for each set of video segments of the trimmed video identified by the language model can be utilized to provide an overview of a theme or topic of each set of video segments. The video editing application can display the section headings as a captions in the respective video segments (e.g., in a portion of the first video segment of each set of video segments of each section of the trimmed video) and/or display the section headings in the transcript to assist the end user in editing the trimmed video. Examples of applying section headings to corresponding video segments are shown in FIGS. 7D and 7H. In some embodiments, the video editing application may insert an image relevant to the section heading into the video segment. For example, the video editing application may prompt a generative AI model to retrieve an image(s) and/or a video(s) from a library and/or generate an image(s) and/or a video(s) that is relevant to the section heading so that the video editing application can insert the retrieved and/or generated image and/or video into the video segment for additional emphasis of the section heading.

A specific example of a prompt to the generative language model to identify section headings from portions of a transcript of the trimmed video is as follows:

```
PROMPT = ' The transcript is given as a list of + sentences_list.length + sentences
with ID.
Break the transcript into several contiguous segments and create a heading for each
segment that describes that segment.
Each segment needs to have a coherent theme and topic.
All segments need to have similar number of sentences. You must use all the sentences
provided.
Summarize each segment using a heading.
For example:
\n\nUse the following format: \n\n [{"headingName": string, "startSentenceId":
number, "endSentenceId": number}, \n {"headingName": string, "startSentenceId":
number, "endSentenceId": number} ,\n {"headingName": string, "startSentenceId":
```

-continued

```
number, "endSentenceId": number}] \n\n "Here is the full transcript. \n" +
sentences_list.map((s) => '${s["sentenceIndex"]}: ${s["text"]}').join("\n\n")'
<TRANSCRIPT>
```

In some embodiments, a prompt may be provided by the video editing application to a generative language model to identify a list(s) of items from portions of a transcript of the trimmed video which may be applied by the video editing application to corresponding video segments as captions. For example, a video segment of the trimmed video may include dialogue regarding a list of items. In this regard, the list of items discussed in the video segment of the trimmed video can be identified (e.g., extracted) by the language model (e.g., through the transcript provided to the language model) so that the video editing application can display the list as a caption in the respective video segment. An example of applying a list of items as a caption to corresponding video segments is shown in FIG. 7L. As shown in FIG. 7L, in some embodiments, the video editing application may insert images or an image relevant to the identified list into the video segment. For example, the video editing application may prompt a generative AI model to retrieve an image(s) and/or a video(s) from a library and/or generate an image(s) and/or a video(s) that is relevant to the identified list or items in the list so that the video editing application can insert the retrieved and/or generated image(s) and/or video into the video segment for additional emphasis of the list.

As further shown in FIG. 7L, in some embodiments, the video editing application may insert a background (e.g., transparent as shown in FIG. 7L or opaque) so that the list caption is more visible in the video segment. In some embodiments, the video editing application applies the items in the identified list of items of the caption in an animated manner in that the items of the list appear in video segment as the items of the list are spoken (e.g., utilizing the word-level timing of the transcript). In this regard, the video editing application prompts the generative language model to include timestamps for each item in the list of items from the transcript. In some embodiments, the video editing application applies the items in the identified list of items of the caption to the video segment at once, such as at the beginning of the video segment, after the list of items are spoken in the video segment, or at the end of the video segment.

In some embodiments, the video editing application applies the caption with a minimum hold time on the video segment so that the caption does not disappear too quickly. In some embodiments, the video editing application provides templates and/or settings so that the end user can specify the animation style of the caption. In some embodiments, the video editing application can automatically choose the animation style of the caption, such as based on the video content of the input video (e.g., whether the input video is serious video, such as a documentary or interview, or whether the input video is a social media post) or based on the target platform (e.g., such as a social media website).

In some embodiments, the prompt provided by the video editing application to the generative language model requests the generative language model to identify a title for the list(s) of items from portions of a transcript of the trimmed video. In this regard, the video editing application can apply the title as a caption in a corresponding video segment prior to and/or with the list of items. In some embodiments, only a portion of the transcript, such as a single paragraph of the transcript, is sent to the generative language model at a time in order to avoid overwhelming the short attention window of the generative language model.

A specific example of a prompt to the generative language model to identify a list from portions of a transcript of the trimmed video is as follows:

```
PROMPT = ' I am working on producing a video to put on YouTube. I have recorded
the video and converted it into a transcript for you, and I would like help extracting
"list-structured content" that I will overlay over the video. This is content where I either
directly or indirectly give a list of items, and I would like to display the list elements in
the video in the list, one at a time. I will give you a paragraph from the transcript.
Please find at most one list in this paragraph, but only if you think the list would be
useful to the viewer. I will need you to repeat the exact first sentence from the transcript,
including punctuation, so I know when to start displaying the list. Here is an example
of the JSON format I would like you to use: { "sentence": "According to the domain
system, the tree of life consists of three domains: Archaea, Bacteria, and Eukarya,
which together form all known cellular life. ", "title" : "Domains of Life", "elements"
: [ "Archaea", "Bacteria", "Eukarya" ] } Please make sure your response has
"sentence", "title", and "elements" entries. If you do not find a list that you think
would be useful to viewers, please just say "No list found." All lists should have at least
three elements. Here is the paragraph I would like you to parse for lists:'
<TRANSCRIPT>
```

In some embodiments, the video editing application performs post-processing to ensure that the identified list of items are located in the transcript by searching the transcript for each item and/or confirm the timestamps of the list of items. In some embodiments, if the identified list of items, or a portion thereof, cannot be located in the original transcript, the video editing application can search for matching strings in the transcript, such as through Needleman-Wunsch algorithm to identify the list of items.

In some embodiments, face-aware captioning video effects can be added to the assembled video segments of the trimmed video of the input video through the video editing application. For example, the video editing application may compute the location of each subject's face and/or body (e.g., or portion of the subject's body, such as shoulders) in each video segment of the trimmed video. In this regard, the captions applied by the video editing application to corresponding video segments can be placed on the frames of the video segment with respect to the location of the subject's face and/or body of the video segment. In some embodiments, the region of the frames of the video segments for the video caption in the trimmed video can be determined initially in order to crop, scale, and/or translate the portions of the video segments with respect to the computed location of the subject's face and/or body so that the subject's face and/or body is located within the remaining region of the frames of the video segments in the trimmed video. Examples of applying captions to corresponding video segments with respect to the location of the subject's face and/or body are shown in FIGS. 7J and 7K.

For example, as can be understood from FIG. 7J, the language model may identify a phrase from the transcript for emphasis along with words within the phrase for additional emphasis. In this regard, the video editing application initially automatically crops the frame for the portion of the video segment in order to apply the caption on the right side of the frame. Subsequently, the video editing application automatically shifts the portion of the video segment to the left side of the frame and applies a scale magnification that zooms in on a detected face to provide emphasis during the portion of a video segment in which the phrase is spoken.

As another example, as can be understood from FIG. 7K, the language model identifies a phrase from the transcript for emphasis along with words within the phrase for additional emphasis. In this regard, the video editing application automatically crops the right half of the frame of the portion of the video segment, inserts an opaque background, and applies the caption. Subsequently, the video editing application automatically shifts the portion of the video segment to the left side of the frame and applies a scale magnification that zooms in on a detected face to provide emphasis during the portion of a video segment in which the phrase is spoken.

In some embodiments, captions applied with respect to a detected face and/or body of a subject may additionally or alternatively utilize saliency detection for placement of captions. For example, the video editing application may utilize saliency detection to avoid placing captions in certain regions of video segment(s) of the trimmed video, such as regions where objects are moving or on top of other text. In some embodiments, the video editing application may utilize saliency detection over a range of video segments of the trimmed video to identify a location in the range of video segments for placement of captions. In some embodiments, an end user may select, and/or the video editing application may automatically apply, visualization templates and/or settings for the placement of captions. For example, the visualization templates and/or settings may specify settings, such as the location of the captions with respect to a detected face and/or body of the subject of the video segments, opacity of overlay for the caption, color, font, formatting, video resolution (e.g., vertical/horizontal), and/or settings for a target platform (e.g., a social media platform.

Advantageously, efficiencies of computing and network resources can be enhanced using implementations described herein. In particular, the automated video editing processes as described herein provides for a more efficient use of computing and network resources, such as reduced computer input/output operations, and reduced network operations, resulting in higher throughput, less packet generation costs and reduced latency for a network, than conventional methods of video editing. Therefore, the technology described herein conserves computing and network resources.

Example Video Editing Environment

Referring now to FIG. 1A, a block diagram of example environment 100 suitable for use in implementing embodiments of the invention is shown. Generally, environment 100 is suitable for video editing or playback, and, among other things, facilitates visual scene extraction, scene captioning, diarized and timestamped transcript generation, transcript sentence segmentation, transcript and scene caption alignment (e.g., augmented transcript generation), generative language model prompting (e.g., for a video summarization or a rough cut), transcript sentence selection based on output of the generative language model, scene caption selection based on output of the generative language model, face and/or body tracking, video effects application, video navigation, video or transcript editing, and/or video playback. Environment 100 includes client device 102 and server 150. In various embodiments, client device 102 and/or server 150 are any kind of computing device, such as computing device 1800 described below with reference to FIG. 18. Examples of computing devices include a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, some combination thereof, or any other suitable computer device.

In various implementations, the components of environment 100 include computer storage media that stores information including data, data structures, computer instructions (e.g., software program instructions, routines, or services), and/or models (e.g., machine learning models) used in some embodiments of the technologies described herein. For example, in some implementations, client device 102, generative AI model 120, server 150, and/or storage 130 may comprise one or more data stores (or computer data memory). Further, although client device 102, server 150, generative AI model 120, and storage 130 are each depicted as a single component in FIG. 1A, in some embodiments, client device 102, server 130, generative AI model 120, and/or storage 130 are implemented using any number of data stores, and/or are implemented using cloud storage.

The components of environment 100 communicate with each other via a network 103. In some embodiments, network 103 includes one or more local area networks (LANs), wide area networks (WANs), and/or other networks. Such networking environments are commonplace in offices, enterprise-wide computer networks, intranets, and the Internet.

In the example illustrated in FIGS. 1A and 1B, client device 102 includes video interaction engine 108, and server 150 includes video ingestion tool 160. In various embodiments, video interaction engine 108, video ingestion tool 160, and/or any of the elements illustrated in FIGS. 1A and 1B are incorporated, or integrated, into an application(s) (e.g., a corresponding application on client device 102 and server 150, respectively), or an add-on(s) or plug-in(s) to an application(s). In some embodiments, the application(s) is any application capable of facilitating video editing or playback, such as a stand-alone application, a mobile application, a web application, and/or the like. In some implementations, the application(s) comprises a web application, for example, that may be accessible through a web browser, hosted at least partially server-side, and/or the like. Additionally or alternatively, the application(s) include a dedicated application. In some cases, the application is integrated into an operating system (e.g., as a service). Example video editing applications include ADOBE PREMIERE PRO and ADOBE PREMIERE ELEMENTS. Although some embodiments are described with respect to a video editing application and a video interaction engine, some embodiments implement aspects of the present techniques in any type of applications, such as those involving transcript processing, visualization, and/or interaction.

In various embodiments, the functionality described herein is allocated across any number of devices. In some embodiments, video editing application 105 is hosted at least partially server-side, such that video interaction engine 108 and video ingestion tool 160 coordinate (e.g., via network 103) to perform the functionality described herein. In another example, video interaction engine 108 and video ingestion tool 160 (or some portion thereof) are integrated into a common application executable on a single device. Although some embodiments are described with respect to an application(s), in some embodiments, any of the functionality described herein is additionally or alternatively integrated into an operating system (e.g., as a service), a server (e.g., a remote server), a distributed computing environment (e.g., as a cloud service), and/or otherwise. These are just examples, and any suitable allocation of functionality among these or other devices may be implemented within the scope of the present disclosure.

To begin with a high-level overview of an example workflow through the configuration illustrated in FIGS. 1A and 1B, client device 102 is a desktop, laptop, or mobile device such as a tablet or smart phone, and video editing application 105 provides one or more user interfaces. In some embodiments, a user accesses a video through video editing application 105, and/or otherwise uses video editing application 105 to identify the location where a video is stored (whether local to client device 102, at some remote location such as storage 130, or otherwise). Additionally or alternatively, a user records a video using video recording capabilities of client device 102 (or some other device) and/or some application executing at least partially on the device (e.g., ADOBE BEHANCE). In some cases, video editing application 105 uploads the video (e.g., to some accessible storage 130 for video files 131) or otherwise communicates the location of the video to server 150, and video ingestion tool 160 receives or access the video and performs one or more ingestion functions on the video.

In some embodiments, video ingestion tool 160 extracts various features from the video (e.g., visual scenes, scenes, diarized and timestamped transcript 133, transcript sentences, video segments 135, transcript and scene caption for augmented transcript 134), and generates and stores a representation of the detected features, corresponding feature ranges where the detected features are present, and/or corresponding confidence levels (e.g., video ingestion features 132).

In some embodiments, scene extraction component 162 causes the extraction of each of the visual scenes of the input video of video files 131 with corresponding start times and end times for each visual scene of the input video. For example, after the input video is accessed by video ingestion tool 160, scene extraction component 162 may communicate with a language-image pretrained model 121 to compute the temporal segmentation of each visual scene of the input video. In this regard, each visual scene of the input video is computed based on the similarity of frame embeddings of each corresponding frame of each visual scene by the language-image pretrained model 121. Each frame with similar frame embeddings are clustered into a corresponding visual scene by the language-image pretrained model 121.

The start times and end times for each visual scene of the input video can then be determined by scene extraction component 162 based on the clustered frames for each visual scene. Data regarding the visual scenes of the input video can be stored in any suitable storage location, such as storage 130, client device 102, server 150, some combination thereof, and/or other locations as video segments 135.

In some embodiments, the scene captioning component 163 causes the extraction of corresponding scene captions for each of the visual scenes of the input video. For example, scene captioning component 163 may communicate with an image caption generator model 122 and the image caption generator model 122 generates a caption (e.g., a scene caption) for a frame from each visual scene of the input video. In some embodiments, a center frame from each visual scene of the input video is selected by scene captioning component 163 and utilized by the image caption generator model 122 to generate the scene caption for each corresponding visual scene of the input video. Examples of visual scenes with corresponding scene captions is shown in FIG. 3. As can be understood from example extracted scene and scene captions 300, each visual scene 310 includes a corresponding caption 320 generated by an image caption generator model 122. Data regarding the scene captions for the visual scenes of the video segments 135 of the input video can be stored in any suitable storage location, such as storage 130, client device 102, server 150, some combination thereof, and/or other locations.

In some embodiments, video transcription component 164 causes the extraction of a diarized and timestamped transcript 133 for the input video. For example, video transcription component 164 may communicate with an ASR model 123 to transcribe the input video with speaker diarization and word-level timing in order to extract the diarized and timestamped transcript 133 for the input video. An example of a diarized transcript and word-level timing with corresponding frames of each visual scene is shown in FIG. 4. As can be understood from example diarized transcript with word level timing 400, each visual scene 410 includes a scene transcription and timing 430, along with the corresponding speaker thumbnail 420. Data regarding the diarized and timestamped transcript 133 of the input video, along with the corresponding video segments 135, can be stored in any suitable storage location, such as storage 130, client device 102, server 150, some combination thereof, and/or other locations.

In some embodiments, sentence segmentation component 165 causes the segmentation of the diarized and timestamped transcript 133 for the input video into sentences along with the start time and end time, along with the previously computed speaker identification of each sentence of the transcript 133. For example, sentence segmentation component 165 may communicate with a sentence segmentation model 124 to segment the diarized and timestamped transcript 133 for the input video into sentences. Data regarding the sentence segmentation and speaker identification for each sentence of the diarized and timestamped transcript 133 of the input video, along with the corresponding video segments 135, can be stored in any suitable storage location, such as storage 130, client device 102, server 150, some combination thereof, and/or other locations.

In some embodiments, the video editing application generates an augmented transcript 134 by aligning the visual scene captions (e.g., from scene captioning component 163) of each visual scene with the diarized and timestamped transcript 133 for the input video. For example, the augmented transcript 134 may include each scene caption for each visual scene followed by each sentence and a speaker ID for each sentence of the transcript for the visual scene. An example of an augmented transcript 500 is shown in FIG. 5. As can be understood from the example augmented transcript of FIG. 5, each scene is followed by the dialogue within the scene. The corresponding transcription/caption 520 associated with each scene and/or speaker 520 is provided. Data regarding the augmented transcript 134, along with the corresponding video segments 135, can be stored in any suitable storage location, such as storage 130, client device 102, server 150, some combination thereof, and/or other locations.

In an example embodiment, video editing application 105 (e.g., video interaction engine 108) provides one or more user interfaces with one or more interaction elements that allow a user to interact with the ingested video, for example, using interactions with transcript 133 or augment transcript 134 to select a video segment (e.g., having boundaries from video segments 135 corresponding to a selected region of transcript 133 or augmented transcript 134). FIG. 1B illustrates an example implementation of video interaction engine 108 comprising video selection tool 110 and video editing tool 111.

In an example implementation, video selection tool 110 provides an interface that navigates a video and/or file library, accepts input selecting one or more videos (e.g., video files 192), and triggers video editing tool 111 to load one or more selected videos (e.g., ingested videos, videos shared by other users, previously created clips) into a video editing interface. In some implementations, the interface provided by video selection tool 110 presents a representation of a folder or library of videos, accepts selection of multiple videos from the library, creates a composite clip with multiple selected videos, and triggers video editing tool 111 to load the composite clip into the video editing interface. In an example implementation, video editing tool 111 provides a playback interface that plays the loaded video, a transcript interface (provided by transcript scroll tool 112C) that visualizes transcript 133 or augment transcript 134, and a search interface (provided by video search tool 112E) that performs a visual and/or textual search for matching video segments within the loaded video.

In some embodiments, video segment tool 112 includes a selection tool 112F that accepts an input selecting individual sentences or words from transcript 133 or augment transcript 134 (e.g., by clicking or tapping and dragging across the transcript), and identifies a video segment with boundaries that snap to the locations of previously determined boundaries (e.g., scenes or sentences) corresponding to the selected sentences and/or words from transcript 133 or augment transcript 134. In some embodiments, video segment tool 112 includes video thumbnail preview component 112A that displays each scene or sentence of transcript 133 or augment transcript 134 with one or more corresponding video thumbnails. In some embodiments, video segment tool 112 includes speaker thumbnail component 112B that associates and/or displays each scene or sentence of transcript 133 or augment transcript 134 with a speaker thumbnail. In some embodiments, video segment tool 112 includes transcript scroll tool 112C that auto-scrolls transcript 133 or augment transcript 134 while the video plays back (e.g., and stops auto-scroll when the user scrolls transcript 133 or augment transcript 134 away from the portion being played back, and/or resumes auto-scroll when the user scrolls back to a portion being played back). In some embodiments, video segment tool 112 includes headings tool 112D that inserts section headings (e.g., through user input or automatically through section heading prompt component 196B and captioning effect insertion component 198) within transcript 133 or augment transcript 134 without editing the video and provides an outline view that navigates to corresponding parts of the transcript 133 or augment transcript 134 (and video) in response to input selecting (e.g. clicking or tapping on) a heading.

Depending on the implementation, video editing tool 115 and/or video interaction engine 108 performs any number and variety of operations on selected video segments. By way of non-limiting example, selected video segments are played back, deleted, trimmed, rearranged, exported into a new or composite clip, and/or other operations. Thus, in various embodiments, video interaction engine 108 provides interface functionality that allows a user to select, navigate, play, and/or edit a video based on interactions with transcript 133 or augment transcript 134.

Example Video Assembly Techniques

Returning to FIG. 1A, in some embodiments, video summarization component 170 performs one or more video editing functions to create a summarized version (e.g., assembled video files 136) of a larger input video (e.g., video files 131), such as generative language model prompting, transcript and scene selection based on a summary generated by the generative language model, and/or assembly of video segments into a trimmed video corresponding to a summarized version of the input video. In some embodiments, the video editing application generates multiple trimmed videos corresponding to different summaries of the input video. Although these functions are described as being performed after ingestion, in some cases, some or all of these functions are performed at any suitable time, such as when ingesting or initially processing a video, upon receiving a query, when displaying a video timeline, upon activing a user interface, and/or at some other time.

In the example illustrated in FIG. 1A, in some embodiments, after the user selects the option (e.g., video summarization tool 113 of FIG. 1B) in the video editing application 105 to create a summarized version of the larger input video, video summarization component 170 causes a generative language model 125 to generate a summary of the augmented transcript 134. Data regarding the summary of the augmented transcript 134 generated by generative language model 125 can be stored in any suitable storage location, such as storage 130, client device 102, server 150, some combination thereof, and/or other locations.

For example, video summarization component 170 may provide the augmented transcript 134 with a prompt from summarization prompt component 172 to the generative language model 125 to summarize the augmented transcript (e.g., and any other information, such as a user query from user query prompt tool 113A and/or desired summary length from user length prompt tool 113B of FIG. 1B). In some embodiments, the prompt from summarization prompt component 172 requests the generative language model 125 to make minimum changes to the sentences of the augment transcript in the summary generated by the generative language model 125. A specific example of a prompt from summarization prompt component 172 to the generative language model 125 to summarize the augmented transcript 134 is as follows:

```
Prompt = ("The following document is the transcript and scenes of a video. The video
has " + str(num_of_scenes) + " scenes. " +
"I have formatted the document like a film script. "
"Please summarize the following document focusing on " "\"" + USER_QUERY + "\""
" by extracting the sentences and scenes related to " "\"" + USER_QUERY + "\""
" from the document. " +
"Return the sentences and scenes that should be included in the summary. "
"Only use the exact sentences and scenes from the document in the summary. " +
"Do not add new words and do not delete any words from the original sentences. " +
"Do not rephrase the original sentences and do not change the punctuation. " + "\n" +
"The summary should contain about " + str(num_summary_sentences) +
" selected scenes and sentences." + "\n" +
" [DOCUMENT] " + augmented_transcript + " [END OF DOCUMENT]"
)
```

In some embodiments, after the generative language model 125 generates a summary of the augmented transcript 134, sentence and scene selection component 174 causes the selection of sentences from the diarized and timestamped transcript 133 and the scene captions (e.g., generated by scene captioning component 164) of the visual scenes that match each sentence of the summary. Sentence and scene selection component 174 may use any algorithm, such as any machine learning model, to select sentences and/or captions from the transcript 133 and/or augmented transcript 134. Data regarding the selected scenes and captions can be stored in any suitable storage location, such as storage 130, client device 102, server 150, some combination thereof, and/or other locations. Utilizing the selected scenes and captions from sentence and scene selection component 174, summary assembly component 176 identifies corresponding video segments from the selected sentences of the transcript and scene captions and assembles the corresponding video segments into a trimmed video (e.g., assembled video files 136) corresponding to a summarized version of the input video. Data regarding the trimmed video can be stored in any suitable storage location, such as storage 130, client device 102, server 150, some combination thereof, and/or other locations.

In some embodiments, sentence and scene selection component 174 compares each sentence embedding of each sentence of the summary (e.g., as generated by generative language model 125) to each sentence embedding (e.g., such as vector of size 512 of each sentence) of each sentence of the diarized and timestamped transcript 133 (or augmented transcript 134) and each sentence embedding of each scene caption of the visual scenes in order to determine sentence to sentence similarity, such as cosine similarity between the sentence embeddings. In this regard, for each sentence of the summary, sentence and scene selection component 174 selects the sentence from the transcript 133 (or augmented transcript 134) or the scene captions of the visual scenes that is the most similar to the sentence from the summary generated by the generative language model 125. In some embodiments, sentence and scene selection component 174 compares the rouge score between each sentence of the summary generated by generative language model 125 and sentences from transcript 133 or augmented transcript 134 and the scene captions of the visual scenes to select the most similar sentences from transcript 133 or augmented transcript 134 and the scene captions of the visual scenes.

In some embodiments, sentence and scene selection component 174 scores each sentence of the diarized and time-stamped transcript and each scene caption of the visual scenes with respect to each sentence of the summary in order to select the top n similar sentences. In this regard, as the top n similar sentences are selected by sentence and scene selection component 174, the length of the final summary is flexible based on the final sentence selected from the top n similar sentences. For example, sentence and scene selection component 174 may provide the top n similar sentences selected from the diarized and timestamped transcript and/or scene captions for each sentence of the summary, along with the start times and end times of each of the top n similar sentences, to a generative language model 125. Sentence and scene selection component 174 can also provide the desired length of the final trimmed video corresponding to the summarized version of the input video (e.g., as input from video length prompt tool 113B of FIG. 1B). In this regard, the generative language model 125 can identify each sentence from the transcript and/or scene captions most similar to each sentence of the summary while also taking into the desired length of the final trimmed video. Sentence and scene selection component 174 can the selected the identified sentences and/or scene caption for inclusion in the trimmed video by summary assembly component 176.

An example diagram of a model implemented to compare sentences of a summary to transcript sentences and scene captions to generate a summarized video is shown in FIG. 6. As shown, each sentence of the summary 602 (e.g., as generated by generative language model 125) is compared to sentences from the transcript 604 to compare and score the similarity of the sentences at block 606. Each sentence of the summary 602 (e.g., as generated by generative language model 125) is compared to scene captions 610 (e.g., as generated by scene captioning component 163) to compare and score the similarity of the captions to the sentences at block 612. Summary generator 618 receives: (1) the corresponding score of each sentence of the transcript for each sentence of the summary; (2) the corresponding score of each scene caption for each sentence of the summary; and (3) the desired length of the trimmed video (e.g., as input from video length prompt tool 113B of FIG. 1B). Summary generator 618 then generates a summary with each of the selected sentences from the transcript and/or scene captions.

In some embodiments, sentence and scene selection component 174 causes the generative language model 125 to select scenes from the scene captions of the visual scenes that match each sentence of the summary for assembly by summary assembly component 176. For example, the sentence and scene selection component 174 may provide the generated summary of the augmented transcript, and the scene captions of the visual scenes, with a prompt to the generative language model 125 to select visual scenes that match the summary for assembly summary assembly component 176. A specific example of a prompt from sentence and scene selection component 174 to the generative language model 125 to select visual scenes for assembly by summary assembly component 176 is as follows:

```
Prompt = ("The following is the summary of a video. " + "\n" +
"[SUMMARY] " + summary + " [END OF SUMMARY]"
"Given the following scenes from the video, please select the ones that
match the summary. " +
" Return the scene numbers that should be included in the summary as a
list of numbers. " + "\n" +
"[SCENES CAPTIONS] " + scenes + " [END OF SCENES
CAPTIONS]"
)
```

In some embodiments, following summary assembly component 176 identifying corresponding video segments from the selected sentences of the transcript and scene captions (e.g., as selected by sentence and scene selection component 174) to assemble the video segments into a trimmed video, summary assembly component 176 performs post-processing to snap the interval boundaries to the closest sentence boundary so that the identified video segments do not cut in the middle of a sentence.

In an example embodiment, FIG. 1B illustrates an example implementation of video interaction engine 108 comprising video editing tool 111. In an example implementation, video editing tool 111 provides an interface that allows a user to select the option in the video editing application 105 to create a summarized version of the larger input video through video summarization tool 113. In some embodiments, video summarization tool 113 provides a video length prompt tool 113B that provides an interface that allows a user to provide a desired length of the smaller trimmed video. In some embodiments, video summarization tool 113 provides a user query prompt tool 113A that provides an interface that allows a user to provide a query for the creation of the smaller trimmed video. For example, the end user may provide a query through user query prompt tool 113A to designate a topic for the smaller trimmed video. As another example, the end user can provide a query through user query prompt tool 113A to characterize a type of video or a storyline of the video, such as an interview, for the smaller trimmed video. In this regard, the end user can provide a prompt through user query prompt tool 113A to designate the focus of the smaller trimmed video from the larger input video.

An example diagram of a model implemented to create a summarized version of the larger input video is shown in FIG. 2. As shown in FIG. 2, model 200 receives input 202 including the input video 204, an input query 206 (e.g., as input through user query prompt tool 113A), and/or a desired length 208 (e.g., as input through video length prompt tool 113B). A diarized transcript 210 with word-level timing is generated by an ASR model 214 based on the input video 204. Visual scene boundaries (e.g., including the start and end time of each visual scene) along with clip captions 212 are generated by clip captioning model 210 based on the input video 204. The transcript 210 and the visual scene boundaries and clip captions 212 are aligned and combined in block 216 to generate an augmented transcript. A language model 220 generates an abstractive summary 222 based on the augmented transcript 218.

The transcript 210 is segmented into transcript sentences 226 by sentence segmentation model 226 in order to select the sentences that best match each sentence of abstractive summary 226 by sentence selector 228. Sentence selector generates an extractive summary 240 based on the selected sentences. Scene selector 232 receives clip captions 212 to select selected scenes 236 that best match the abstractive summary 222. The extractive summary 230 and the selected scenes 236 are received in the post-processing and optimization block 234 in order select the video segments that correspond to each sentence and scene. Post-processing and optimization block 234 also snaps the interval boundaries to the closest sentence boundary for each selected video segment so that the selected video segments do not cut in the middle of a sentence. The selected video segments are assembled in to a shortened video 238 of the input video 204 and output 240 to the end user for display and/or editing.

Returning to FIG. 1A, in some embodiments, video rough cut component 180 performs one or more video editing functions to create a rough cut version (e.g., assembled video files 136) of a larger input video (e.g., video files 131), such as generative language model prompting, transcript and scene selection based on output of the generative language model, and/or assembly of video segments into a trimmed video corresponding to a rough cut version of the input video. Although these functions are described as being performed after ingestion, in some cases, some or all of these functions are performed at any suitable time, such as when ingesting or initially processing a video, upon receiving a query, when displaying a video timeline, upon activing a user interface, and/or at some other time.

In the example illustrated in FIG. 1A, in some embodiments, after the user selects the option (e.g., video rough cut tool 114 of FIG. 1B) in the video editing application to create a rough cut of the larger input video, video rough cut component 180 causes a generative language model 125 to extract sentences and/or captions that characterize a rough cut of the input video from the transcript 133 or augmented transcript 134 (e.g., as segmented by sentence segmentation component 165). In some embodiments, the video editing application generates multiple trimmed videos corresponding to different rough cuts of the input video. Data regarding the sentences and/or captions extracted by generative language model 125 (e.g., such as a rough cut transcript) can be stored in any suitable storage location, such as storage 130, client device 102, server 150, some combination thereof, and/or other locations.

For example, rough cut prompt component 182 may provide the transcript 133 with a prompt to the generative language model to extract portions of the transcript 133 (e.g., sentences of the transcript and/or scene captions) to generate a rough cut transcript based on the transcript 133 of the input video. In some embodiments, the prompt to the generative language can include additional information corresponding to the request to extract portions of the transcript 133 of the rough cut, such as a user query (e.g., through user query prompt tool 114A of FIG. 1B) and/or desired length of the rough cut (e.g., through video length prompt tool 114B of FIG. 1B). A specific example of a prompt from rough cut prompt component 182 to the generative language model 125 to extract portions of the transcript 133 as a rough cut transcript based on the transcript 133 of the input video is as follows:

```
Prompt = ("This is the transcript of a video interview with a person. " +
"Cut down the source video to make a great version where " +
"the person introduces themselves, talks about their experience as an " +
"intern and what they like about their work. \n\n " +
"The transcript is given as a list of sentences with ID. " +
"Only return the sentence IDs to form the great version. " +
"Do not include full sentences in your reply. " +
"Only return a list of IDs. \n\n " +
"Use the following format: \n . " +
"``` " +
"[1, 4, 45, 100]" +
"```\n\n " +
)
```

In some embodiments, following rough cut assembly component 184 identifying corresponding video segments from the extracted portions of the transcript 133 to assemble the video segments into a trimmed video, rough cut assembly component 184 performs post-processing to snap the interval boundaries to the closest sentence boundary so that the identified video segments do not cut in the middle of a sentence. Data regarding the trimmed video can be stored in any suitable storage location, such as storage 130, client device 102, server 150, some combination thereof, and/or other locations.

In an example embodiment, FIG. 1B illustrates an example implementation of video interaction engine 108 comprising video editing tool 111. In an example implementation, video editing tool 111 provides an interface that allows a user to select the option in the video editing application 105 to create a rough cut version of the larger input video through video rough cut tool 114. In some embodiments, video rough cut tool 114 provides a video length prompt tool 114B that provides an interface that allows a user to provide a desired length of the smaller trimmed video. In some embodiments, video rough cut tool 114 provides a user query prompt tool 114A that provides an interface that allows a user to provide a query for the creation of the smaller trimmed video. For example, the end user may provide a query through user query prompt tool 114A to designate a topic for the smaller trimmed video. As another example, the end user can provide a query through user query prompt tool 114A to characterize a type of video or a storyline of the video, such as an interview, for the smaller trimmed video. In this regard, the end user can provide a prompt through user query prompt tool 114A to designate the focus of the smaller trimmed video from the larger input video.

Example Video Effects Techniques

Returning to FIG. 1A, in some embodiments, video effects component 190 performs one or more video editing functions to apply video effects to a trimmed video (e.g., assembled video files 136) of a larger input video (e.g., video files 131), such as face and/or body tracking, scale magnification of frames of video segments, generative language model prompting for captioning effects, captioning effects insertion, face-aware captioning effects insertion, and/or image selection for inclusion with the captioning effects. Although these functions are described as being performed after ingestion, in some cases, some or all of these functions are performed at any suitable time, such as when ingesting or initially processing a video, upon receiving a query, when displaying a video timeline, upon activing a user interface, and/or at some other time. Data regarding the video effects applied to video segments of the trimmed video can be stored in any suitable storage location, such as storage 130, client device 102, server 150, some combination thereof, and/or other locations.

In the example illustrated in FIG. 1A, in some embodiments, face-aware scale magnification can be applied to video segments of the trimmed video by face-aware scale magnification component 192. In this regard, applying scale magnification to simulate a camera zoom effect by face-aware scale magnification component 192 hides shot cuts for changes between video segments of the trimmed video with respect to the subject's face. For example, as the trimmed video transitions from one video segment to the next video segment, a scale magnification may be applied by face-aware scale magnification component 192 that zooms in on a detected face at a boundary between the video segments to smooth the transition between video segments.

As a more specific example, the original shot size (e.g., without scale magnification applied) of the input video may be utilized for the first contiguous video segment of the trimmed video. Following an audio cut, such as a transition from one video segment to the next video segment of the trimmed video as each video segment corresponds to different sentences at different times of the input video, a scale magnification may be applied by face-aware scale magnification component 192 to the next video segment that zooms in on a detected face at a boundary between the video segments to smooth the transition between video segments. Following a subsequent audio cut to the subsequent video segment of the trimmed video, the original shot size (e.g., or a different scale magnification may be applied by face-aware scale magnification component 192) to smooth the transition between video segments. Examples of applying scale magnification that zooms in on a detected face at a boundary between the video segments to smooth the transition between video segments are shown in FIGS. 7F-7H.

In some embodiments, face and/or body tracking component 191 can compute the location of each subject's face and/or body (e.g., or portion of the subject's body, such as shoulders) in each video segment of the trimmed video. In some embodiments, face and/or body tracking component 191 can compute the location of each subject's face and/or body in the input video after accessing the input video before assembling the trimmed video. In an example implementation, to perform face and/or body detection and/or tracking, given a video, face and/or body tracking component 191 detects all faces (e.g., identifies a bounding box for each detected face), tracks them over time (e.g., generates a face track), and clusters them into person/face identities (e.g., face IDs). More specifically, in some embodiments, face and/or body tracking component 191 triggers one or more machine learning models to detect unique faces from video frames of a video. In some embodiments, face and/or body tracking component 191 can compute the location of each subject's face and/or body in the input video based on the corresponding subject that is speaking in the portion of the video segment.

In some embodiments, the computed location of the subject's face and/or body by face and/or body tracking component 191 can be used by face-aware scale magnification component 192 to position the subject at the same relative position in video segments of the trimmed video by cropping portions of the video segments so that the subject's face and/or body remains at the same relative position in the video segments. For example, when a scale magnification is applied by face-aware scale magnification component 192 that zooms in on a detected face at a boundary between the video segments to smooth the transition between video segments, the subject may be positioned by face-aware scale magnification component 192 at the same relative position by cropping the video segments with respect to the computed location of the subject's face and/or body (e.g., as computed by face and/or body tracking component 191). Examples of cropping portions of the video segments so that the subject's face and/or body remains at the same relative position in the video segments are shown in FIGS. 7F-7H. As can be understood from FIGS. 7F-7H, the subject remains in the same relative horizontal position between video segments. In some embodiments, when there are there multiple computed locations of multiple subjects' faces and/or bodies, the computed location of the speaker's face and/or body by face and/or body tracking component 191 can be used by face-aware scale magnification component 192 to position the speaker at the same relative position in video segments of the trimmed video by cropping portions of the video segments so that the speaker's face and/or body remains at the same relative position in the video segments. In some embodiments, when there are there multiple computed locations of multiple subjects' faces and/or bodies, the computed location of all or some of the subjects' faces and/or bodies by face and/or body tracking component 191 can be used by face-aware scale magnification component 192 to position all or some of the subjects (e.g., all of the subjects in the video segment, only the subjects that are speaking the video segment, each subject that is speaking in each portion, etc.) in video segments of the trimmed video by cropping portions of the video segments so that all or some of the subjects' faces and/or bodies remain in the video segments.

In some embodiments, the computed location of the subject's face and/or body by face and/or body tracking component 191 can be used by face-aware scale magnification component 192 to position the subject at a position relative to video captions in video segments of the trimmed video by cropping portions of the video segments so that the subject's face and/or body is located within the frames of the video segment while providing a region in the frames of the video segments for the caption. For example, when a scale magnification is applied by face-aware scale magnification component 192 that zooms in on a detected face to provide emphasis for a portion of a video segment (e.g., as discussed in further detail below), the computed location of the subject's face and/or body (e.g., as computed by face and/or body tracking component 191) may be used in cropping portions of the video segments so that the subject's face and/or body is located within the frames of the video segment while providing a region in the frames of the video segments for the caption. In some embodiments, the region of the frames of the video segments for the video caption in the trimmed video can be determined initially by face-aware scale magnification component 192 in order to crop, scale, and/or translate the portions of the video segments with respect to the computed location of the subject's face and/or body by face-aware scale magnification component 192 so that the subject's face and/or body is located within the remaining region of the frames of the video segments in the trimmed video. An example of cropping portions of the video segments so that the subject's face and/or body is located within the frames of the video segment while providing a region in the frames of the video segments for the caption is shown in FIG. 7J. In some embodiments, when there are there multiple computed locations of multiple subjects' faces and/or bodies, the computed location of all or some of the subjects' faces and/or bodies by face and/or body tracking component 191 can be used by face-aware scale magnification component 192 can be used to position all or some of the subjects in video segments of the trimmed video by cropping portions of the video segments so that all or some of the subjects' faces and/or bodies are located in the video segments while providing a region in the frames of the video segments for the caption.

In some embodiments, a scale magnification can be applied by face-aware scale magnification component 192 to a video segment with respect to the position of the face and shoulders of the subject and/or the positions of the faces and shoulders of multiple subjects. For example, in order to smooth the transition between video segments, a scale magnification may be applied to a video segment by face-aware scale magnification component 192 to zoom in on a position with respect to the face and shoulders of the subject while providing a buffer region (e.g., a band of pixels of a width surrounding the region) with respect to the detected face and shoulders of the subject in the frames of the video segment. In some embodiments, the buffer region above the detected face region of the subject is different than the buffer region below the detected shoulders of the subject. For example, the buffer region below the detected shoulders may be approximately 150% of the buffer region above the subject's detected face.

In some embodiments, a scale magnification can be applied to a video segment by face-aware scale magnification component 192 with respect to the position of the face of the subject and/or the positions of the faces of multiple subjects. For example, in order to provide emphasis on a portion of a video segment (e.g., as discussed in further detail below), a scale magnification may be applied to a video segment by face-aware scale magnification component 192 to zoom in on a position with respect to the face of the subject while providing a buffer region with respect to the detected face of the subject in the frames of the video segment. In some embodiments, in order to provide emphasis on a portion of a video segment, a scale magnification may be applied to a video segment by face-aware scale magnification component 192 to zoom in on a position with respect to the face and/or body of the subject that is speaking in the portion of the video segment. In some embodiments, in order to provide emphasis on a portion of a video segment, a scale magnification may be applied to a video segment by face-aware scale magnification component 192 to zoom in on a position with respect to the face and/or body of the subject that is not speaking to show the subject's reaction in the portion of the video segment.

In some embodiments, captioning video effects can be added to the assembled video segments of the trimmed video of the input video by captioning effects component 194. For example, a prompt may be provided by captioning effects component 194 to a generative language model 125 to identify portions of a transcript of the trimmed video (e.g., transcript of the video segments of the trimmed video extracted from transcript 133) which may be applied by captioning effects component 194 to corresponding video segments as captions. Examples of applying captions to corresponding video segments are shown in FIGS. 7D, 7E, 7G, 7H, 7J, 7K, and 7L.

In some embodiments, a prompt may be provided by text emphasis prompt component 196A of captioning effect selection component 196 to a generative language model 125 to identify phrases and/or words from portions of a transcript of the trimmed video which may be applied by captioning effects insertion component 198 to corresponding video segments as captions. In this regard, the phrases and/or words identified by the language model 125 can be utilized to provide emphasis on the phrases and/or words by utilizing the identified phrases and/or words in captions in the respective video segments. For example, the language model 125 can be utilized to determine important sentences, quotes, words of interest, etc. to provide emphasis on the phrases and/or words. Examples of applying identified phrases and/or words in captions to corresponding video segments are shown in FIGS. 7G, 7J, and 7K. As shown in FIGS. 7G and 7J, captioning effects insertion component 198 may highlight words within identified phrases as identified by a generative language model 125 for additional emphasis. In some embodiments, the captioning effects insertion component 198 applies the identified phrases and/or words in an animated manner in that the identified phrases and/or words appear in video segment as the identified phrases and/or are spoken (e.g., utilizing the word-level timing of the transcript). In some embodiments, the length of the caption is limited in order to make sure the caption does not overflow (e.g., within the prompt of text emphasis prompt component 196A and/or by captioning effects insertion component 198.

In some embodiments, a prompt may be provided by text emphasis prompt component 196A to a generative language model 125 to summarize the identified phrases and/or words from portions of a transcript of the trimmed video to apply the summarized identified phrases and/or words to corresponding video segments as captions. An example of applying a summarized identified phrases and/or words in captions to corresponding video segments is shown in FIG. 7E. As shown in FIG. 7E, in some embodiments, captioning effects insertion component 198 may insert an image relevant to the identified phrase and/or words into the video segment. For example, captioning effect image selection component 198B may prompt a generative AI model (e.g., generative language model 125) to retrieve an image(s) from a library (e.g., effects images files 137) and/or generate an image(s) that is relevant to the identified phrase and/or words so that captioning effects insertion component 198 can insert the retrieved and/or generated image into the video segment for additional emphasis of the identified phrase and/or words.

In some embodiments, text emphasis prompt component 196A may provide a first prompt generative language model 125 to identify important sentences from portions of a transcript of the trimmed video and text emphasis prompt component 196A may provide a second prompt to generative language model 125 to identify phrases and/or words from the identified sentences to apply the identified phrases and/or words to corresponding video segments as captions (e.g., by captioning effect insertion component 198). A specific example of a prompt to the generative language model to identify important sentences from portions of a transcript of the trimmed video is as follows:

PROMPT = ' I am working on producing a video to put on YouTube. I have recorded the video and converted it into a transcript for you, and I would like help extracting the pull quotes (important "sentences" from the presented text) and significant "words" in those sentences that I will overlay over the video to highlight.
We would like you to only pick a small number of specific, unique words that highlight the interesting parts of the sentence. Do not pick common, generic words like "and", "the", "that", "about", or "as" unless they are part of an important phrase like "dungeons and dragons". Do not pick more than ten important sentences from the transcript and at most three important words in a given sentence.
Only pick the most important sentences that are relevant to the topic of the transcript.
I will need you to repeat the exact sentence from the transcript, including punctuation, so I know when to display the sentence. Can you suggest to me places where quotes can help by extracting important sentences (pull quotes), but only if you think the quote would be useful to the viewer.
Here is an example of the JSON format I would like you to use to extract important sentences. This example shows two sentences separated by \n with their individual important words entries:
{"sentence": "It's important to watch air quality and weather forecasts and limit your time outside if they look bad.", "words": ["air quality", "weather forecasts", "limit"]}
{"sentence": "My background is in robotics, engineering and electrical engineering.", "words":[ "robotics", "engineering", "electrical engineering"]}\n
Please make sure your response has "sentence" and "words" entries
If you do not find a quote that you think would be useful to viewers, please just say "No quotes found." Here is the text I would like you to parse for important sentences and important words:'; < TRANSCRIPT>

A specific example of a prompt to the generative language model to identify phrases and/or words from the identified sentences to apply the identified phrases and/or words to corresponding video segments as captions is as follows:

PROMPT = ' Find the important phrase from this sentence by ONLY pruning the beginning of the sentence that's not important for a phrase in a pull quote.
Do not include common, generic words like "And", "So", "However", "Also", "Therefore" at the beginning of the sentence, unless they are part of an important phrase.
I will need you to repeat the exact sequence of the words including the punctuation from the sentence as the important phrase after removing the unimportant words from the beginning of the sentence.
Do not delete any words from the middle of the sentence until the end of the sentence. Only prune the sentence from the beginning. Do not paraphrase. Do not change the punctuation.
Also find important words to highlight in the extracted phrase sentence. For important words, I would like you to only pick a small number of specific, unique words that highlight the interesting parts of the phrase.
Do not pick common, generic words like "and", "the", "that", "about", or "as" unless they are part of an important phrase like "dungeons and dragons". Do not pick more than three important words in a given sentence.
Here is an example of the JSON format I would like you to use to extract important phrase. This example shows a phrase with individual important words entries:
{"sentence": "Important to watch air quality and weather forecasts and limit your time outside.", "words": ["air quality", "weather forecasts", "limit"} \n
Please make sure your response has "sentence" and "words" entries.
Here is the text I would like you to parse for important phrase and important words:';
<TRANSCRIPT>

In some embodiments, a prompt may be provided by section heading prompt component 196B of captioning effect selection component 196 to a generative language model 125 to identify section headings from portions of a transcript of the trimmed video which may be applied by captioning effects insertion component 198 to corresponding video segments as captions. For example, the trimmed video may include sets of video segments where each set of video segments is directed to a specific theme or topic. In this regard, the section headings for each set of video segments of the trimmed video identified by the language model 125 can be utilized to provide an overview of a theme or topic of each set of video segments. The video editing application 105 can display the section headings as a captions in the respective video segments (e.g., in a portion of the first video segment of each set of video segments of each section of the trimmed video) as applied by captioning effect insertion component 198 and/or display the section headings in the transcript to assist the end user in editing the trimmed video through a user interface (e.g. through video segment tool 112). Examples of applying section headings to corresponding video segments are shown in FIGS. 7D and 7H.

In some embodiments, captioning effect insertion component 198 may insert an image relevant to the section heading into the video segment. For example, captioning effect image selection component 198B may prompt a generative AI model (e.g., generative language model 124) to retrieve an image(s) from a library (e.g., effects images files 137) and/or generate an image(s) that is relevant to the section heading so that captioning effect insertion component 198 can insert the retrieved and/or generated image into the video segment for additional emphasis of the section heading.

A specific example of a prompt to the generative language model to identify section headings from portions of a transcript of the trimmed video is as follows:

in FIG. 7L. As shown in FIG. 7L, in some embodiments, captioning effect insertion component 198 may insert images or an image relevant to the identified list into the video segment. For example, captioning effect image selection component 198B may prompt a generative AI model (e.g., generative language model 125) to retrieve an image(s) from a library (e.g., effects images files 137) and/or generate an image(s) that is relevant to the identified list or items in the list so captioning effect insertion component 198 can insert the retrieved and/or generated image(s) into the video segment for additional emphasis of the list.

As further shown in FIG. 7L, in some embodiments, captioning effect insertion component 198 may insert a background (e.g., transparent as shown in FIG. 7L or opaque) so that the list caption is more visible in the video segment. In some embodiments, captioning effect insertion component 198 applies the items in the identified list of items of the caption in an animated manner in that the items of the list appear in video segment as the items of the list are spoken (e.g., utilizing the word-level timing of the transcript). In this regard, the list prompt component 196C prompts the generative language model 125 to include timestamps for each item in the list of items from the transcript. In some embodiments, captioning effect insertion component 198 applies the items in the identified list of items of the caption to the video segment at once, such as at the beginning of the video segment, after the list of items are spoken in the video segment, or at the end of the video segment.

In some embodiments, captioning effect insertion component 198 applies the caption with a minimum hold time on the video segment so that the caption does not disappear too quickly. In some embodiments, the video editing application 105 provides templates and/or settings so that the end user can specify the animation style of the caption inserted by captioning effect insertion component 198. In some embodi-

---

```
PROMPT = ' The transcript is given as a list of + sentences_list.length + sentences
with ID.
Break the transcript into several contiguous segments and create a heading for each
segment that describes that segment.
Each segment needs to have a coherent theme and topic.
All segments need to have similar number of sentences. You must use all the sentences
provided.
Summarize each segment using a heading.
For example:
\n\nUse the following format: \n\n [{"headingName": string, "startSentenceId":
number, "endSentenceId": number), \n {"headingName": string, "startSentenceId":
number, "endSentenceId": number} ,\n {"headingName": string, "startSentenceId":
number, "endSentenceId": number}] \n\n "Here is the full transcript. \n" +
sentences_list.map((s) => '${s["sentenceIndex"]}: ${s["text"]}').join("\n\n")'
<TRANSCRIPT>
```

---

In some embodiments, a prompt may be provided by list prompt component 196C of captioning effect selection component 196 to a generative language model 125 to identify a list(s) of items from portions of a transcript of the trimmed video which may be applied by captioning effect insertion component 198 to corresponding video segments as captions. For example, a video segment of the trimmed video may include dialogue regarding a list of items. In this regard, the list of items discussed in the video segment of the trimmed video can be identified (e.g., extracted) by the language model 125 (e.g., through the transcript provided to the language model) so that the captioning effect insertion component 198 can display the list as a caption in the respective video segment. An example of applying a list of items as a caption to corresponding video segments is shown ments, the video editing application 105 can automatically choose the animation style of the caption for insertion by captioning effect insertion component 198, such as based on the video content of the input video (e.g., whether the input video is serious video, such as a documentary or interview, or whether the input video is a social media post) or based on the target platform (e.g., such as a social media website).

In some embodiments, the prompt provided by list prompt component 196C to the generative language model 125 requests the generative language model 125 to identify a title for the list(s) of items from portions of a transcript of the trimmed video. In this regard, captioning effect insertion component 198 can apply the title as a caption in a corresponding video segment prior to and/or with the list of items. In some embodiments, only a portion of the transcript, such as a single paragraph of the transcript, is sent to the generative language model 125 by list prompt component 196C at a time in order to avoid overwhelming the short attention window of the generative language model.

A specific example of a prompt to the generative language model to identify a list from portions of a transcript of the trimmed video is as follows:

---

PROMPT = ' I am working on producing a video to put on YouTube. I have recorded the video and converted it into a transcript for you, and I would like help extracting "list-structured content" that I will overlay over the video. This is content where I either directly or indirectly give a list of items, and I would like to display the list elements in the video in the list, one at a time. I will give you a paragraph from the transcript. Please find at most one list in this paragraph, but only if you think the list would be useful to the viewer. I will need you to repeat the exact first sentence from the transcript, including punctuation, so I know when to start displaying the list. Here is an example of the JSON format I would like you to use: { "sentence": "According to the domain system, the tree of life consists of three domains: Archaea, Bacteria, and Eukarya, which together form all known cellular life. ", "title" : "Domains of Life", "elements" : [ "Archaea", "Bacteria", "Eukarya" ] } Please make sure your response has "sentence", "title", and "elements" entries. If you do not find a list that you think would be useful to viewers, please just say "No list found." All lists should have at least three elements. Here is the paragraph I would like you to parse for lists:' <TRANSCRIPT>

---

In some embodiments, video effects component 190 (e.g., through list prompt component 196C or captioning effect insertion component 198) performs post-processing to ensure that the identified list of items are located in the transcript by searching the transcript for each item and/or confirm the timestamps of the list of items. In some embodiments, if the identified list of items, or a portion thereof, cannot be located in the original transcript, captioning effect insertion component can search for matching strings in the transcript, such as through Needleman-Wunsch algorithm to identify the list of items.

In some embodiments, face-aware captioning video effects can be added to the assembled video segments of the trimmed video of the input video by face-aware captioning effect insertion component 198A. For example, face and/or body tracking component 191 may compute the location of each subject's face and/or body (e.g., or portion of the subject's body, such as shoulders) in each video segment of the trimmed video. In this regard, the captions applied by face-aware captioning effect insertion component 198A to corresponding video segments can be placed on the frames of the video segment with respect to the location of the subject's face and/or body of the video segment. Examples of applying captions to corresponding video segments with respect to the location of the subject's face and/or body are shown in FIGS. 7J and 7K.

For example, as can be understood from FIG. 7J, the language model 125 may identify a phrase from the transcript for emphasis along with words within the phrase for additional emphasis following prompting by text emphasis prompt component 196A. In this regard, face-aware captioning effect insertion component 198A initially automatically crops the frame for the portion of the video segment in order to apply the caption on the right side of the frame. Subsequently, face-aware scale magnification component 192 automatically shifts the portion of the video segment to the left side of the frame and applies a scale magnification that zooms in on a detected face (e.g., as detected by face and/or body tracking component 191) to provide emphasis during the portion of a video segment in which the phrase is spoken.

As another example, as can be understood from FIG. 7K, the language model 125 identifies a phrase from the transcript for emphasis along with words within the phrase for additional emphasis following prompting by text emphasis prompt component 196A. In this regard, face-aware captioning effect insertion component 198A automatically crops the right half of the frame of the portion of the video segment, inserts an opaque background, and applies the caption. Subsequently, face-aware scale magnification component 192 automatically shifts the portion of the video segment to the left side of the frame and applies a scale magnification that zooms in on a detected face (e.g., as detected by face and/or body tracking component 191) to provide emphasis during the portion of a video segment in which the phrase is spoken.

In some embodiments, captions applied by face-aware captioning effect insertion component 198A with respect to a detected face and/or body of a subject also utilize saliency detection algorithm (e.g., through one or more machine learning models) for placement of captions. For example, video effects component 190 (e.g., through captioning effect insertion component 198, face-aware captioning effect insertion component 198A, face and/or body tracking component 191, and/or face-aware scale magnification component 192) may utilize saliency detection algorithms to avoid placing captions in certain regions of video segment(s) of the trimmed video, such as regions where objects are moving or on top of other text. In some embodiments, video effects component 190 may utilize saliency detection algorithms over a range of video segments of the trimmed video to identify a location in the range of video segments for placement of captions.

In some embodiments, video effects component 190 may automatically apply visualization templates and/or settings for the placement of captions. For example, the visualization templates and/or settings automatically applied by video effects component 190 may specify settings, such as the location of the captions with respect to a detected face and/or body of the subject of the video segments, opacity of overlay for the caption, color, font, formatting, video resolution (e.g., vertical/horizontal), and/or settings for a target platform (e.g., a social media platform.

In an example embodiment, FIG. 1B illustrates an example implementation of video interaction engine 108 comprising video editing tool 111. In an example implementation, video editing tool 111 provides an interface that allows a user to add video effects to the trimmed video through video effects tool 116. In some embodiments video effects tool 116 provides an emphasis effects tool 116A that provides an interface that allows a user to apply video effects to emphasize certain phrases and/or words spoken in the trimmed video as captions in the trimmed video and/or in the corresponding transcript displayed in the user interface. In some embodiments video effects tool 116 provides a headings effects tool 116B that provides an interface that allows a user to apply video effects to generate section headings as captions in the trimmed video and/or in the corresponding transcript displayed in the user interface. In some embodiments video effects tool 116 provides a camera cuts effects tool 116C that provides an interface that allows a user to apply video effects by applying scale magnification to simulate a camera zoom effect hides shot cuts for changes between video segments of the trimmed video. In some embodiments video effects tool 116 provides a delete effects tool 116D that provides an interface that allows a user to delete some or all video effects applied to video segments of the trimmed video. Video effects tool 116 (or each of emphasis effects tool 116A, headings effects tool 116B, and camera cuts effects tool 116C) may provide an interface that allows an end user to select visualization templates and/or settings, such as the types of emphasis applied (e.g., scale magnification or settings of captions), location of the captions with respect to a detected face and/or body of the subject of the video segments, opacity of overlay for the caption, color, font, formatting, video resolution (e.g., vertical/horizontal), and/or settings for a target platform (e.g., a social media platform).

Example Video Editing Interface

The prior section described example techniques for using generative artificial intelligence to automatically cut down a user's larger input video into an edited video (e.g., a trimmed video such as a rough cut or a summarization) comprising the most important video segments and applying corresponding video effects, for example, to prepare for video editing or other video interactions.

In an example implementation, video interaction engine 108 provides interface functionality that allows a user to select, navigate, play, and/or edit a video through interactions with an interface controlled by video editing tool 111. In the example implementation in FIG. 1B, video interaction engine 108 includes video selection tool 110 that provides an interface that navigates a video and/or file library, accepts input selecting one or more videos (e.g., video files 192), and triggers video editing tool 111 to load one or more selected videos (e.g., ingested videos, videos shared by other users, previously created clips) into a video editing interface controlled by video editing tool 111. Generally, video selection tool 110 and/or video editing tool 111 present one or more interaction elements that provide various interaction modalities for selecting, navigating, playing, and/or editing a video. In various embodiments, these tools are implemented using code that causes a presentation of a corresponding interaction element(s), and detects and interprets inputs interacting with the interaction element(s).

Figure 7A:
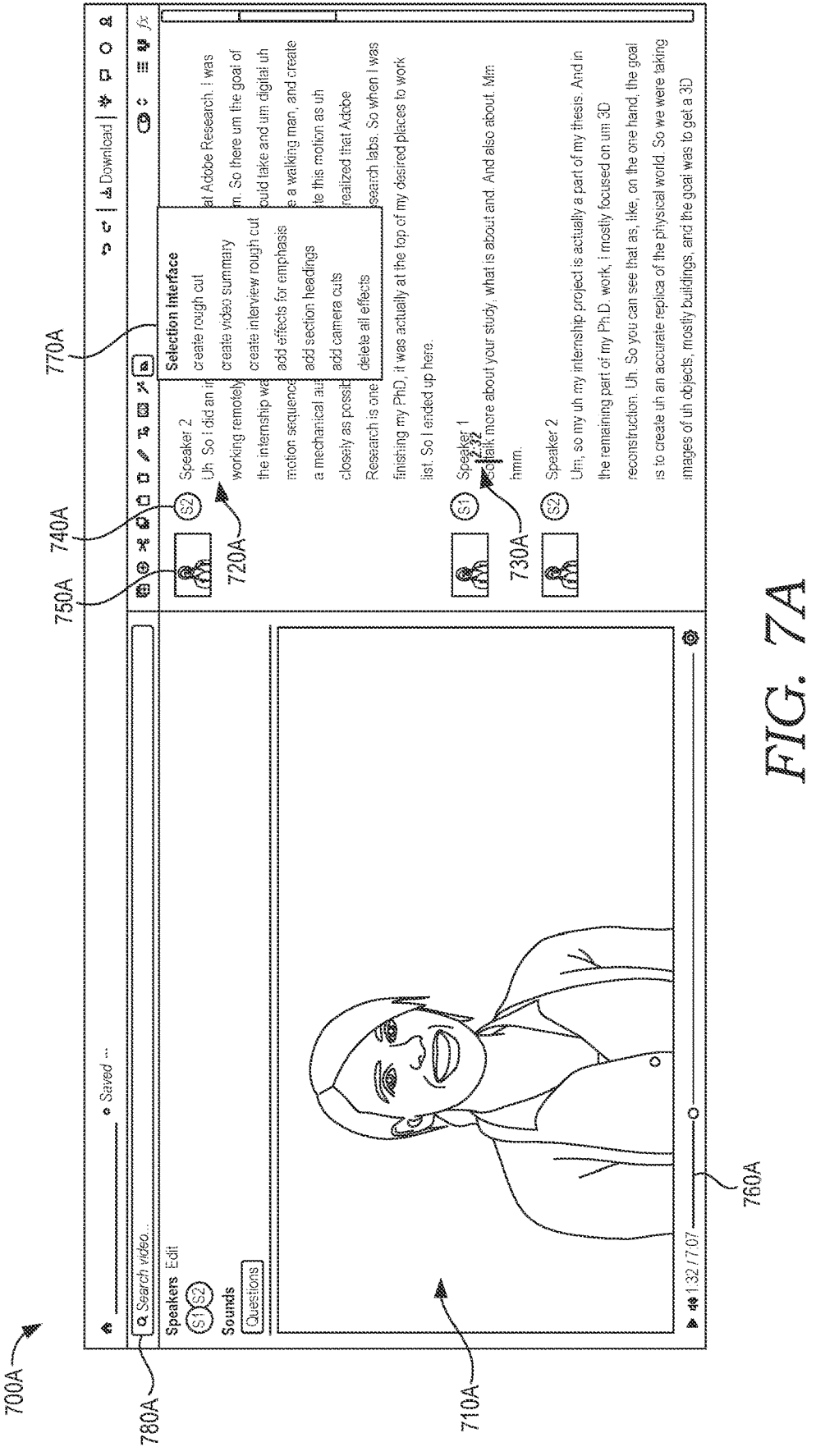
FIG. 7A illustrates an example video editing interface with an input video, a diarized transcript with word-level timing, and a selection interface for assembling a trimmed video and adding effects, in accordance with embodiments of the present invention.

FIG. 7A illustrates an example video editing interface 700A, in accordance with embodiments of the present invention. In this example, video editing interface 700A provides an input video 710A (e.g., approximately 7 minutes and 7 seconds in length). Video editing interface 700A provides a navigational interface for the input video with a diarized transcript 720A with word-level timing 730A, speaker IDs 740A, and a frame corresponding to each video segment 750A. As can be understood, the position 730A on the diarized transcript corresponds to the video scroll bar 760A Video editing interface 700A provides a selection interface 770A for assembling a trimmed video and adding effects. For example, selection interface 770A may include options to allow a user to select whether to create a rough cut, create a video summary, to create an rough cut for an interview, add effects for emphasis, add section headings, add camera cuts (e.g., face-aware scale magnification), and to delete all effects. Video editing interface 700A provides a search interface 780 for searching the video and/or transcript and various other editing tools.

Figure 7B:
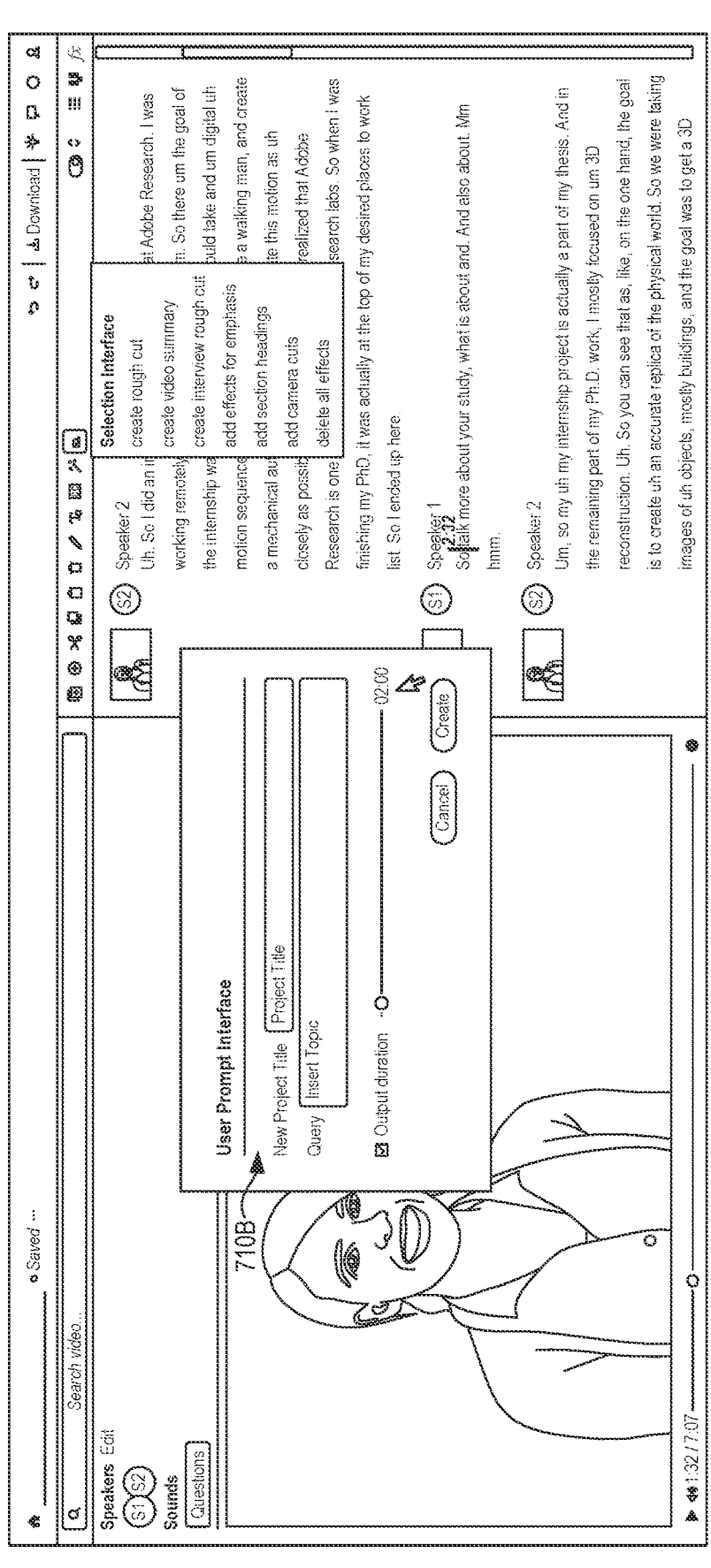
FIG. 7B illustrates an example video editing interface of FIG. 7A with a user prompt interface for assembling a trimmed video, in accordance with embodiments of the present invention.

FIG. 7B illustrates an example video editing interface 700B corresponding to the video editing interface 700A of FIG. 7A with a user prompt interface for assembling a trimmed video, in accordance with embodiments of the present invention. In this example, video editing interface 700B provides a user prompt interface 710B after the user selects an option from the selection interface 770A of FIG. 7A corresponding to whether to create a rough cut, create a video summary, to create an rough cut for an interview. The user prompt interface 710B allows a user to create a title for the trimmed video, insert a query, such as a topic for the trimmed video, and select a desired duration of the trimmed video.

Figure 7C:
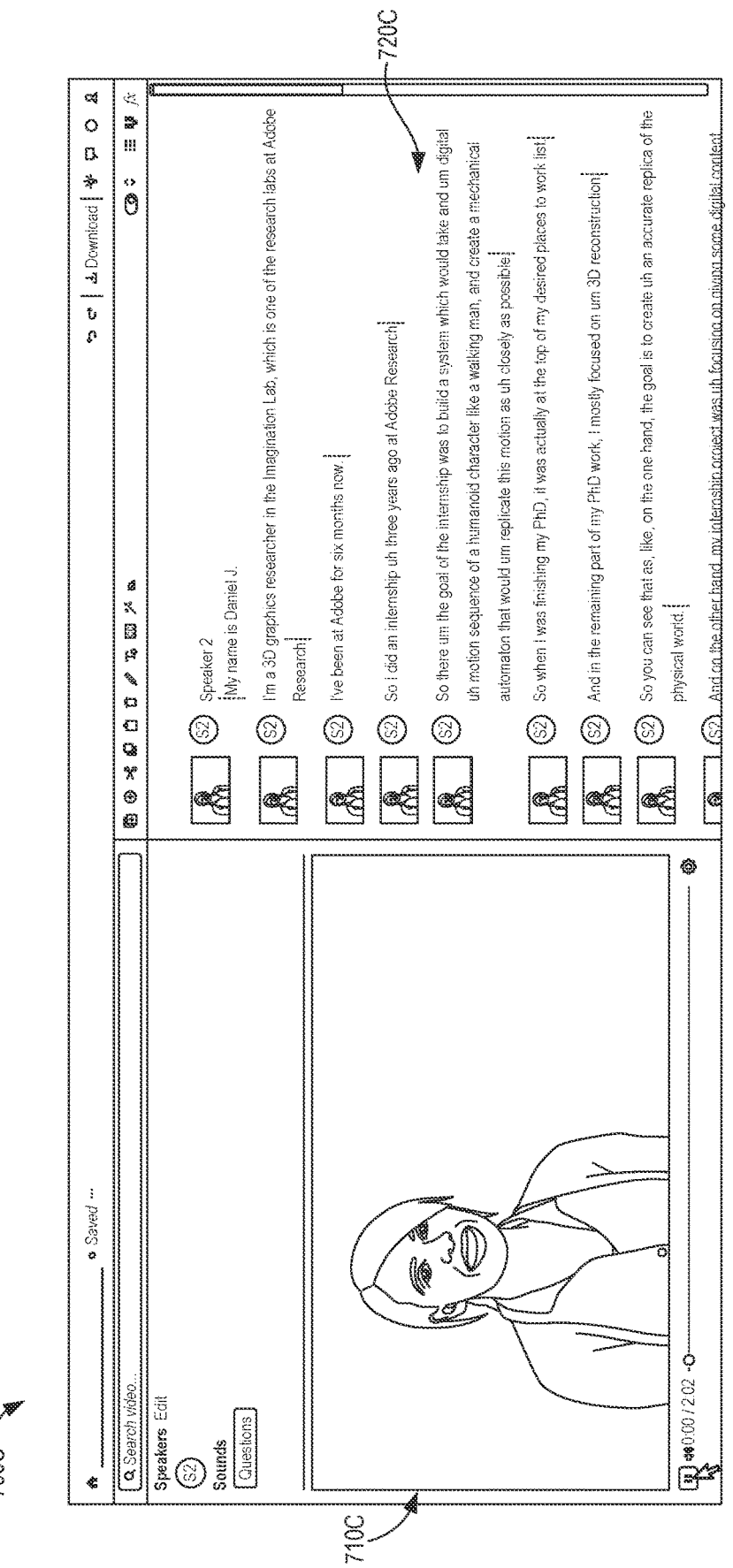
FIG. 7C illustrates an example video editing interface of FIG. 7A with an assembled trimmed video and a sentence-level diarized transcript with word-level timing, in accordance with embodiments of the present invention.
Figure 7D:
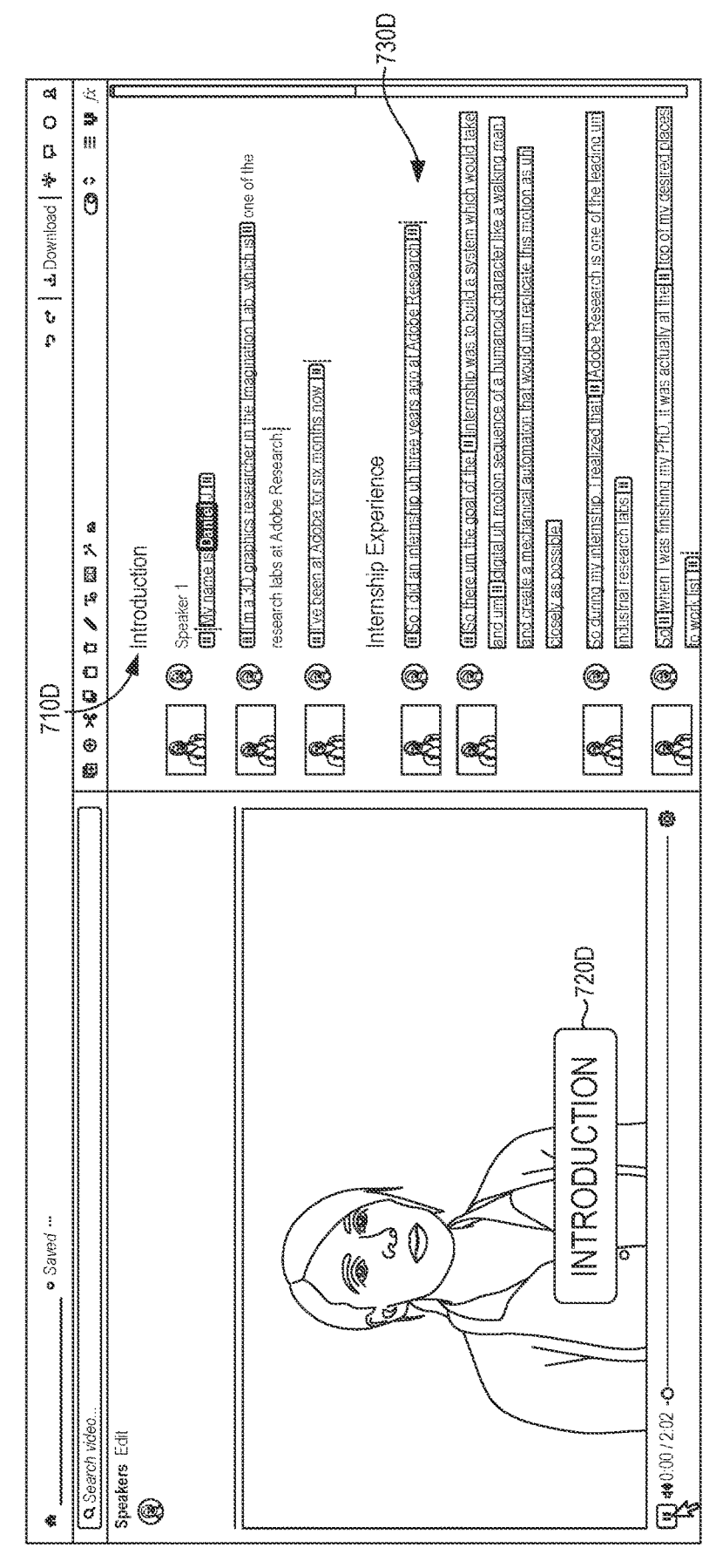
FIG. 7D illustrates an example video editing interface of FIG. 7C with a section heading captioning effect applied to the assembled video, in accordance with embodiments of the present invention.
Figure 7E:
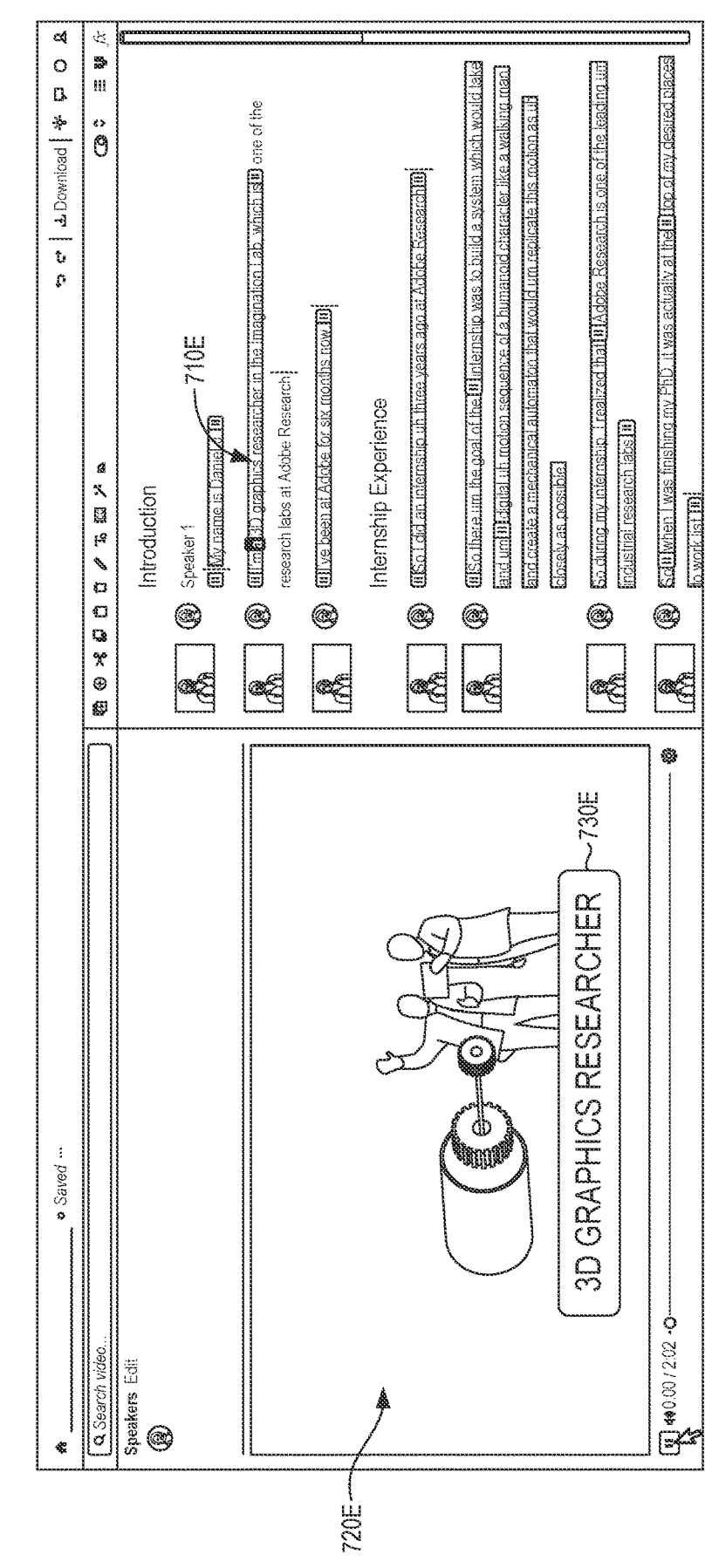
FIG. 7E illustrates an example video editing interface of FIG. 7C with an emphasis captioning effect applied to the assembled video by summarizing an identified phrase and inserting an image relevant to the identified phrase with a caption corresponding to the summarization of the identified phrase, in accordance with embodiments of the present invention.
Figure 7F:
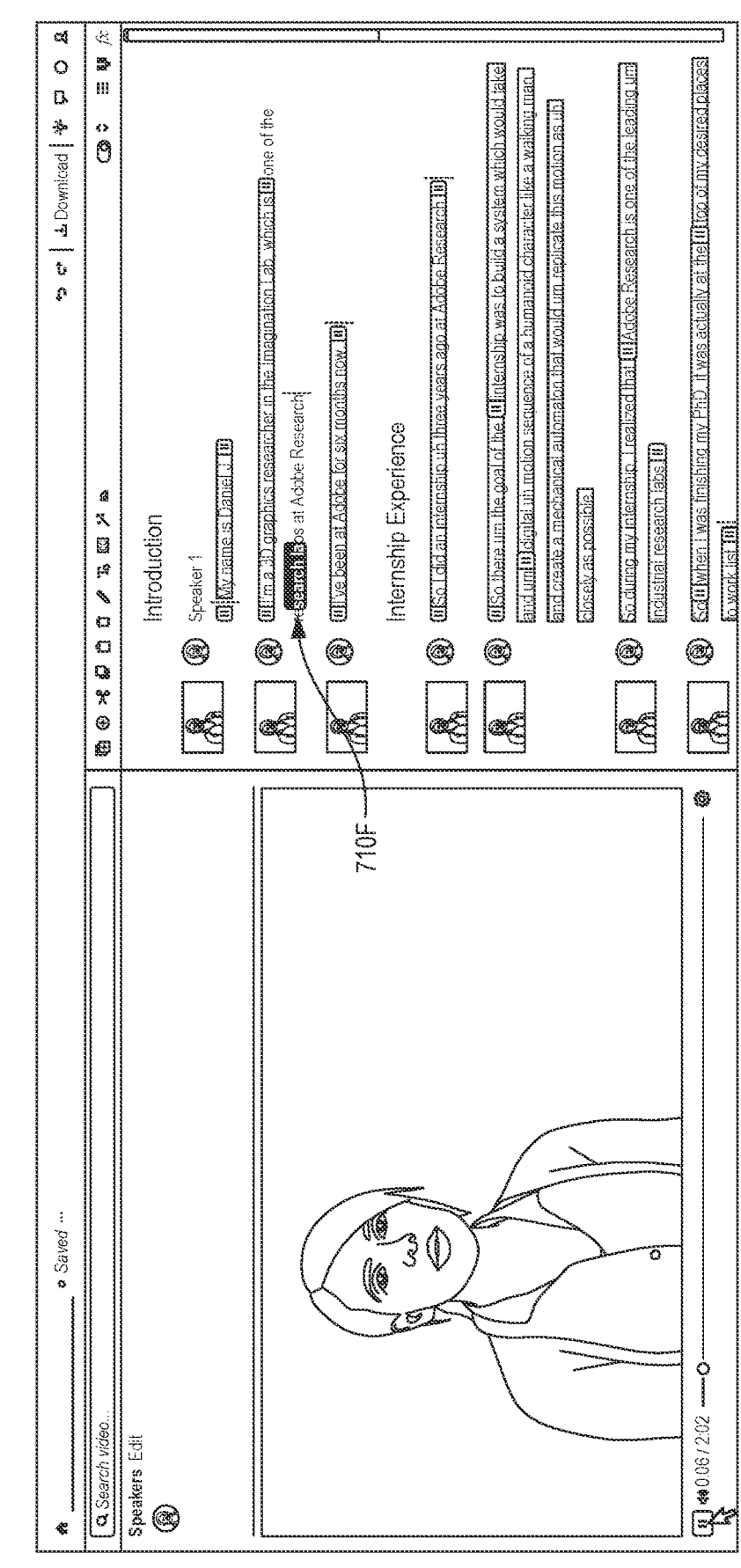
FIG. 7F illustrates an example video editing interface of FIG. 7C without an effect applied to the assembled video, in accordance with embodiments of the present invention.
Figure 7G:
FIG. 7G illustrates an example video editing interface of FIG. 7C with a face-aware scale magnification effect applied to a video segment following a transition from the video segment of FIG. 7F and an emphasis captioning effect applied to the assembled video by applying a caption corresponding to an identified phrase and emphasizing an identified word within the identified phrase, in accordance with embodiments of the present invention.
Figure 7H:
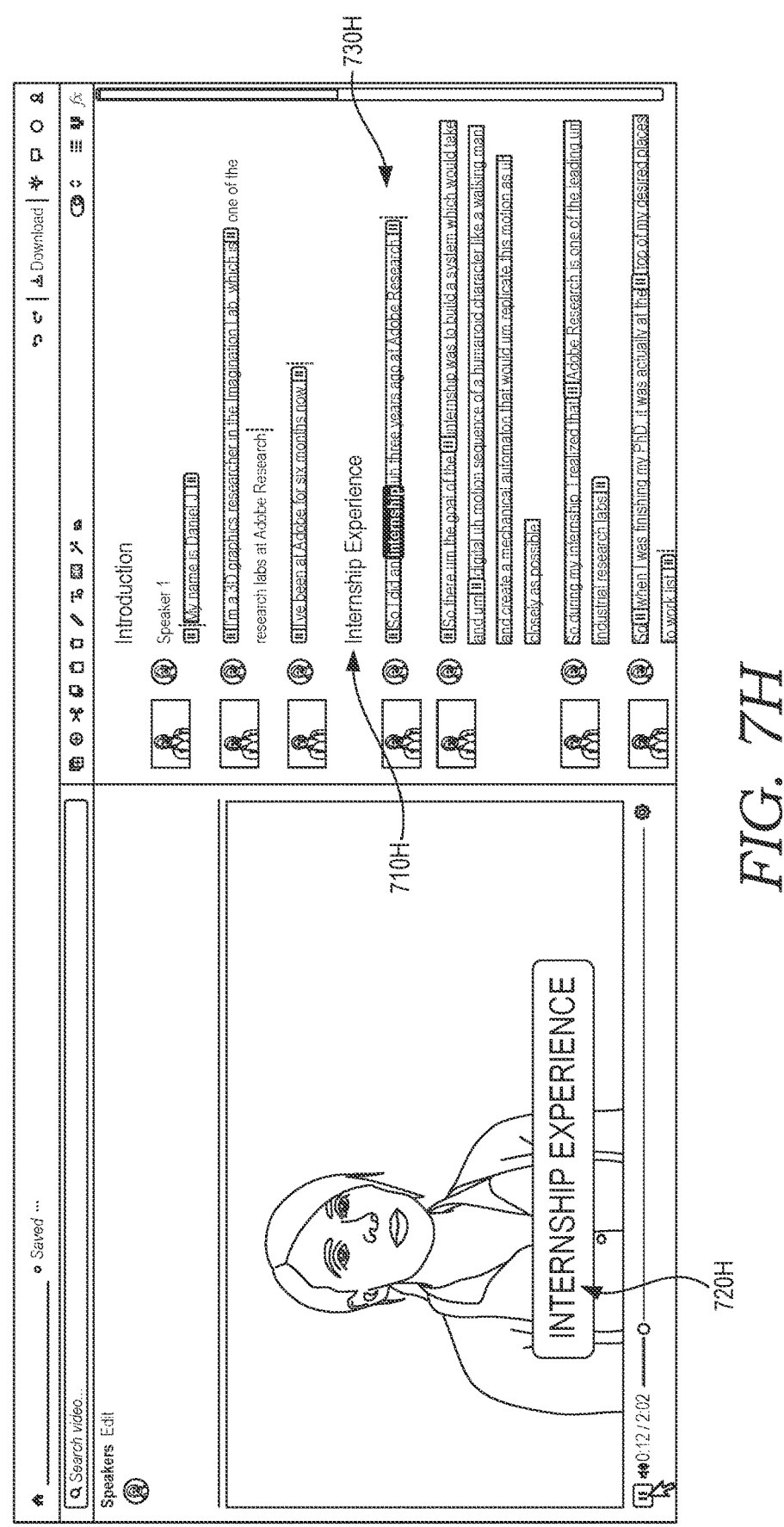
FIG. 7H illustrates an example video editing interface of FIG. 7C with a section heading captioning effect applied to the assembled video and without the scale magnification effect applied from the previous video segment of FIG. 7G, in accordance with embodiments of the present invention.

FIG. 7C illustrates an example video editing interface 700C of FIG. 7A corresponding to the video editing interface 700A of FIG. 7A with an assembled trimmed video, in accordance with embodiments of the present invention. In this example, video editing interface 700C provides an assembled trimmed video 710C (e.g., approximately 2 minutes and 2 seconds in length). Video editing interface 700C provides a sentence-level diarized transcript 720C (e.g., the transcript is segmented by sentences) with word-level timing for the assembled trimmed video. As can be understood, the user can select the various video segments (segmented by sentences) of the sentence-level diarized transcript 720C in order to navigate to and/or edit the selected video segments.

FIG. 7D illustrates an example video editing interface 700D corresponding to the video editing interface 700C of FIG. 7C with a section heading captioning effect applied to the assembled trimmed video 710C of FIG. 7C, in accordance with embodiments of the present invention. In this example, the user navigates to the dropdown menu of the selection interface 770A of FIG. 7A and selects "add section headings." Turning back to FIG. 7D, video editing interface 700D displays the section heading 710D that is automatically inserted as a clip caption 720D in the corresponding video segment of the assembled trimmed video. Video editing interface 700D displays the section heading 710D that is automatically added to the transcript 730D.

FIG. 7E illustrates an example video editing interface 700E corresponding to the video editing interface 700C of FIG. 7C with an emphasis captioning effect applied to the assembled trimmed video 710C of FIG. 7C, in accordance with embodiments of the present invention. In this example, the user navigates to the dropdown menu of the selection interface 770A of FIG. 7A and selects "add effects for emphasis." Turning back to FIG. 7E, video editing interface 700E communicates with a language model (e.g., generative language model 125) to identify an identified phrase 710E for emphasis. Video editing interface 700E communicates with a language model to summarize the identified phrase 710E. Video editing interface 700E communicates with a language model to select or generate an image 720E relevant to the identified phrase 710E. Video editing interface 700E inserts the image 720E relevant to the identified phrase in the corresponding video segment of the assembled trimmed video with a caption 730E corresponding to the summarization of the identified phrase.

FIG. 7F illustrates an example video editing interface 700F corresponding to the video editing interface 700C of FIG. 7C without an effect applied to assembled trimmed video 710C of FIG. 7C, in accordance with embodiments of the present invention. In this example, the user navigates to the dropdown menu of the selection interface 770A of FIG. 7A and selects "add effects for emphasis." Turning back to FIG. 7F, video editing interface 700F communicates with a language model (e.g., generative language model 125) and the language model does not identify the phrase 710F in the portion of the video segment for emphasis and/or captions. Therefore, no emphasis and/or captions are applied by video editing interface 700F for the portion of the video segment.

FIG. 7G illustrates an example video editing interface 700G corresponding to the video editing interface 700C of FIG. 7C with (1) a face-aware scale magnification effect applied to a video segment of the assembled trimmed video 710C of FIG. 7C following a transition from the video segment shown in video interface 700F of FIG. 7F and (2) an emphasis captioning effect applied to the assembled trimmed video 710C of FIG. 7C by applying a caption corresponding to an identified phrase for emphasis and emphasizing an identified word within the identified phrase, in accordance with embodiments of the present invention. In this example, video editing interface In this example, the user navigates to the dropdown menu of the selection interface 770A of FIG. 7A and selects "add camera cuts." Turning back to FIG. 7G, video editing interface 700G applies a scale magnification to the video segment shown in video editing interface 700G that zooms in on a detected face 740G at a boundary (e.g., at the beginning of the video segment shown in video editing interface 700G of FIG. 7G) between the video segment shown in video editing interface 700F of FIG. 7F and the video segment shown in video editing interface 700G of FIG. 7G in order to smooth the transition between video segments. In this regard, the video segment shown in video editing interface 700F of FIG. 7F is the original shot size (e.g., without scale magnification applied).

Further, in this example, the user navigates to the dropdown menu of the selection interface 770A of FIG. 7A and selects "add effects for emphasis." Turning back to FIG. 7G, video editing interface 700G communicates with a language model (e.g., generative language model 125) to identify an identified phrase 710G for emphasis. Video editing interface 700E communicates with a language model to identify identified words 720G within identified phrase 710G for emphasis. Video editing interface 700G inserts a caption 730G into the corresponding video segment of the assembled trimmed video where the caption 730G includes the identified phrase 710G and highlighting of the identified words 720G within the identified phrase 710G for emphasis on the identified phrase 710G and words identified 720G.

FIG. 7H illustrates an example video editing interface 700H corresponding to the video editing interface 700C of FIG. 7C with (1) a section heading captioning effect applied to the assembled trimmed video 710C of FIG. 7C and (2) without the scale magnification effect applied from the previous video segment shown in video editing interface 700G of FIG. 7G, in accordance with embodiments of the present invention.

In this example, the user navigates to the dropdown menu of the selection interface 770A of FIG. 7A and selects "add camera cuts." The video segment shown in video editing interface 700F of FIG. 7F is the original shot size (e.g., without scale magnification applied). The video segment shown in video editing interface 700G applies an example of a face-aware scale magnification in order to smooth the transition between the video segment shown in video editing interface 700F of FIG. 7F and the video segment shown in video editing interface 700G of FIG. 7G. Turning back to FIG. 7H, the video segment shown in video editing interface 700H returns to the original shot size (e.g., without scale magnification applied) in order to smooth the transition between the video segment shown in video editing interface 700G of FIG. 7G and the video segment shown in video editing interface 700H.

Further, in this example, the user navigates to the dropdown menu of the selection interface 770A of FIG. 7A and selects "add section headings." Turning back to FIG. 7H, video editing interface 700H displays the section heading 710H that is automatically inserted as a clip caption 720H in the corresponding video segment of the assembled trimmed video. Video editing interface 700H displays the section heading 710H that is automatically added to the transcript 730H.

Figure 7I:
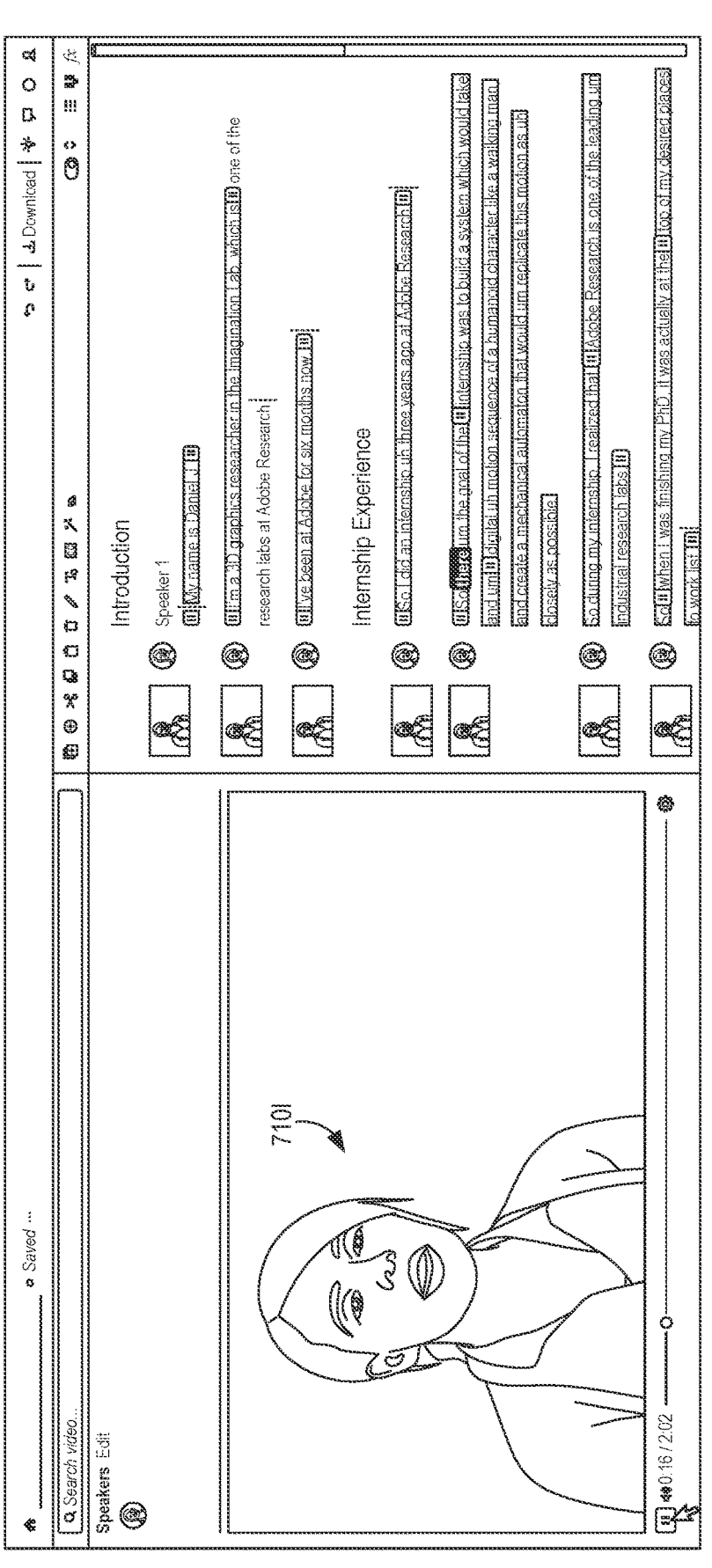
FIG. 7I illustrates an example video editing interface of FIG. 7C with a face-aware scale magnification effect applied to a video segment following a transition from the video segment of FIG. 7H, in accordance with embodiments of the present invention.
Figure 7J:
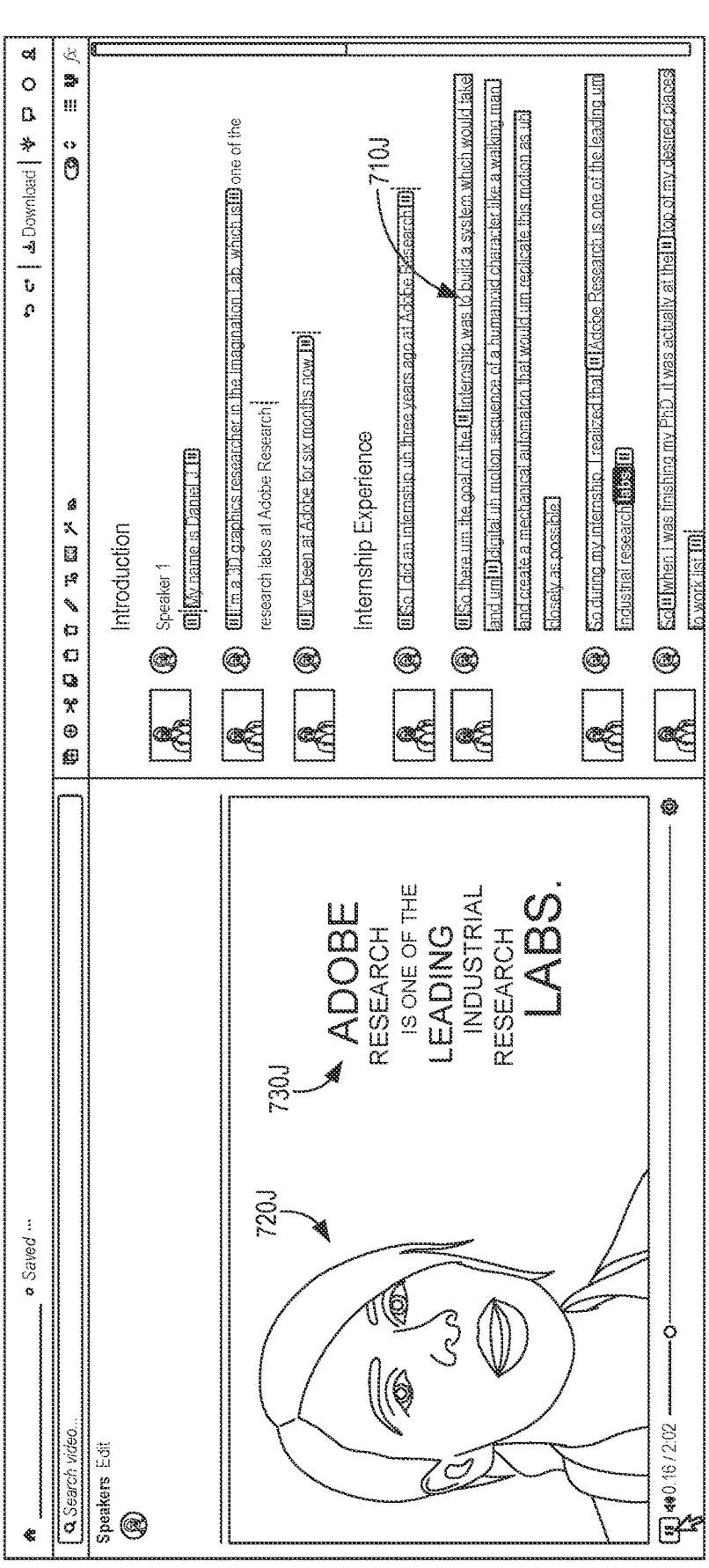
FIG. 7J illustrates an example video editing interface of FIG. 7C with an emphasis captioning effect applied to the assembled video by applying a face-aware scale magnification effect to a video segment and applying a caption corresponding to an identified phrase and emphasizing an identified word within the identified phrase, in accordance with embodiments of the present invention.
Figure 7K:
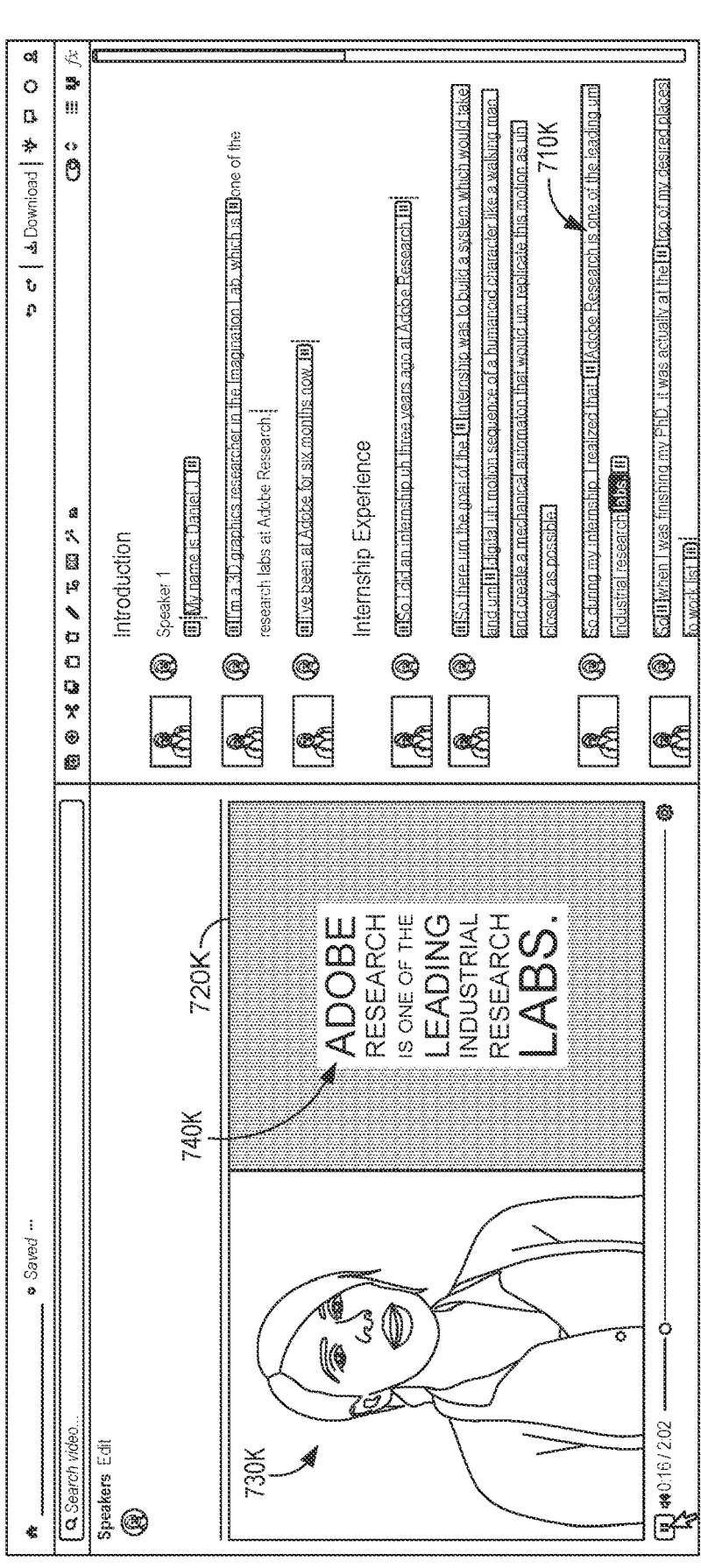
FIG. 7K illustrates an example video editing interface of FIG. 7C with an emphasis captioning effect applied to the assembled video by applying a face-aware crop effect to a video segment and applying a caption corresponding to an identified phrase and emphasizing an identified word within the identified phrase in the cropped portion of the video segment, in accordance with embodiments of the present invention.
Figure 7L:
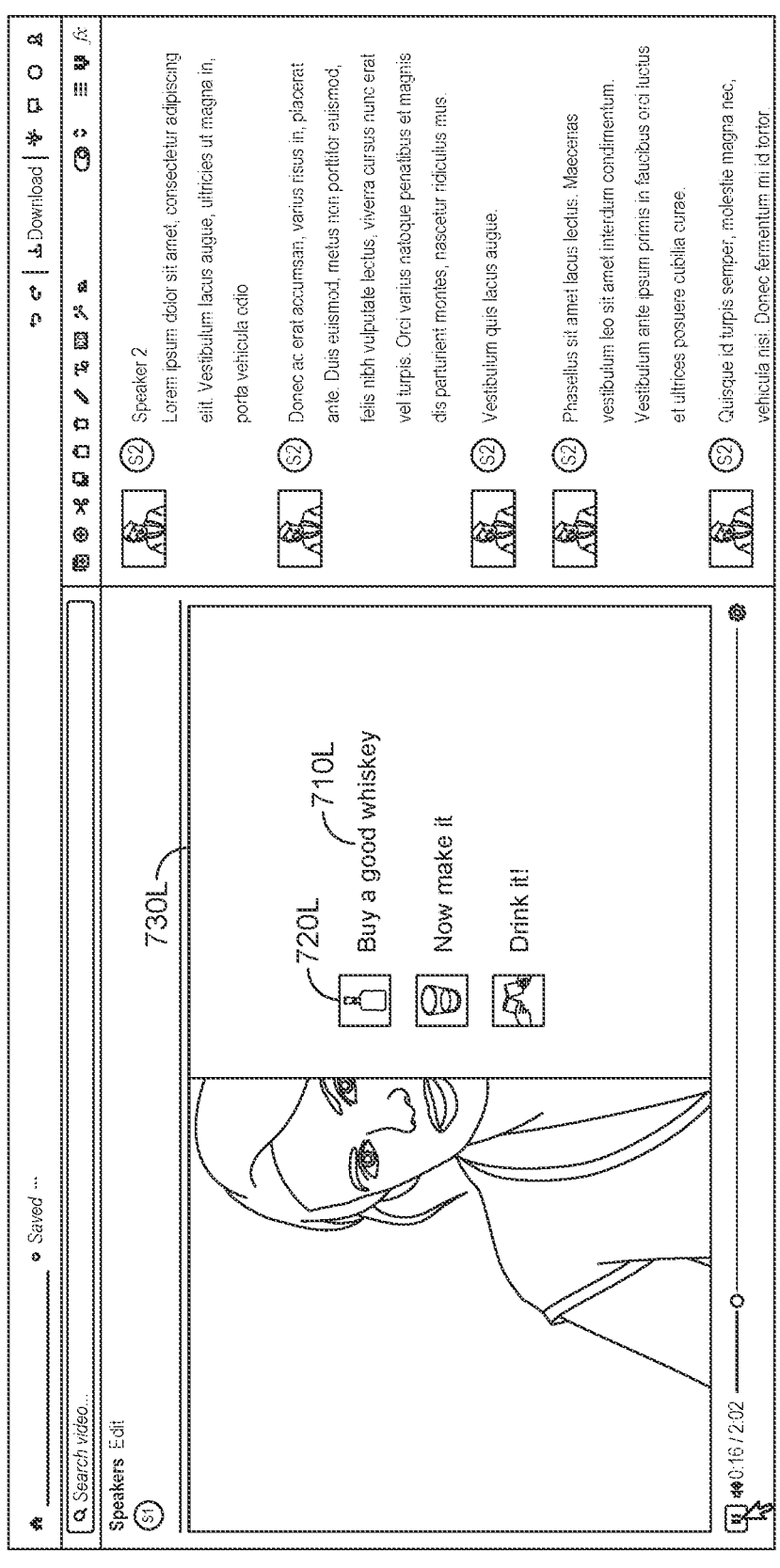
FIG. 7L illustrates an example video editing interface of FIG. 7C with a list captioning effect applied to the assembled video by applying a caption corresponding to a list of items extracted from the video segment and inserting images relevant to the items of the list within the caption, in accordance with embodiments of the present invention.

FIG. 7I illustrates an example video editing interface 700I corresponding to the video editing interface 700C of FIG. 7C with a face-aware scale magnification effect applied to a video segment of the assembled trimmed video 710C of FIG. 7C following a transition from the video segment shown in video editing interface 700H of FIG. 7H, in accordance with embodiments of the present invention.

In this example, the user navigates to the dropdown menu of the selection interface 770A of FIG. 7A and selects "add camera cuts." The video segment shown in video editing interface 700F of FIG. 7F is the original shot size (e.g., without scale magnification applied). The video segment shown in video editing interface 700G applies an example of a face-aware scale magnification in order to smooth the transition between the video segment shown in video editing interface 700F of FIG. 7F and the video segment shown in video editing interface 700G of FIG. 7G. The video segment shown in video editing interface 700H returns to the original shot size (e.g., without scale magnification applied) in order to smooth the transition between the video segment shown in video editing interface 700G of FIG. 7G and the video segment shown in video editing interface 700H. Turning back to FIG. 7I, video editing interface 700I applies a scale magnification to the video segment shown in video editing interface 700I that zooms in on a detected face 710I at a boundary (e.g., at the beginning of the video segment shown in video editing interface 700I of FIG. 7I) between the video segment shown in video editing interface 700H of FIG. 7H and the video segment shown in video editing interface 700I of FIG. 7I in order to smooth the transition between video segments. In this regard, the video segments of the assembled video alternate between shot sizes (e.g., an original shot size and a shot size with scale magnification applied) in order to smooth the transition between video segments.

FIG. 7J illustrates an example video editing interface 700J corresponding to the video editing interface 700C of FIG. 7C with an emphasis captioning effect applied to the assembled trimmed video 710C of FIG. 7C by applying a face-aware scale magnification effect to a video segment and applying a caption corresponding to an identified phrase and emphasizing an identified word within the identified phrase, in accordance with embodiments of the present invention.

In this example, the user navigates to the dropdown menu of the selection interface 770A of FIG. 7A and selects "add effects for emphasis." Turning back to FIG. 7J, video editing interface 700J communicates with a language model (e.g., generative language model 125) to identify an identified phrase 710J for emphasis. Video editing interface 700J communicates with a language model to identify words within identified phrase 710J for additional emphasis. Video editing interface 700J automatically applies a scale magnification that zooms in on a detected face 720J to provide emphasis during the portion of a video segment in which the phrase is spoken. Video editing interface 700J automatically crops the frame of the portion of the video segment in order to apply the caption 730J on the right side of the frame with respect to the location of the detected face 720J thereby providing additional emphasis on the caption. In this regard, video editing interface 700J inserts a caption 730J into the corresponding portion of the video segment of the assembled trimmed video where the caption 730J includes the identified phrase 710J and highlighting of words within the identified phrase 710J for emphasis on the identified phrase 710J and words within the identified phrase 710J.

FIG. 7K illustrates an example video editing interface 700K corresponding to the video editing interface 700C of FIG. 7C with an emphasis captioning effect applied to the assembled trimmed video 710C of FIG. 7C by applying a face-aware crop effect to a video segment and applying a caption corresponding to an identified phrase and emphasizing an identified word within the identified phrase in the cropped portion of the video segment, in accordance with embodiments of the present invention.

In this example, the user navigates to the dropdown menu of the selection interface 770A of FIG. 7A and selects "add effects for emphasis." Turning back to FIG. 7K, video editing interface 700K communicates with a language model (e.g., generative language model 125) to identify an identified phrase 710K for emphasis. Video editing interface 700K communicates with a language model to identify words within identified phrase 710K for additional emphasis. Video editing interface 700K automatically crops the right half of the frame of the portion of the video segment, inserts an opaque background 720K, and applies the caption with respect to the location of the detected face 730K (e.g., and shoulders) in order to provide emphasis on the caption 740K. In this regard, video editing interface 700K inserts a caption 740K into the corresponding portion of the video segment of the assembled trimmed video where the caption 740K includes the identified phrase 710K and highlighting of words within the identified phrase 710K for emphasis on the identified phrase 710K and words within the identified phrase 710K.

FIG. 7L illustrates an example video editing interface corresponding to the video editing interface 700C of FIG. 7C with a list captioning effect applied to the assembled trimmed video 710C of FIG. 7C by applying a caption corresponding to a list of items extracted from the video segment and inserting images relevant to the items of the list within the caption, in accordance with embodiments of the present invention. In this example, the user navigates to the dropdown menu of the selection interface 770A of FIG. 7A and selects "add effects for emphasis." Turning back to FIG. 7L, video editing interface 700L communicates with a language model (e.g., generative language model 125) to identify an identified list of items 710L for emphasis. Video editing interface 700L communicates with a language model to select or generate images 720L relevant to the identified list of items 710L. Video editing interface 700L inserts a caption, including the list of items 710L and the corresponding images 720L, on a background 730L in the corresponding video segment of the assembled trimmed video.

Example Flow Diagrams

With reference now to FIGS. 8-17, flow diagrams are provided illustrating various methods. Each block of the methods 800-1700 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

FIG. 8 is a flow diagram showing a method 800 for generating an edited video using a generative language model, in accordance with embodiments of the present invention. Initially, at block 810, an input video is received. In some embodiments, a user query, such as a topic, and/or a desired length of the edited video is received. At block 820, visual scenes are extracted from the input video (e.g., using language-image pretrained model) and scene captions are generated for each of the visual scene (e.g., using a clip captioning model). At block 830, a transcript with speaker diarization and word-level timing is generated by transcribing the input video (e.g., using an ASR model). The transcript is then segmented into sentences (e.g., using a sentence segmentation model). At block 840, an augment transcript is generated by aligning the scene captions and the sentences of the transcript. At block 850, the augmented transcript, the user query and/or desired length, is received by a generative language model. The generative language model then generates a representation of sentences characterizing a trimmed version of the input video, such as by identifying sentences and/or clip captions within the augmented transcript characterizing the trimmed version of the input video or generating text, such as a summary, based on the augmented transcript. At block 860, a subset of video segments of the input video corresponding to each of the sentences characterizing the trimmed version of the input video are identified. At block 870, the trimmed version of the input video is generated by assembling the subset of video segments into a trimmed video.

FIG. 9 is a flow diagram showing a method 900 for generating an edited video summarizing a larger input video using a generative language model, in accordance with embodiments of the present invention. Initially, at block 910, a generative language model is prompted along with the augmented transcript to generate a summary of the augmented transcript. In some embodiments, a user query, such as a topic, and/or a desired length of the edited video is included in the prompt. At block 920, sentences from the transcript that match each sentence of the summary generated by the generative language model are identified (e.g., through cosine similarity of sentence embeddings, rouge score, or prompting the language model to rank the sentences). At block 930, clip captions that match each sentence of the summary generated by the generative language model are identified. At block 940, post-processing is performed on the video segments corresponding to the identified sentences and/or clip captions that match each sentence of the summary generated by the generative language model to snap the interval boundaries of the video segments to the closest sentence boundary for each video segment. At block 950, the trimmed version of the input video corresponding to the summary video is generated by assembling the identified video segments into a trimmed video.

Figure 10:
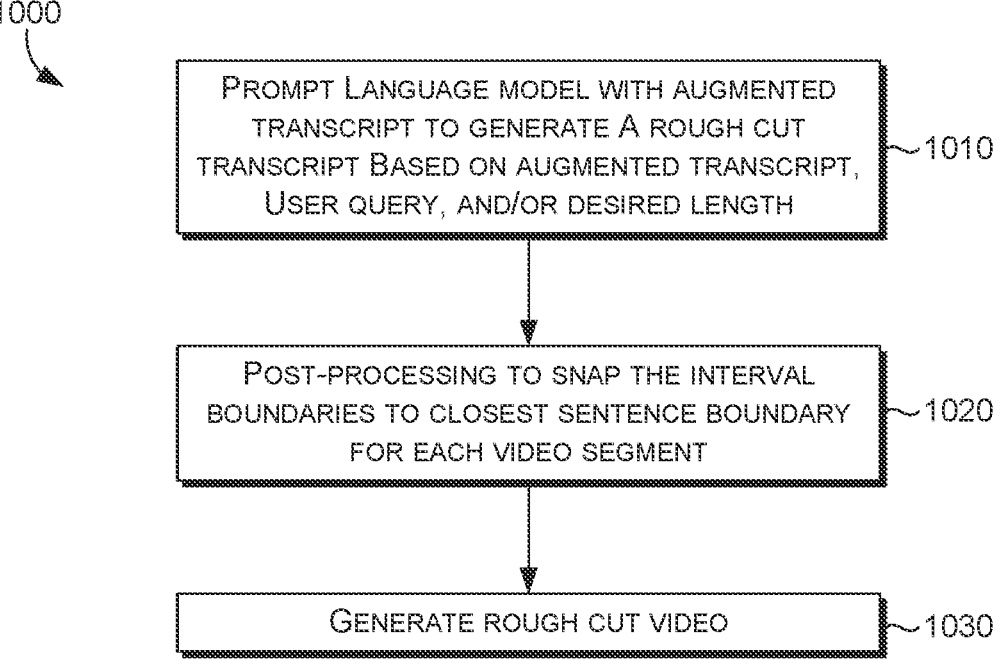
FIG. 10 is a flow diagram showing a method for generating an edited video as a rough cut of a larger input video using a generative language model, in accordance with embodiments of the present invention.

FIG. 10 is a flow diagram showing a method 1000 for generating an edited video as a rough cut of a larger input video using a generative language model, in accordance with embodiments of the present invention. Initially, at block 1010, a generative language model is prompted along with the augmented transcript to generate a rough cut transcript of a rough cut of an input video based on the augmented transcript of the input video. In some embodiments, a user query, such as a topic, and/or a desired length of the edited video is included in the prompt. At block 1020, post-processing is performed on the video segments corresponding to the identified sentences and/or clip captions corresponding to the rough cut transcript generated by the generative language model to snap the interval boundaries of the video segments to the closest sentence boundary for each video segment. At block 1030, the trimmed version of the input video corresponding to the rough cut video is generated by assembling the identified video segments into a trimmed video.

FIG. 11 is a flow diagram showing a method 1100 for applying face-aware scale magnification video effects for scene transitions, in accordance with embodiments of the present invention. Initially, at block 1110, a set of video segments corresponding to a trimmed version of an input video are accessed. At block 1120, a scale magnification zooming in on a detected region of a detected face is applied to at least a portion of a video segment following a transition from one video segment to a subsequent video segment of the set of video segments. At block 1130, a portion of the trimmed version of the input video with the scale magnification is provided for display. For example, as the trimmed video transitions from one video segment to the next video segment, a scale magnification may be applied that zooms in on a detected face at a boundary between the video segments to smooth the transition between video segments.

Figure 12:
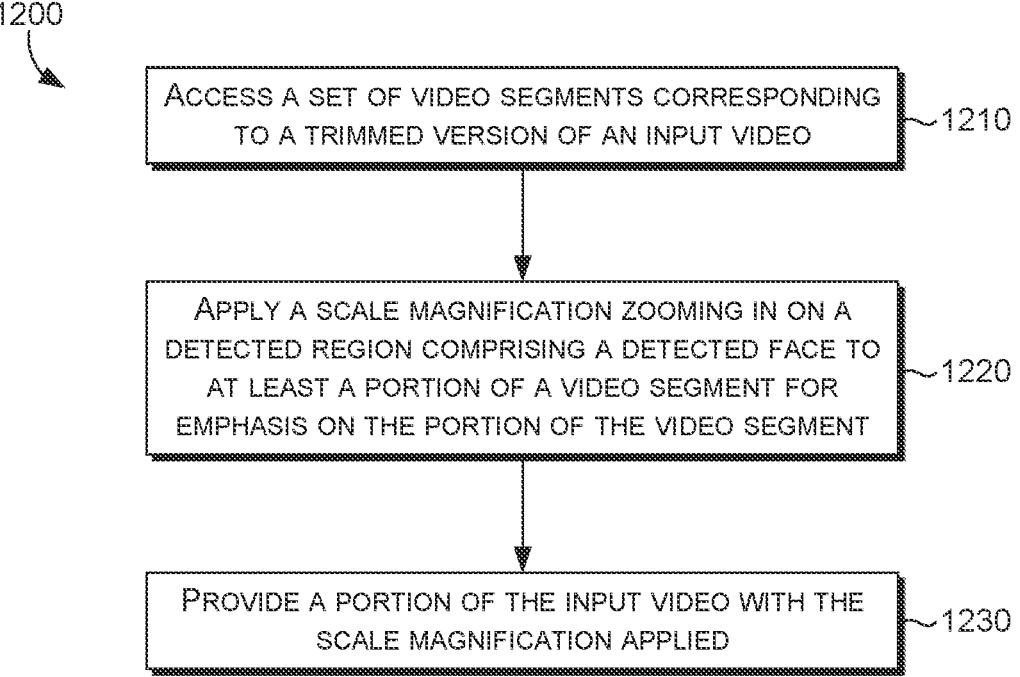
FIG. 12 is a flow diagram showing a method for applying face-aware scale magnification video effects for emphasis effects, in accordance with embodiments of the present invention.

FIG. 12 is a flow diagram showing a method 1200 for applying face-aware scale magnification video effects for emphasis effects, in accordance with embodiments of the present invention. Initially, at block 1210, a set of video segments corresponding to a trimmed version of an input video are accessed. At block 1220, a scale magnification zooming in on a detected region of a detected face is applied to at least a portion of a video segment of the set of video segments in order to provide emphasis on the portion of the video segment. At block 1230, a portion of the trimmed version of the input video with the scale magnification is provided for display. For example, a scale magnification may be applied that zooms in on a detected face in order to apply emphasis on certain dialogue during the portion of the video segment in which the dialogue is spoken.

Figure 13:
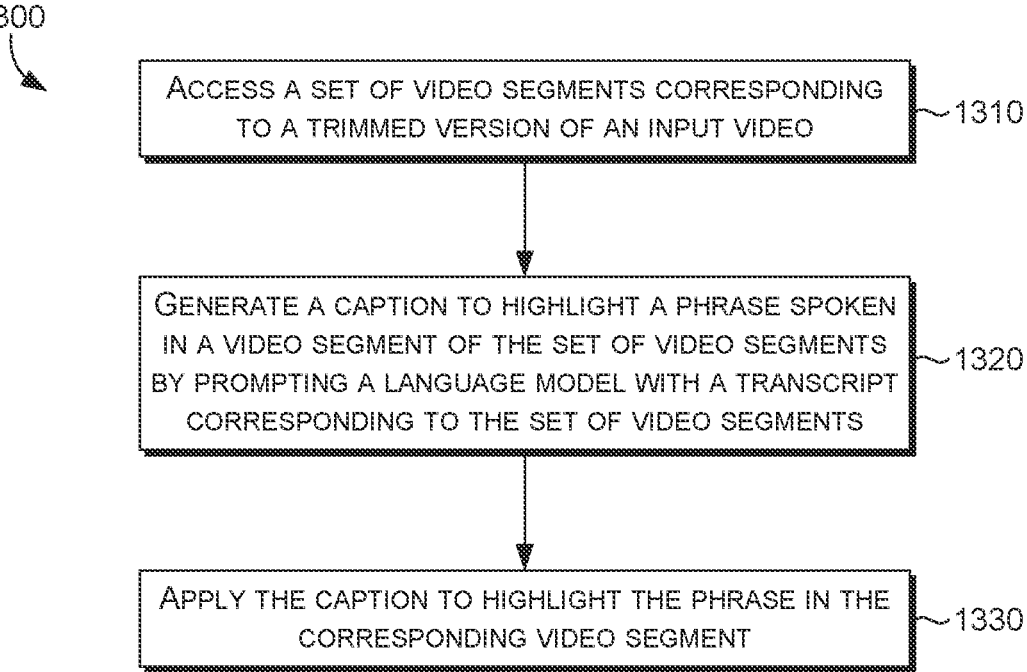
FIG. 13 is a flow diagram showing a method for applying captioning video effects to highlight phrases, in accordance with embodiments of the present invention.

FIG. 13 is a flow diagram showing a method 1300 for applying captioning video effects to highlight phrases, in accordance with embodiments of the present invention. Initially, at block 1310, a set of video segments corresponding to a trimmed version of an input video are accessed. At block 1320, a caption to highlight a phrase spoken in a video segment of the set of video segments is generated by prompting a language model with a transcript corresponding to the set of video segments to generate the caption. At block 1330, the caption is applied in the corresponding video segment of the set of video segments to highlight the phrase in the corresponding video segment.

FIG. 14 is a flow diagram showing a method 1400 for applying captioning video effects for section headings, in accordance with embodiments of the present invention. Initially, at block 1410, a set of video segments corresponding to a trimmed version of an input video are accessed. At block 1420, a caption for a section heading for a subset of video segments of the set of video segments is generated by prompting a language model with a transcript corresponding to the set of video segments to generate the caption. At block 1430, the caption is applied in the corresponding video segment of the subset of video segments, such as in the first portion of the first video segment of the subset of video segments, to provide a section heading in the corresponding video segment.

Figure 15:
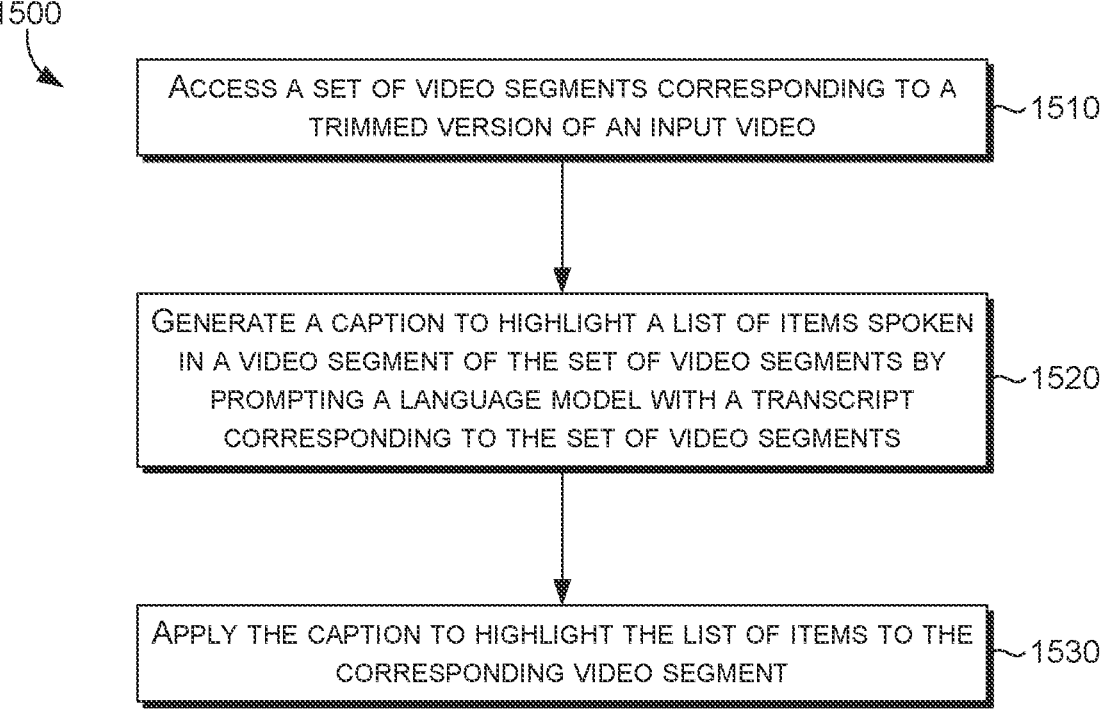
FIG. 15 is a flow diagram showing a method for applying captioning video effects to for lists extracted from an edited video, in accordance with embodiments of the present invention.

FIG. 15 is a flow diagram showing a method 1500 for applying captioning video effects to for lists extracted from an edited video, in accordance with embodiments of the present invention. Initially, at block 1510, a set of video segments corresponding to a trimmed version of an input video are accessed. At block 1520, a caption to highlight a list of items spoken in a video segment of the set of video segments is generated by prompting a language model with a transcript corresponding to the set of video segments to generate the caption. At block 1530, the caption is applied in the corresponding video segment of the set of video segments to highlight the list of items in the corresponding video segment.

Figure 16:
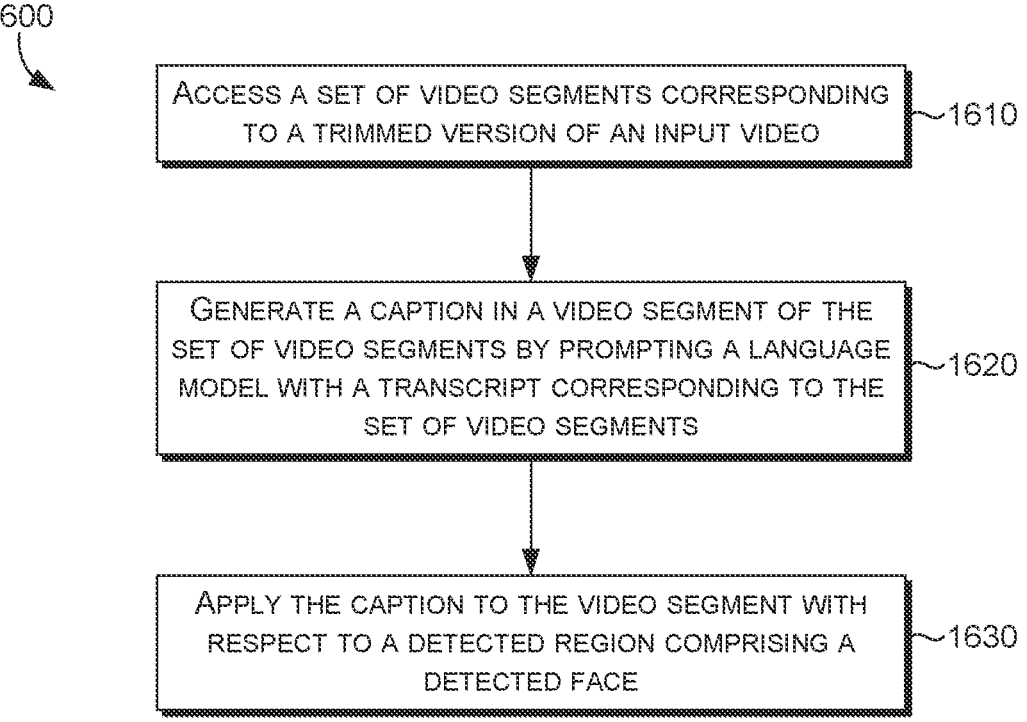
FIG. 16 is a flow diagram showing a method for applying face-aware captioning video effects, in accordance with embodiments of the present invention.

FIG. 16 is a flow diagram showing a method 1600 for applying face-aware captioning video effects, in accordance with embodiments of the present invention. Initially, at block 1610, a set of video segments corresponding to a trimmed version of an input video are accessed. At block 1620, a caption in a video segment of the set of video segments is generated by prompting a language model with a transcript corresponding to the set of video segments to generate the caption. At block 1630, the caption is applied in the corresponding video segment of the set of video segments with respect to a detected region comprising a detected face within the video segment.

FIG. 17 is a flow diagram showing a method 1700 for applying face-aware captioning video effects with scale magnification for emphasis, in accordance with embodiments of the present invention. Initially, at block 1710, a set of video segments corresponding to a trimmed version of an input video are accessed. At block 1720, a caption in a video segment of the set of video segments is generated by prompting a language model with a transcript corresponding to the set of video segments to generate the caption. At block 1730, a scale magnification zooming in on a detected region of a detected face is applied to at least a portion of a video segment of the set of video segments in order to provide emphasis on the portion of the video segment. At block 1740, the portion of the video segment with the scale magnification applied is provided. At block 1750, the caption is applied to the portion of the video segment with the scale magnification applied and with respect to a detected region comprising a detected face within the portion of the video segment.

Example Operating Environment

Figure 18:
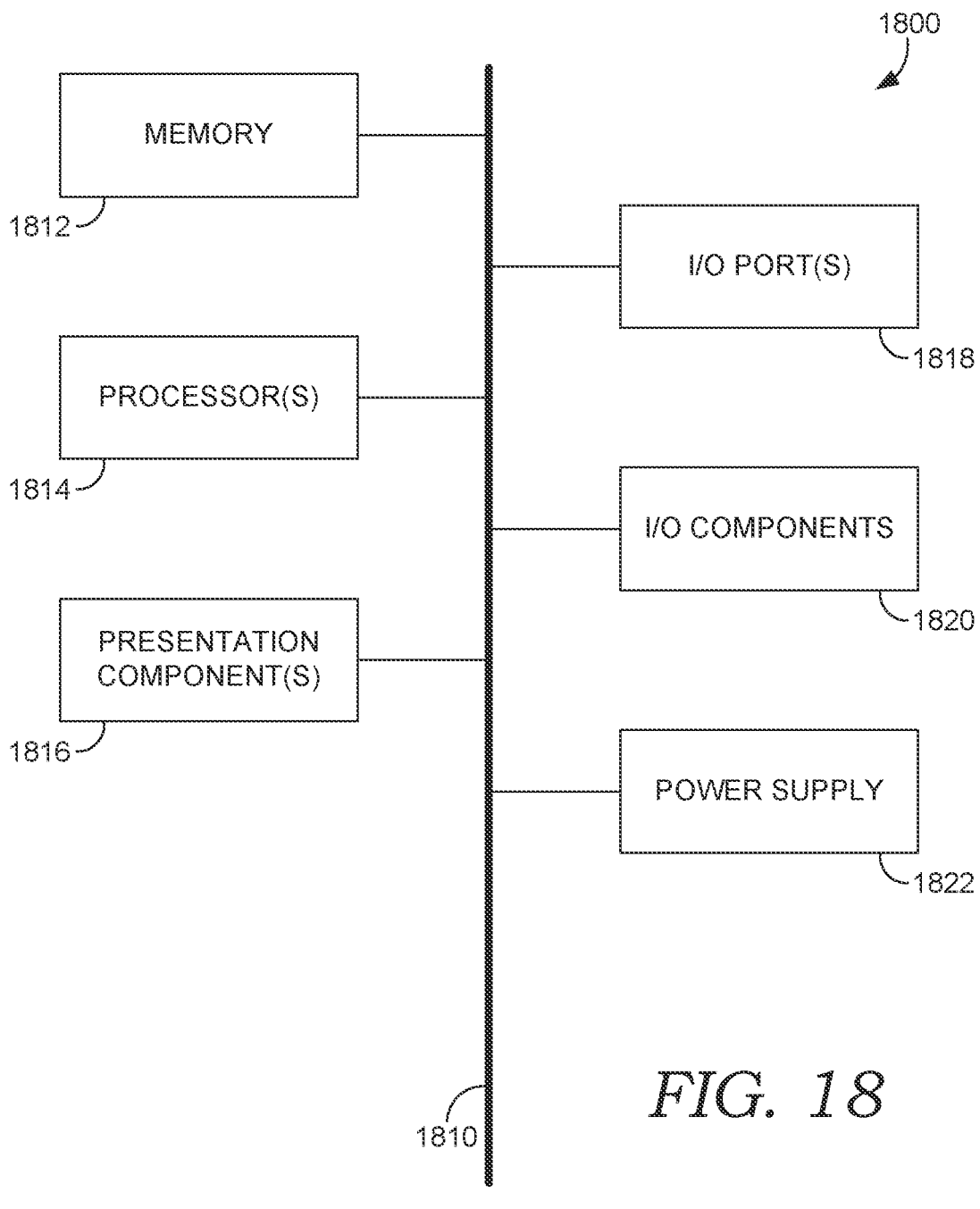
FIG. 18 is a block diagram of an example computing environment suitable for use in implementing embodiments of the present invention.

Having described an overview of embodiments of the present invention, an example operating environment in which some embodiments of the present invention are implemented is described below in order to provide a general context for various aspects of the present invention. Referring now to FIG. 18 in particular, an example operating environment for implementing embodiments of the present invention is shown and designated generally as computing device 1800. Computing device 1800 is but one example of a suitable computing environment and is not intended to suggest any limitation as to the scope of use or functionality of the invention. Neither should computing device 1800 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules (e.g., including or referencing routines, programs, objects, components, libraries, classes, variables, data structures, etc.) refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 18, computing device 1800 includes bus 1810 that directly or indirectly couples the following devices: memory 1812, one or more processors 1814, one or more presentation components 1816, input/output (I/O) ports 1818, input/output components 1820, and illustrative power supply 1822. Bus 1810 represents what may be one or more busses (such as an address bus, data bus, or combination thereof). Although the various blocks of FIG. 18 are shown with lines for the sake of clarity, in some cases, it is not possible to delineate clear boundaries for different components. In this case, metaphorically, the lines would be grey and fuzzy. As such, the diagram of FIG. 18 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 18 and a "computing device."

Computing device 1800 typically includes a variety of computer-readable media. Computer-readable media can be any available media that can be accessed by computing device 1800 and includes both volatile and nonvolatile media, and removable and non-removable media. By way of nonlimiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1812 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 1800 includes one or more processors that read data from various entities such as memory 1812 or I/O components 1820. Presentation component(s) 1816 present data indications to a user or other device. Example presentation components include a display device, speaker, printing component, vibrating component, etc.

I/O ports 1818 allow computing device 1800 to be logically coupled to other devices including I/O components 1820, some of which may be built in. Illustrative components include a microphone, joystick, game pad, satellite dish, scanner, printer, wireless device, etc. The I/O components 1820 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 1800. In some cases, computing device 1800 is equipped with depth cameras, such as stereoscopic camera systems, infrared camera systems, RGB camera systems, touchscreen technology, and combinations of these, for gesture detection and recognition. Additionally or alternatively, the computing device 1800 is equipped with accelerometers or gyroscopes that enable detection of motion, and in some cases, an output of the accelerometers or gyroscopes is provided to the display of computing device 1800 to render immersive augmented reality or virtual reality.

Embodiments described herein support video segmentation, speaker diarization, transcript paragraph segmentation, video navigation, video or transcript editing, and/or video playback. In various embodiments, the components described herein refer to integrated components of a system. The integrated components refer to the hardware architecture and software framework that support functionality using the system. The hardware architecture refers to physical components and interrelationships thereof and the software framework refers to software providing functionality that can be implemented with hardware embodied on a device.

In some embodiments, the end-to-end software-based system operates within the components of the system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present invention.

Some embodiments are described with respect a neural network, a type of machine-learning model that learns to approximate unknown functions by analyzing example (e.g., training) data at different levels of abstraction. Generally, neural networks model complex non-linear relationships by generating hidden vector outputs along a sequence of inputs. In some cases, a neural network includes a model of interconnected digital neurons that communicate and learn to approximate complex functions and generate outputs based on a plurality of inputs provided to the model. In various implementations, a neural network includes any of a variety of deep learning models, including convolutional neural networks, recurrent neural networks, deep neural networks, and deep stacking networks, to name a few examples. In some embodiments, a neural network includes or otherwise makes use of one or more machine learning algorithms to learn from training data. In other words, a neural network can include an algorithm that implements deep learning techniques such as machine learning to attempt to model high-level abstractions in data.

Although some implementations are described with respect to neural networks, some embodiments are implemented using other types of machine learning model(s), such as those using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when executed by one or more computing devices, cause the one or more computing devices to perform operations comprising:

accessing an input video and a transcript corresponding to the input video, the input video segmented into a plurality of scenes;

generating, based on aligning scene captions of the plurality of scenes with the transcript to output an augmented transcript and applying the augmented transcript to a language model, a representation of sentences characterizing a trimmed version of the input video;

identifying a subset of video segments of the input video corresponding to each of the sentences characterizing the trimmed version of the input video; and generating the trimmed version of the input video by assembling the subset of video segments into a trimmed video.

2. The one or more computer storage media of claim 1, the operations further comprising:

segmenting the input video into the plurality of scenes based on a computation of similarity of frame embeddings of each corresponding frame of each scene of the plurality of scenes by a language-image pretrained model.

3. The one or more computer storage media of claim 1, the operations further comprising:

generating the scene captions by an image caption generator model.

4. The one or more computer storage media of claim 1, the operations further comprising:

generating the transcript by an automated speech recognition model, the transcript comprising speaker diarization and word-level timing; and segmenting the transcript into a plurality of sentences by a sentence segmentation model.

5. A method comprising:

accessing an input video and a transcript corresponding to the input video, the input video segmented into a plurality of scenes;

generating, based on aligning scene captions of the plurality of scenes with the transcript to output an augmented transcript and processing the augmented transcript using a language model, a representation of sentences characterizing a trimmed version of the input video;

identifying a subset of video segments of the input video corresponding to each of the sentences characterizing the trimmed version of the input video; and generating the trimmed version of the input video by assembling the subset of video segments into a trimmed video.

6. The one or more computer storage media of claim 1, the operations further comprising:

applying a prompt to the language model to generate a summarized version of the input video as the representation of sentences characterizing the trimmed version of the input video; and identifying the subset of video segments of the input video corresponding to each of the sentences characterizing the trimmed version of the input video by:

computing similarity of each sentence embedding of each of the sentences characterizing the trimmed version of the input video to each sentence embedding of each sentence of the augmented transcript; and for each of the sentences characterizing the trimmed version of the input video, selecting a video segment of the subset of video segments based on the similarity computed for a corresponding sentence of the video segment from the augmented transcript.

7. The one or more computer storage media of claim 1, the operations further comprising:

for each of the sentences characterizing the trimmed version of the input video:

determining a threshold number of similar sentences from the augmented transcript; and selecting each video segment of the subset of video segments from a corresponding one of the similar sentences based on a desired length of the trimmed video.

8. The one or more computer storage media of claim 1, the operations further comprising:

applying a prompt to the language model to generate a rough cut version of the input video and wherein each sentence of the representation of sentences characterizing the trimmed version of the input video corresponds to a corresponding sentence from the augmented transcript.

9. The method of claim 5, further comprising:

for each of the sentences characterizing the trimmed version of the input video:

determining a threshold number of similar sentences from the augmented transcript; and selecting each video segment of the subset of video segments from a corresponding one of the similar sentences based on a desired length of the trimmed video.

10. The method of claim 9, further comprising:

segmenting the input video into the plurality of scenes based on a computation of similarity of frame embeddings of each corresponding frame of each scene of the plurality of scenes by a language-image pretrained model.

11. The method of claim 9, further comprising:

generating the scene captions by an image caption generator model.

12. The method of claim 9, further comprising:

generating the transcript by an automated speech recognition model, the transcript comprising speaker diarization and word-level timing; and segmenting the transcript into a plurality of sentences by a sentence segmentation model.

13. The method of claim 9, further comprising:

applying a prompt to the language model to generate a summarized version of the input video as the representation of sentences characterizing the trimmed version of the input video; and identifying the subset of video segments of the input video corresponding to each of the sentences characterizing the trimmed version of the input video by:

computing similarity of each sentence embedding of each of the sentences characterizing the trimmed version of the input video to each sentence embedding of each sentence of the augmented transcript; and for each of the sentences characterizing the trimmed version of the input video, selecting a video segment of the subset of video segments based on the similarity computed for a corresponding sentence of the video segment from the augmented transcript.

14. The method of claim 9, further comprising:

applying a prompt to the language model to generate a rough cut version of the input video and wherein each sentence of the representation of sentences characterizing the trimmed version of the input video corresponds to a corresponding sentence from the augmented transcript.

15. A computer system comprising one or more processors and memory configured to provide computer program instructions to the one or more processors, the computer program instructions comprising:

a video ingestion component configured to access an input video and a transcript corresponding to the input video, the input video segmented into a plurality of scenes;

a prompt component configured to trigger-generating, based on aligning scene captions of the plurality of scenes with the transcript to output an augmented transcript and applying the augmented transcript to a language model, a representation of sentences characterizing a trimmed version of the input video;

a selection component configured to identify a subset of video segments of the input video corresponding to each of the sentences characterizing the trimmed version of the input video; and an assembly component configured to generate the trimmed version of the input video by assembling the subset of video segments into a trimmed video.

16. The computer system of claim 15, the computer program instructions further comprising:

segmenting the input video into the plurality of scenes based on a computation of similarity of frame embeddings of each corresponding frame of each scene of the plurality of scenes by a language-image pretrained model.

17. The computer system of claim 15, the computer program instructions further comprising:

generating the scene captions by an image caption generator model.

18. The computer system of claim 15, the computer program instructions further comprising:

generating the transcript by an automated speech recognition model, the transcript comprising speaker diarization and word-level timing; and segmenting the transcript into a plurality of sentences by a sentence segmentation model.

19. The computer system of claim 15, the computer program instructions further comprising:

the prompt component further configured to apply a prompt to the language model to generate a summarized version of the input video as the representation of sentences characterizing the trimmed version of the input video; and the selection component further configured to identify the subset of video segments of the input video corresponding to each of the sentences characterizing the trimmed version of the input video by:

computing similarity of each sentence embedding of each of the sentences characterizing the trimmed version of the input video to each sentence embedding of each sentence of the augmented transcript; and for each of the sentences characterizing the trimmed version of the input video, selecting a video segment of the subset of video segments based on the similarity computed for a corresponding sentence of the video segment from the augmented transcript.

20. The computer system of claim 15, the computer program instructions further comprising:

for each of the sentences characterizing the trimmed version of the input video:

determining a threshold number of similar sentences from the augmented transcript; and selecting each video segment of the subset of video segments from a corresponding one of the similar sentences based on a desired length of the trimmed video.

\* \* \* \* \*